(12) United States Patent
Stibel et al.

(10) Patent No.: US 8,381,120 B2
(45) Date of Patent: Feb. 19, 2013

(54) VISUALIZATION TOOLS FOR REVIEWING CREDIBILITY AND STATEFUL HIERARCHICAL ACCESS TO CREDIBILITY

(75) Inventors: Jeffrey M. Stibel, Malibu, CA (US); Aaron B. Stibel, Malibu, CA (US); Judith Gentile Hackett, Malibu, CA (US); Moujan Kazerani, Santa Monica, CA (US)

(73) Assignee: Credibility Corp., Malibu, CA (US)

( * ) Notice: Subject to any disclaimer, the term of this patent is extended or adjusted under 35 U.S.C. 154(b) by 0 days.

(21) Appl. No.: 13/444,467

(22) Filed: Apr. 11, 2012

(65) Prior Publication Data

US 2012/0260209 A1    Oct. 11, 2012

Related U.S. Application Data

(60) Provisional application No. 61/474,246, filed on Apr. 11, 2011.

(51) Int. Cl.
*G06F 3/48* (2006.01)

(52) U.S. Cl. ......... 715/780; 715/713; 715/907; 705/35; 705/38; 705/39; 705/347

(58) Field of Classification Search ................... 715/780
See application file for complete search history.

(56) References Cited

U.S. PATENT DOCUMENTS

| | | | |
|---|---|---|---|
| 5,659,732 A | 8/1997 | Kirsch | |
| 6,950,809 B2 | 9/2005 | Dahan et al. | |
| 6,961,562 B2 | 11/2005 | Ross | |
| 7,369,999 B2 | 5/2008 | DuBois et al. | |
| 7,392,240 B2 | 6/2008 | Scriffignano et al. | |
| 7,584,188 B2 | 9/2009 | Scriffignano et al. | |
| 7,708,196 B2 * | 5/2010 | Palmieri et al. | 235/380 |
| 7,711,697 B2 | 5/2010 | Parry et al. | |
| 7,716,141 B2 * | 5/2010 | Stewart et al. | 705/342 |
| 7,822,757 B2 | 10/2010 | Stoker et al. | |
| 7,848,979 B2 * | 12/2010 | Sundararajan et al. | 705/35 |
| 8,099,358 B2 * | 1/2012 | Condon et al. | 705/38 |
| 8,195,549 B2 * | 6/2012 | Kasower | 705/35 |
| 2002/0167919 A1 | 11/2002 | Marples et al. | |
| 2003/0061232 A1 | 3/2003 | Patterson | |
| 2003/0115133 A1 | 6/2003 | Bian | |
| 2003/0117443 A1 * | 6/2003 | Langner et al. | 345/810 |
| 2003/0120614 A1 | 6/2003 | Shumpert | |
| 2004/0133501 A1 | 7/2004 | Parry et al. | |
| 2004/0162742 A1 | 8/2004 | Stoker et al. | |
| 2005/0010513 A1 | 1/2005 | Duckworth et al. | |
| 2005/0015320 A1 | 1/2005 | Hayenhjelm et al. | |
| 2005/0071217 A1 * | 3/2005 | Hoogs et al. | 705/10 |
| 2005/0119961 A1 | 6/2005 | Tanzillo et al. | |
| 2005/0125322 A1 * | 6/2005 | Lacomb et al. | 705/35 |
| 2005/0130704 A1 | 6/2005 | McParland et al. | |
| 2005/0131760 A1 | 6/2005 | Manning et al. | |

(Continued)

*Primary Examiner* — William Bashore
*Assistant Examiner* — Reza Nabi
(74) *Attorney, Agent, or Firm* — Los Angeles Patent Group; Arman Katiraei

(57) ABSTRACT

Some embodiments provide a credibility system including an interface portal for presenting a holistic view of entity credibility. To provide the holistic view, the credibility system aggregates credibility data from multiple data sources. The aggregated credibility data is processed and ordered to present different dimensions of entity credibility, with each dimension graphically presented in the interface portal through an interactive credibility module. In some embodiments, the credibility data associated with each credibility module is processed to produce at least one value that quantifiably represents the credibility data. In some embodiments, the credibility data associated with each credibility module is hierarchically ordered to present the credibility data in a drill-down fashion with each hierarchical layer presenting more detailed credibility data for better understanding the credibility data presented in the preceding layer.

20 Claims, 40 Drawing Sheets

U.S. PATENT DOCUMENTS

| | | |
|---|---|---|
| 2005/0192891 A1 | 9/2005 | Ferrera et al. |
| 2005/0240503 A1 | 10/2005 | Parker et al. |
| 2006/0020519 A1 | 1/2006 | Schroeder et al. |
| 2006/0129481 A1* | 6/2006 | Bhatt et al. ............ 705/39 |
| 2006/0195361 A1 | 8/2006 | Rosenberg |
| 2006/0270421 A1 | 11/2006 | Phillips et al. |
| 2007/0112667 A1 | 5/2007 | Rucker |
| 2007/0112668 A1* | 5/2007 | Celano et al. ............ 705/38 |
| 2007/0265995 A1 | 11/2007 | Remington et al. |
| 2008/0235174 A1 | 9/2008 | Scriffignano et al. |
| 2008/0249902 A1 | 10/2008 | Lehman et al. |
| 2009/0106236 A1* | 4/2009 | Koefoot et al. ............ 707/5 |
| 2009/0299911 A1* | 12/2009 | Abrahams et al. ........ 705/36 R |
| 2009/0319342 A1* | 12/2009 | Shilman et al. ............ 705/10 |
| 2010/0076968 A1 | 3/2010 | Boyns et al. |
| 2010/0079336 A1 | 4/2010 | Skibiski et al. |
| 2010/0095196 A1* | 4/2010 | Grabarnik et al. ........ 715/230 |
| 2011/0055173 A1 | 3/2011 | Stoker et al. |
| 2011/0087573 A1 | 4/2011 | Bahnck et al. |
| 2011/0161218 A1* | 6/2011 | Swift ............ 705/35 |
| 2011/0173093 A1* | 7/2011 | Psota et al. ............ 705/26.35 |
| 2012/0246092 A1* | 9/2012 | Stibel et al. ............ 705/347 |
| 2012/0246093 A1* | 9/2012 | Stibel et al. ............ 705/347 |

* cited by examiner

VISUALIZATION TOOLS FOR REVIEWING CREDIBILITY AND STATEFUL HIERARCHICAL ACCESS TO CREDIBILITY

CLAIM OF BENEFIT TO RELATED APPLICATIONS

This application claims the benefit of U.S. provisional patent application 61/474,246 entitled "Visualization Tools for Reviewing Credibility and Stateful Hierarchical Access to Credibility" filed on Apr. 11, 2011. The contents of application 61/474,246 are hereby incorporated by reference.

TECHNICAL FIELD

The present invention pertains to systems, methods, processes, and tools for visually and interactively presenting credibility of an entity.

BACKGROUND

Creditworthiness of individuals and businesses has long been a quantifiable measure from which many personal and commercial transactions are based. The creditworthiness of an individual is used to determine terms (e.g., amounts and interest rates) when individuals seek home mortgage loans, personal loans, property rental, and credit cards. Several credit agencies exist and operate to determine an individual's creditworthiness and to sell that information to interested buyers. Credit agencies derive the creditworthiness of individuals by monitoring individual spending habits, payment habits, net worth, etc. Credit agencies convert these and other monitored behaviors into a quantifiable credit score that has been standardized to range between 300-850 points, with a higher score representing greater creditworthiness and a lower score representing lesser creditworthiness.

Business creditworthiness is also a quantifiable measure that drives many business transactions. However, deriving business creditworthiness is a fundamentally more complex problem than deriving an individual's creditworthiness. For individuals, there is a one-to-one correspondence between an identifier (i.e., social security number) and the individual. Such is not the case for many businesses. A business may operate under different names, subsidiaries, branches, and franchises as some examples. Moreover, tracking business assets, accounts, and transactions is further complicated because businesses merge, go out of business, start anew, split, etc. Accordingly, more resources are needed to monitor and analyze business creditworthiness. Companies, such as Dun & Bradstreet®, operate to monitor and derive the creditworthiness of businesses. Business credit reports can be purchased from Dun & Bradstreet and other such business credit reporting companies. Sales of such information have become a multi-billion dollar industry.

While critical to some small business needs, business creditworthiness is often immaterial to determining the day-to-day success of the small business. For instance, whether a client leaves satisfied with a service or a product that has been purchased from the small business is instrumental in determining whether that client will be a repeat customer or will provide referrals to encourage others to visit the small business. A sufficient number of good client experiences beneficially increases the exposure of the small business, thereby resulting in better chances of growth, success, and profitability. Conversely, a sufficient number of bad client experiences can doom a small business. The success of the small business is therefore predicated more on generated goodwill, reputation, satisfaction, and other such criteria that impact the small business operations on a day-to-day basis than it is on business creditworthiness. Goodwill, reputation, satisfaction, and other such criteria that impact the small business operations on a day-to-day basis are hereinafter referred to as credibility.

Ascertaining the credibility for any entity whether an individual or business is complicated by virtue of the varied and distributed nature of credibility data. Credibility data exists in various forms including qualitative credibility data and quantitative credibility data. Qualitative data includes customer and professional review data, blog content, and social media content as some examples. Some data sources from which qualitative data about various entities may be acquired are internet websites such as www.yelp.com, www.citysearch.com, www.zagat.com, www.gayot.com, www.facebook.com, and www.twitter.com. Quantitative data includes different measures of an entity's credibility as quantified to a scale, ranking, or rating. Consequently, credibility data is neither standardized nor normalized and each data source provides an independent and disjoint view of the credibility for an entity. Other factors also affecting the credibility of a particular individual or business entity include the presence and visibility of the entity and the partnerships and relationships established by the entity as some examples.

It is very time consuming, inaccurate, and difficult for the small business or other entity to piece together its credibility from these varied data sources. Specifically, the small business does not have the tools or the resources to continually scour the different credibility data sources to aggregate sufficient credibility data from which to derive its credibility. Further exacerbating the problem is that even when the credibility data is properly aggregated, making sense of that credibility data to arrive at an overall view of the business credibility is complicated by the amount of credibility data and the non-standard, non-uniform, and qualitative nature of the credibility data.

Accordingly, there is a need to provide various visualization tools that provide a holistic and comprehensive view of the creditability of an entity. Moreover, entities want to understand the different dimensions of credibility from which their overall credibility is derived. Each credibility dimension provides insight into what parts of the entity are helping its credibility and what parts are detrimentally affecting its credibility. Accordingly, there is further a need for the visualization tools to provide a meaningful, concise, interactive, and easily navigable interface from which to understand the derivation of an entity's credibility based on its various dimensions.

SUMMARY OF THE INVENTION

It is an object of the present invention to provide a single interface from which credibility of several distinct businesses can be presented. It is further an object to provide a holistic view of the business credibility based on (1) credibility data that is aggregated from multiple data sources and (2) credibility data that accounts for different dimensions of business credibility. It is further an object to provide various tools for users to interact with the credibility data in order to hierarchically visualize the derivation of the individual credibility dimensions.

To achieve the objects and in accordance with the purpose of the invention, as embodied and broadly described herein, some embodiments provide an interface portal. In some embodiments, the interface portal provides a business credibility directory for searching a database storing credibility reports. Based on user submitted search criteria, the interface portal obtains one or more reports and parses the reports to generate dynamic websites for presenting the holistic view of business credibility.

In some embodiments, the credibility reports are stored as separate data structures comprising data sets that represent various dimensions of credibility. Each dataset stores aggregated, derived, and/or referenced credibility data that is related to a particular dimension of credibility. Moreover, each dataset includes one or more hierarchical layers. Each descending hierarchical layer includes credibility data that expands on the credibility data conveyed in the preceding hierarchical layer. This includes providing greater detail, more credibility data, or enhancing credibility data in the preceding hierarchical layer in order for the user to better understand the derivation of a particular dimension of credibility. In some embodiments, different hierarchical layers can be configured with different access permissions so as to restrict access to certain hierarchical layers to pay-per-access users. In this manner, the credibility system provides means to monetize the credibility data of the different credibility dimensions.

In some embodiments, the interface portal provides a simultaneous multi-dimensional presentation of business credibility also referred to as a credibility review website. The credibility review website provides a summarized view of multiple credibility dimensions on a single site such that a holistic view of credibility that is based on multiple dimensions of credibility and credibility data that is aggregated from multiple data sources can be viewed from a single site. Accordingly, users no longer need to visit multiple data sources in order to obtain an unbiased and complete view of credibility. Moreover, users no longer have to make sense of non-standardized and inconsistent credibility data.

In some embodiments, the interface portal provides a modularized multi-dimensional presentation of business credibility. Each dimension of credibility is graphically represented by and accessible through an interactive stateful graphical element referred to as an application cube. User interactions with an application cube enable access to the credibility data of a particular credibility dimension. More specifically, different credibility data and interactive tools allow users the ability to drill-down into the various hierarchical layers of credibility data grouped to each dimension of credibility. Some dimensions of credibility include credibility scoring, multimedia visualization of a business (including imagery and video feeds), geo-location and mapping, financial information, social network content, news, and network partnerships.

BRIEF DESCRIPTION OF THE DRAWINGS

In order to achieve a better understanding of the nature of the present invention a preferred embodiment of the credibility scoring and reporting system including the interface portal will now be described, by way of example only, with reference to the accompanying drawings in which.

DETAILED DESCRIPTION OF THE INVENTION

Figure 1:
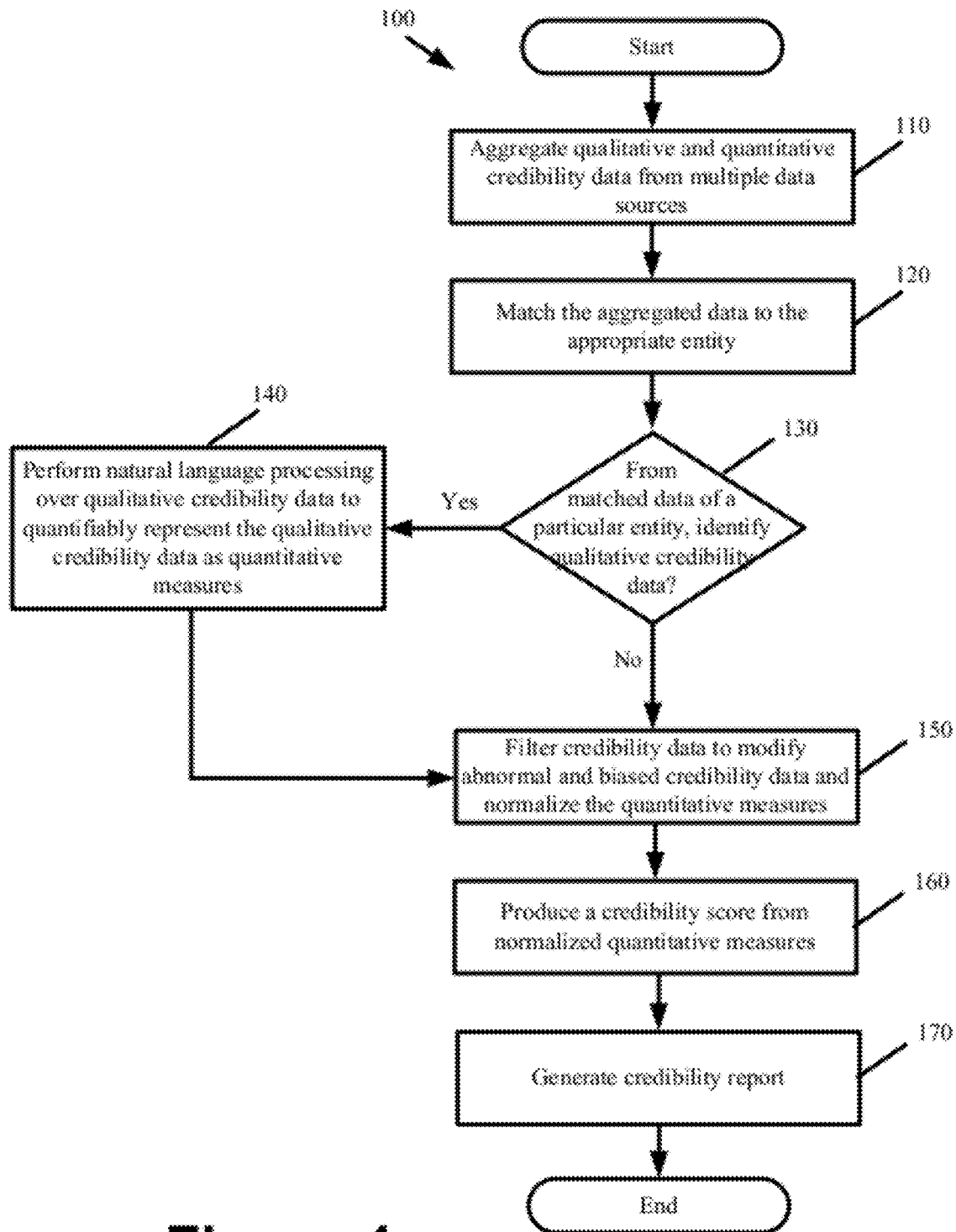
FIG. 1 presents a process performed by the credibility scoring and reporting system to generate a credibility score and credibility report in accordance with some embodiments.

In the following detailed description, numerous details, examples, and embodiments of a credibility scoring and reporting system including the interface portal and methods are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described.

I. Overview

For any individual or business entity, credibility is an invaluable asset. For a business entity, credibility can be used to identify successful business practices, unsuccessful business practices, desired improvements by customers, future growth opportunities, and changes that can be made to improve the future growth and success of the business. Today, credibility exists as qualitative data and as non-standardized quantitative measures that selectively gauge various factors about an entity using different ranking systems. However, the qualitative and non-standardized nature of credibility data results in an intangible asset for which baseline measurements do not exist, cross-comparisons cannot be made, and against which individual biases and scarcity of information undermine the relevancy of the information. Consequently, entities, especially small business, are unable to effectively determine or evaluate their credibility in the marketplace and future strategic decisions are misguided as a result.

To overcome these and other issues and to provide a tangible asset that quantifiably measures the credibility of a particular entity, some embodiments provide a credibility scoring and reporting system. The credibility scoring and reporting system generates standardized credibility scores that quantifiably measure credibility for different entities. The credibility scoring and reporting system derives the standardized credibility scores from credibility data that is aggregated from multiple data sources. The standardized credibility scores can then be used to present the credibility of different entities as a readily identifiable score that can be comparatively analyzed against credibility scores of competitors. Moreover, the credibility scoring and reporting system generates credibility reports that incorporate the derived credibility scores and that provide an organized and holistic view for the credibility data that is aggregated for each particular entity from unrelated and often incompatible data sources, where each data source may compile proprietary credibility data for the particular entity that other data sources do not have. In some embodiments, the credibility data that is aggregated for a particular entity is hierarchically organized to a credibility report such that anyone can generally determine the credibility of the particular entity and still be able to determine a detailed understanding of the credibility data that factor into the particular entity's credibility by accessing the different hierarchical layers of credibility data using drill-down functionality. The credibility scoring and reporting system can further process the aggregated credibility data for a particular entity to automatically identify actions that the particular entity can undertake to improve various aspects of its credibility thereby boosting its exposure, presence, reputation, desirability, and profitability. Consequently, the credibility report serves as a single asset from which a particular entity can identify practices that have been successful, practices that have inhibited its success, desired improvements by customers, future growth opportunities, and changes that can be made to improve the future growth and success of the particular entity.

FIG. 1 presents a process 100 performed by the credibility scoring and reporting system to generate a credibility score and credibility report in accordance with some embodiments. The process begins by aggregating (at 110) qualitative and quantitative credibility data from multiple data sources. This includes collecting data from various online and offline data sources through partner feeds, files, and manual inputs. The process matches (at 120) the aggregated data to the appropriate entity. The matched data for each entity is analyzed (at 130) to identify qualitative credibility data from quantitative credibility data. The process performs natural language processing (at 140) over the qualitative credibility data to convert the qualitative credibility data into quantitative measures. The derived quantifiable measures for the qualitative credibility data and the other aggregated quantitative credibility data are then subjected to scoring filters that modify (at 150) quantitative measures for abnormal and biased credibility data and that normalize the quantitative measures. The process produces (at 160) a credibility score by compiling the remaining normalized quantitative measures.

The credibility score accurately represents the credibility of a given entity, because (i) the credibility score is computed using data from varied data sources and is thus not dependent on or disproportionately affected by any single data source, (ii) the credibility data is processed using algorithms that eliminate individual biases from the interpretation of the qualitative credibility data, (iii) the credibility data is processed using filters that eliminate biased credibility data while normalizing different quantitative measures, and (iv) by using the same methods and a consistent set of algorithms to produce the credibility score for a plurality of entities, the produced credibility scores are standardized and can be subjected to comparative analysis in order to determine how the credibility score of one entity ranks relative to the credibility scores of other competitors or entities. As a result, the credibility score can be sold as a tangible asset to those entities interested in understanding their own credibility.

In some embodiments, the process also generates (at 170) a credibility report as a separate tangible asset for entities interested in understanding the derivation of their credibility and how to improve their credibility. In some embodiments, the credibility report presents relevant credibility data to identify the derivation of the entity's credibility. In some embodiments, the credibility report also suggests actions for how the entity can improve upon its credibility.

Some embodiments provide an interface portal from which entities can purchase and view the credibility scores and/or credibility reports. Using these assets (i.e., credibility scores and credibility reports), entities can formulate accurate and targeted objectives to improve their credibility and, more importantly, their likelihood for future growth and success. Entities will also have access to the credibility scores and credibility reports of other entities. The credibility scores and credibility reports can thus be used to guide clientele to credible businesses and steer clientele away from businesses providing a poor customer experience. Moreover, the credibility scores and credibility reports can serve to identify businesses with which a particular business would want to partner with or form relationships with for future business transactions. Accordingly, there is incentive for entities to improve upon their credibility as clientele and partners may be looking at the same information when determining whether or not to transact or partner with a particular entity.

The portal further acts as a means by which entities can be directly involved with the credibility scoring and reporting process. Specifically, using the interface portal, entities can submit pertinent credibility data that may otherwise be unavailable from the data sources and correct mismatched credibility data.

II. Credibility Scoring and Reporting System

Figure 2:
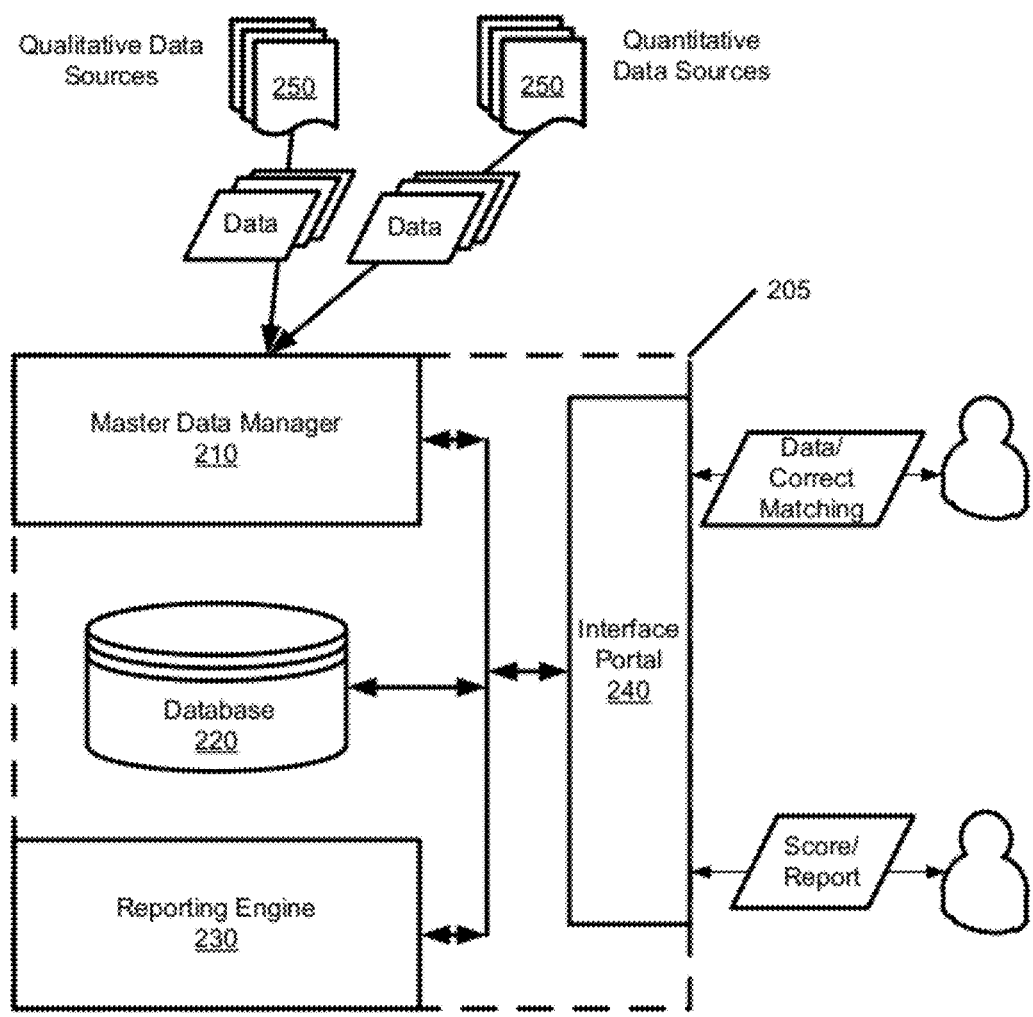
FIG. 2 presents some components of the credibility scoring and reporting system of some embodiments.

FIG. 2 presents components of the credibility scoring and reporting system 205 of some embodiments. The credibility scoring and reporting system 205 includes (1) master data manager 210, (2) database 220, (3) reporting engine 230, and (4) interface portal 240. As one skilled in the art would understand in light of the present description, the credibility scoring and reporting system 205 may include other components in addition to or instead of the enumerated components of FIG. 2. The components 210-240 of FIG. 2 are not intended as an exhaustive listing, but rather as an exemplary set of components for descriptive and presentation purposes. The overall system 205 is designed with modular plug-in components whereby new components or enhanced functionality can be incorporated within the overall system 205 without having to modify existing components or functionality.

A. Master Data Manager

At present, an entity can attempt to determine its credibility by analyzing credibility data at various data sources to see what others are saying about the entity. Credibility obtained in this manner is deficient in many regards. Firstly, credibility that is derived from one or a few data sources is deficient because a sufficient sampling of credibility cannot be obtained from such few data sources. For example, a site that includes only two negative reviews about a particular business entity does not accurately portray the credibility of that particular business entity when that particular business entity services hundreds daily. Moreover, one or more of the data sources may have biased data or outdated data that disproportionately impact the credibility of the entity. Secondly, credibility that is derived from one or a few data sources is deficient because each data source may contain information as to a particular aspect of the entity. As such, credibility derived from such few sources will not take into account the entirety of the entity and can thus be misleading. Thirdly, credibility is deficient when it is not comparatively applied across all entities, amongst competitors, or a particular field or class of entities. For example, a critical reviewer may identify a first entity as "poor performing" and identify a second entity as "horribly performing". When viewed separately, each entity would be classified with poor credibility. However, with comparative analysis, the first entity can be classified with better credibility than the second entity. Fourthly, credibility data from different reviewers or data sources is not standardized which opens the credibility data to different interpretations and individual biases. For example, it is difficult to determine whether for the same entity, a 3 out of 5 ranking from www.yelp.com is equivalent to a 26 out of 30 ranking on www.zagat.com. Similarly, a review that states the services of a first entity as "good" can be interpreted by the first entity as a successful or positive review, whereas the same review of "good" for a second entity can be interpreted by the second entity as an average review from which services have to be improved upon.

To address these and other issues in deriving entity credibility, some embodiments provide the master data manager 210 to interface with multiple data sources 250 and to automatedly acquire relevant credibility data from these sources 250 at regular and continuous intervals. In so doing, the master data manager 210 removes the deficiencies that result from an insufficient sample size, outdated data, and lack of comparative data.

Figure 3:
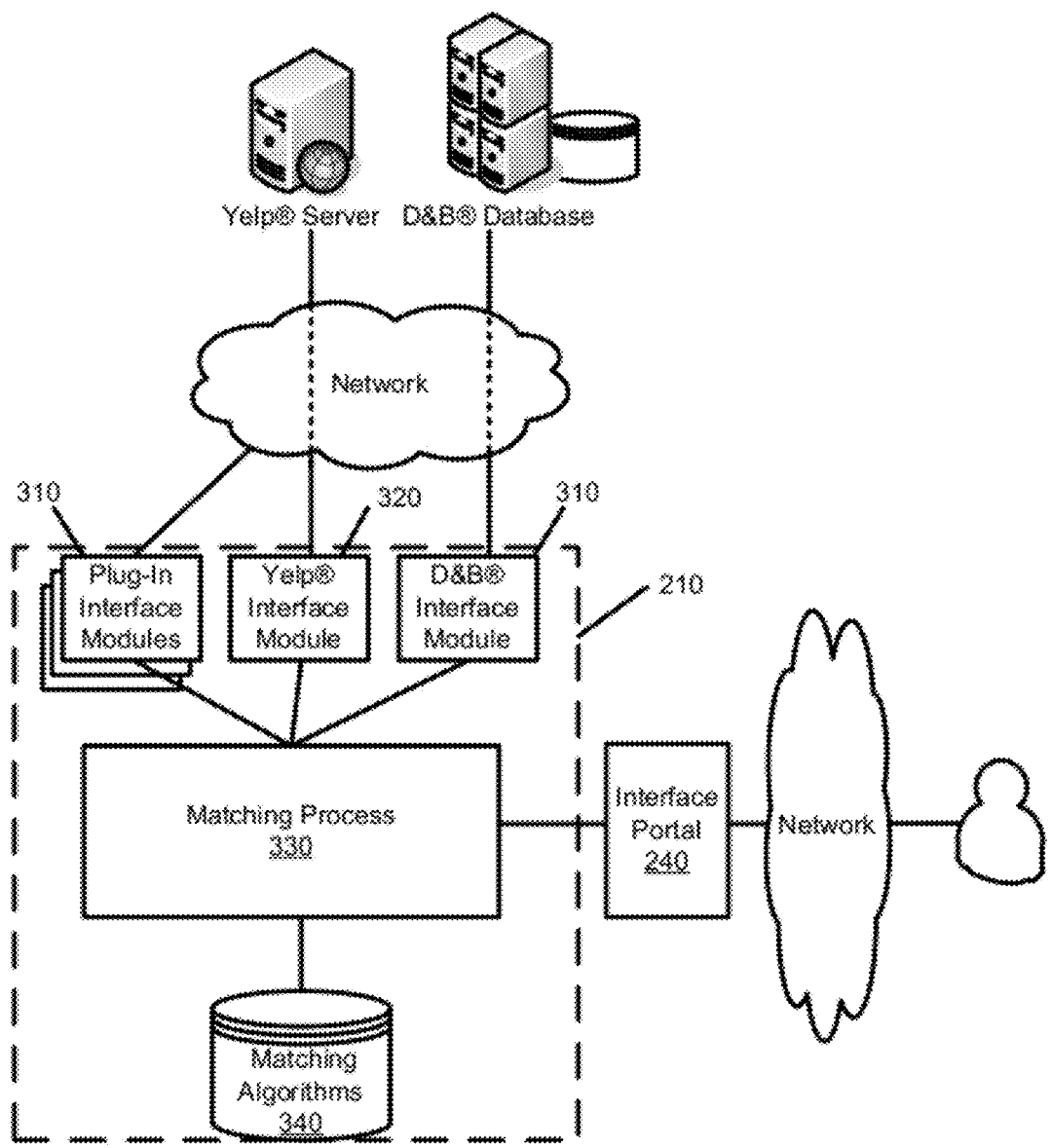
FIG. 3 illustrates components of the master data manager in accordance with some embodiments.

FIG. 3 illustrates components of the master data manager 210 in accordance with some embodiments. The master data manager 210 includes various plug-in interface modules 310 (including plug-in 320), matching process 330, and database storing a set of matching algorithms 340. Access to the master data manager 210 is provided through the interface portal 240 of FIG. 2.

The master data manager 210 aggregates credibility data from various data sources through the plug-in interface modules 310 (including 320) and through the interface portal 240.

Each plug-in interface module 310 is configured to automatically interface with one or more data sources in order to extract credibility data from those data sources. In some embodiments, each plug-in interface module 310 is configured with communication protocols, scripts, and account information to access one or more data sources. Additionally, each plug-in interface module 310 may be configured with data crawling functionality to extract credibility data from one or more data sources. A particular plug-in interface module navigates through a particular data source in order to locate the credibility data. In one illustrated example, the master data manager 210 includes a particular plug-in interface module 320 to the review aggregator Yelp® (www.yelp.com). This interface module 320 can be configured with account information to access the www.yelp.com website and a data crawler script to scan through and extract creditability data directly from the website. In some embodiments, partnership agreements are established with the data sources, whereby the plug-in interface modules directly interface with one or more databases of the data sources in order to extract the credibility data.

The extracted credibility data includes qualitative data and quantitative data about one or more entities. Qualitative data includes customer and professional review data, blog content, and social media content as some examples. Some data sources from which qualitative data about various entities may be acquired are internet websites such as Yelp® (www.yelp.com), CitySearch® (www.citysearch.com), Zagat® (www.zagat.com), Gayot (www.gayot.com), Facebook® (www.facebook.com), and Twitter® (www.twitter.com). Accordingly, some embodiments of the master data manager 210 include a different plug-in interface module 310 to extract the credibility data from each of those sites. Quantitative data includes credit, business information (e.g., address, phone number, website, etc.), and credibility data that is quantitatively measured using some scale, ranking, or rating. Some quantitative data sources include Dun & Bradstreet® and the Better Business Bureau® (BBB). Some qualitative data sources may also include quantitative credibility data. For example, www.yelp.com includes qualitative data in the form of textual reviews and comments and quantitative data in the form of a 0 out of 5 rating system. Some embodiments of the master data manager 210 include a different plug-in interface module 310 to extract quantitative data from the quantitative data sources.

In some embodiments, the credibility data further includes supplemental data that is associated with the aggregated qualitative and quantitative credibility data. Some such supplemental data is associated with the entity profile from which the qualitative and quantitative credibility data is aggregated. This supplemental data may include, for example, identification information for the entity that originated the credibility data or for the entity that is the recipient or the reference of credibility data. This identification information may include the name, address, telephone number, email, URL, etc. for the entity. Additionally, the supplemental data that is associated with the entity profile can include networking data and recent activity performed by the entity. In some embodiments, networking data identifies partnerships that one entity has established with other entities. Networking data may also include associations that one entity has with other entities.

The plug-in interface modules 310 allow credibility data from new data sources to be integrated into the master data manager 210 without altering functionality for any other plug-in interface modules 310. This modularity allows the system to scale when additional or newer data sources are desired. Moreover, the plug-in interface modules 310 allow the credibility data to automatically and continuously be acquired from these various data sources. In some embodiments, the aggregated data includes copied text, files, feeds, database records, and other digital content.

Qualitative data and quantitative data may also be aggregated from other mediums including print publications (e.g., newspaper or magazine articles), televised commentary, or radio commentary. In some embodiments, the data sources access the interface portal 240 in order to provide their credibility data directly to the master data manager 210. For example, relevant magazine articles may be uploaded or scanned and submitted through the interface portal 240 by the publisher. Publications and recordings may also be submitted by mail. An incentive for the publisher to submit such information is that doing so may increase the exposure of the publisher. Specifically, the exposure may increase when submitted publications are included within the generated credibility reports of some embodiments.

Credibility data may also be submitted directly by the entity to the master data manager 210. This is beneficial to small business entities that are unknown to or otherwise ignored by the various data sources. Specifically, credibility data can be submitted through the interface portal 240 by the business owner and that data can be incorporated into the credibility scores and credibility reports as soon as the data becomes available. In this manner, the business can be directly involved with the credibility data aggregation process and need not depend on other data sources to provide credibility data about the business to the master data manager 210. For example, the Los Angeles County of Health issues health ratings to restaurants on a graded A, B, and C rating system. Should a restaurant receive a new rating, the restaurant business owner can submit the new rating to the master data manager 210 through the interface portal 240 without waiting for a third party data source to do so. A submission may be made via a webpage in which the submitting party identifies himself/herself and enters the data as text or submits the data as files.

The master data manager 210 tags data that is aggregated using the plug-in modules 310 and data that is submitted through the interface portal 240 with one or more identifiers that identify the entity to which the data relates. In some embodiments, the identifiers include one or more of a name, phonetic name, address, unique identifier, phone number, email address, and Uniform Resource Locator (URL) as some examples. For automatically aggregated credibility data, the plug-in modules 310 tag the aggregated credibility data with whatever available identifiers are associated with the credibility data at the data source. For example, the www.yelp.com site groups reviews and ranking (i.e., credibility data) for a particular entity on a page that includes contact information about the entity (e.g., name, address, telephone number, website, etc.). For credibility data that is submitted through the interface portal 240, the submitting party will first be required to create an entity account that includes various identifiers that are to be tagged with the credibility data that is sent by that party. Tagging the credibility data may also include matching supplemental data (i.e., identification information supplemental data) with aggregated qualitative and quantitative data.

In some cases, the tagged identifiers do not uniquely or correctly identify the entity that the data is to be associated with. This may occur when a business entity operates under multiple different names, phone numbers, addresses, URLs, etc. Accordingly, the master data manager 210 includes matching process 330 that matches the aggregated data to an appropriate entity using a set of matching algorithms from the matching algorithms database 340. To further ensure the integrity and quality of the data matching, some embodiments allow for business owners and other entities to be involved in the matching process 330.

Figure 4:
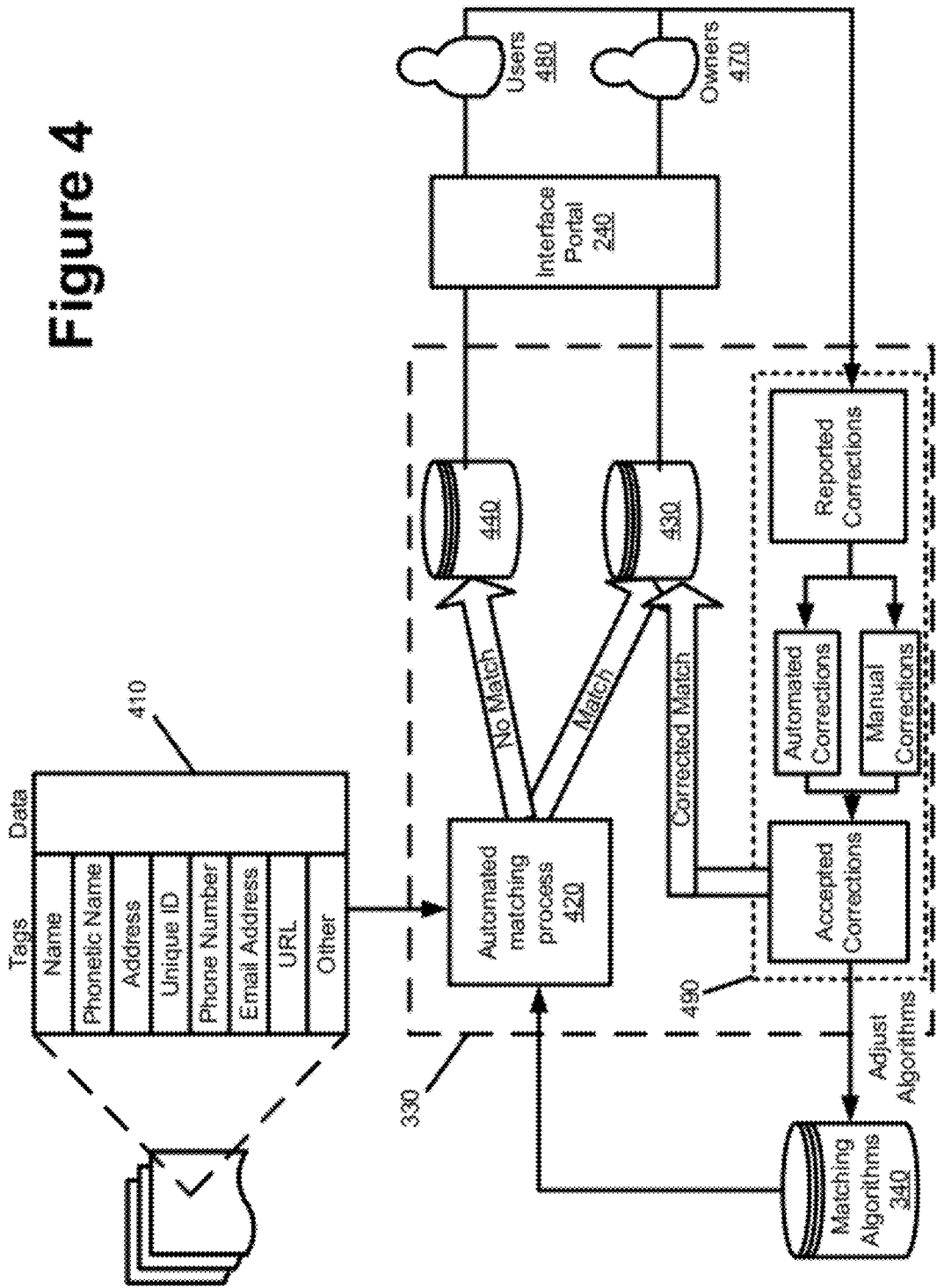
FIG. 4 presents a flow diagram for the matching process that is performed by the master data manager of some embodiments.

FIG. 4 presents a flow diagram for the matching process 330 that is performed by the master data manager of some embodiments. The matching process 330 involves tagged credibility data 410, an automated matching process 420, a first database 430, a second database 440, interface portal 240, owners 470, user community 480, correction process 490, and matching algorithms database 340.

The matching process 330 begins when tagged credibility data 410 is passed to the automated matching process 420. The automated matching process 420 uses various matching algorithms from the matching algorithms database 340 to match the credibility data 410 with an appropriate entity. Specifically, the credibility data 410 is associated with an identifier that uniquely identifies the appropriate entity. When a match is made, the credibility data is stored to the first database 430 using the unique identifier of the entity to which the credibility data is matched. In some embodiments, the first database 430 is the database 220 of FIG. 2. In some embodiments, the unique identifier is referred to as a credibility identifier. As will be described below, the credibility identifier may be one or more numeric or alphanumeric values that identify the entity.

In addition to matching the data to the appropriate entity, the automated matching process 420 may also perform name standardization and verification, address standardization and verification, phonetic name matching, configurable matching weights, and multi-pass error suspense reduction. In some embodiments, the automated matching process 420 executes other matching algorithms that match multiple entity listings to each other if ownership, partnership, or other relationships are suspected. For example, the automated matching process 420 determines whether the Acme Store in New York is the same business entity as the Acme Store in Philadelphia, whether variations in the spelling of the word Acme (e.g., "Acme", "Acmi", "Akme", "Ackme", etc.) relates to the same entity or different entities, or whether "Acme Store", "Acme Corporation", and "Acme Inc." relate to the same entity or different entities. Such matching is of particular importance when ascertaining credibility for entities with both a digital presence (i.e., online presence) and an actual presence. For instance, offline credit data may be associated with a business entity with the name of "Acme Corporation" and that same business entity may have online credibility data that is associated with the name of "Acme Pizza Shop".

However, the matching process 330 may be unable to automatically match some of the credibility data to an entity when there is insufficient information within the tags to find an accurate or suitable match. Unmatched credibility data is stored to the second database 440. The second database 440 is a temporary storage area that suspends unmatched credibility data until the data is discarded, manually matched by owners 470, or manually matched by users in the community 480.

The interface portal 240 of FIG. 2 allows owners 470 and a community of users 480 to become involved in the matching process 330. In some embodiments, the interface portal 240 is a website through which owners 470 gain access to the matching process 330 and the databases 430 and 440. Through the interface portal 240, owners 470 can claim their accounts and thereafter control matching errors, detect identity fraud, and monitor the integrity of their credibility score. Specifically, owners 470 can identify matching errors in the first database 430 and confirm, decline, or suggest matches for credibility data that has been suspended to the second database 440. Through the interface portal 240, owners 470 can address credibility issues in real-time. In some embodiments, owners 470 include agents or representatives of a business entity that are permitted access to the business entity account in the credibility scoring and reporting system.

In some embodiments, the interface portal 240 also provides entities access to the matching process 330 through a plug-in. The plug-in can be utilized on any website where credibility data is found. In some embodiments, the plug-in is for external websites that wish to seamlessly integrate the backend of credibility data suppliers to the credibility scoring and reporting system. In this manner, an entity can own and manage the review of credibility data itself. This facilitates creation of a single source of credibility across all participating third party websites. Accordingly, whenever a user/entity in the community 480 or owner 470 spots an incorrect match or issues with credibility data, they can interact with that data through the plug-in. This allows for community 480 interaction whereby other entities help improve matching results. In so doing, review data is transformed into interactive connections of owners, users, and other entities in the community.

When an improper match is flagged for review or a new match is suggested, it is passed to the correction process 490 for verification. In some embodiments, the correction process 490 includes automated correction verification and manual correction verification. Automated correction verification can be performed by comparing the flagged credibility data against known entity account information or other credibility data that has been matched to a particular entity. Approved corrections are entered into the first database 430. Disapproved corrections are ignored.

In some embodiments, adjustments may be made to improve the matching accuracy of the matching algorithms in the matching algorithm database 340 based on the approved corrections. In this manner, the matching process 330 learns from prior mistakes and makes changes to the algorithms in a manner that improves the accuracy of future matches.

B. Database

Figure 5:
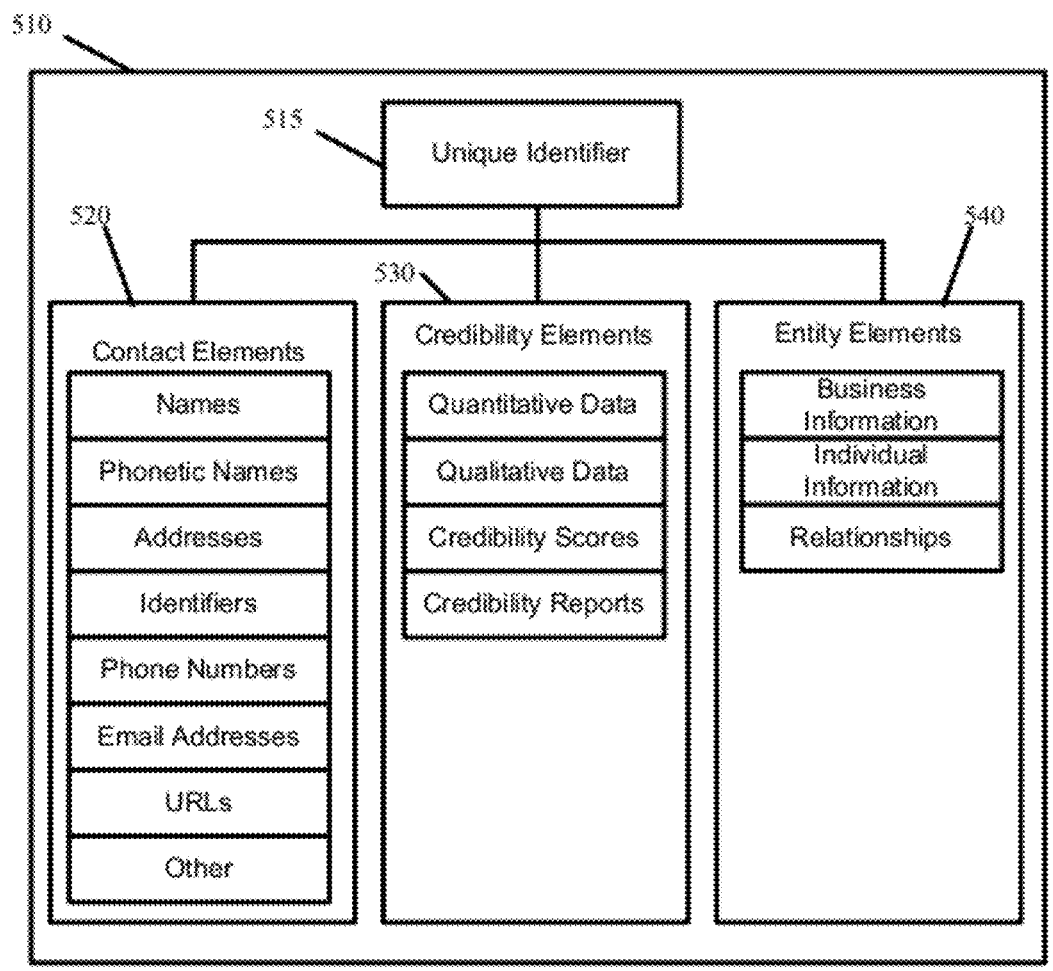
FIG. 5 illustrates an exemplary data structure for storing the credibility scoring information.

Referring back to FIG. 2, the database 220 stores various information pertaining to the credibility scoring of each particular entity using the unique identifier that is assigned to that particular entity. FIG. 5 illustrates an exemplary data structure 510 for storing the credibility scoring information. The data structure 510 includes unique identifier 515, contact elements 520, credibility elements 530, and entity elements 540.

As before, the unique identifier 515 uniquely identifies each entity. The contact elements 520 store one or more names, addresses, identifiers, phone numbers, email addresses, and URLs that identify an entity and that are used to match aggregated and tagged credibility data to a particular entity. The credibility fields 530 store the aggregated and matched qualitative and quantitative credibility data. Additionally, the credibility fields 530 may store generated credibility scores and credibility reports that are linked to the unique identifier 515 of the data structure 510. The entity elements 540 specify business information, individual information, and relationship information. Business information may include business credit, financial information, suppliers, contractors, and other information provided by companies such as Dun & Bradstreet. Individual information identifies individuals associated with the business. Relationship information identifies the roles of the individuals in the business and the various business organization or structure. Individual information may be included to assist in the matching process and as factors that affect the credibility score. For example, executives with proven records of growing successful businesses can improve the credibility score for a particular business and inexperienced executives or executives that have led failing businesses could detrimentally affect the credibility score of the business.

Logically, the database 220 may include the databases 430 and 440 of FIG. 4 and other databases referred to in the figures and in this document. Physically, the database 220 may include one or more physical storage servers that are located at a single physical location or are distributed across various geographic regions. The storage servers include one or more processors, network interfaces for networked communications, and volatile and/or nonvolatile computer-readable storage mediums, such as Random Access Memory (RAM), solid state disk drives, or magnetic disk drives.

C. Reporting Engine

Figure 6:
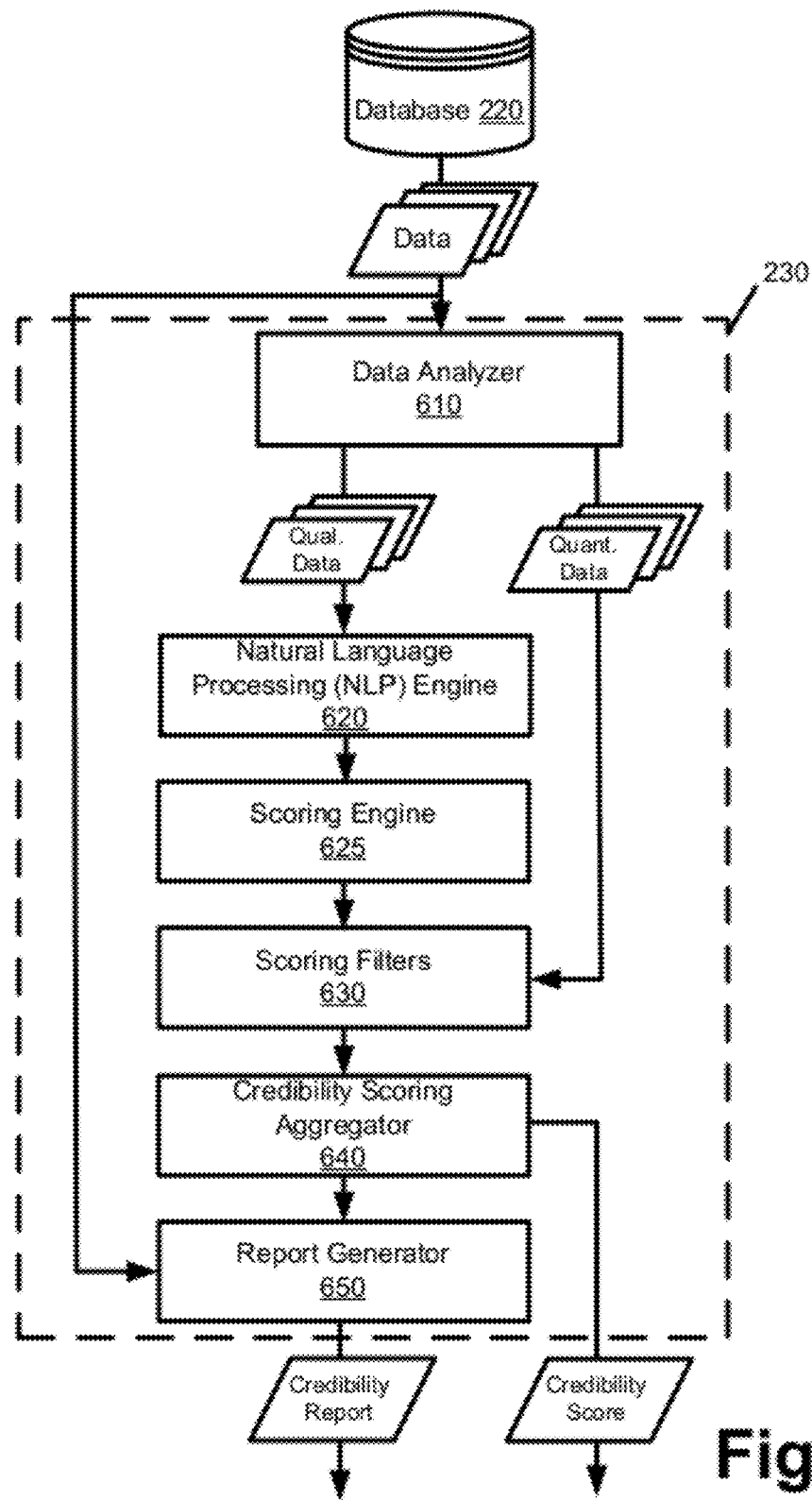
FIG. 6 illustrates some components of the reporting engine for generating credibility scores and credibility reports in accordance with some embodiments.

The reporting engine 230 accesses the database 220 to obtain credibility data from which to derive the credibility scores and credibility reports for various entities. In some embodiments, the reporting engine 230 updates previously generated scores and reports when credibility scores and reports for an entity have been previously generated and credibility data has changed or new credibility data is available in the database 220. FIG. 6 illustrates some components of the reporting engine 230 for generating credibility scores and credibility reports in accordance with some embodiments. The reporting engine 230 includes data analyzer 610, natural language processing (NLP) engine 620, scoring engine 625, scoring filters 630, credibility scoring aggregator 640, and report generator 650. In some embodiments, the reporting engine 230 and its various components 610-650 are implemented as a set of scripts or machine implemented processes that execute sets of computer instructions.

i. Data Analyzer

The data analyzer 610 interfaces with the database 220 in order to obtain aggregated credibility data for one or more entities. As noted above, credibility data for a particular entity is stored to the database 220 using a unique identifier. Accordingly, the data analyzer 610 is provided with one or a list of unique identifiers for which credibility scores and reports are to be generated. The list of unique identifiers may be provided by a system administrator or may be generated on-the-fly based on requests that are submitted through the interface portal. The data analyzer 610 uses the unique identifiers to retrieve the associated data from the database 220.

Once credibility data for a particular entity is retrieved from the database 220, the data analyzer 610 analyzes that credibility data to identify qualitative credibility data from quantitative credibility data. As earlier noted, credibility data may include both qualitative and quantitative credibility data. In such cases, the data analyzer 610 segments the credibility data to separate the qualitative data portions from the quantitative data portions.

The data analyzer 610 uses pattern matching techniques and character analysis to differentiate the qualitative credibility data from the quantitative credibility data. Qualitative credibility data includes data that is not described in terms of quantities, not numerically measured, or is subjective. Text based reviews and comments obtained from sites such as www.yelp.com and www.citysearch.com are examples of qualitative data. Accordingly, the data analyzer 610 identifies such text based reviews and classifies them as qualitative credibility data. The data analyzer 610 passes identified qualitative data to the NLP engine 620 and the scoring engine 625 for conversion into quantitative measures.

Conversely, quantitative data includes data that is described in terms of quantities, is quantifiably measured, or is objective. A credit score, rating, or rankings that are confined to a bounded scale (0-5 stars) are examples of quantitative data. Accordingly, the data analyzer 610 identifies these scores, ratings, and rankings as quantitative credibility data. The data analyzer 610 passes identified quantitative data to the scoring filters 630.

ii. NLP Engine

In some embodiments, the NLP engine 620 performs relationship identification on qualitative credibility data. Specifically, the NLP engine 620 identifies relationships between (i) textual quantifiers and (ii) modified objects.

In some embodiments, a textual quantifier includes adjectives or other words, phrases, and symbols from which quantitative measures can be derived. This includes words, phrases, or symbols that connote some degree of positivity or negativity. The following set of words connotes similar meaning albeit with different degrees: "good", "very good", "great", "excellent", and "best ever". Textual quantifiers also include adjectives for which different degree equivalents may or may not exist, such as: "helpful", "knowledgeable", "respectful", "courteous", "expensive", "broken", and "forgetful". The above listings are an exemplary set of textual quantifiers and are not intended to be an exhaustive listing. A full listing of textual quantifiers is stored to a database that is accessed by the NLP engine 620. In this manner, the NLP engine 620 can scale to identify new and different textual quantifiers as needed.

In some embodiments, a modified object includes words, phrases, or symbols that pertain to some aspect of an entity and that are modified by one or more textual quantifiers. In other words, the modified objects provide context to the textual quantifiers. For example, the statement "my overall experience at the Acme Store was good, but the service was bad" contains two textual quantifiers "good" and "bad" and two modified objects "overall experience" and "service". The first modified object "overall experience" is modified by the textual quantifier "good". The second modified object "service" is modified by the textual quantifier "bad". In some embodiments, a full listing of modified objects is stored in a database that is accessed by the NLP engine. Additionally, grammatical rules and other modified object identification rules may be stored to the database and used by the NLP engine to identify the objects that are modified by various textual quantifiers.

Figure 7:
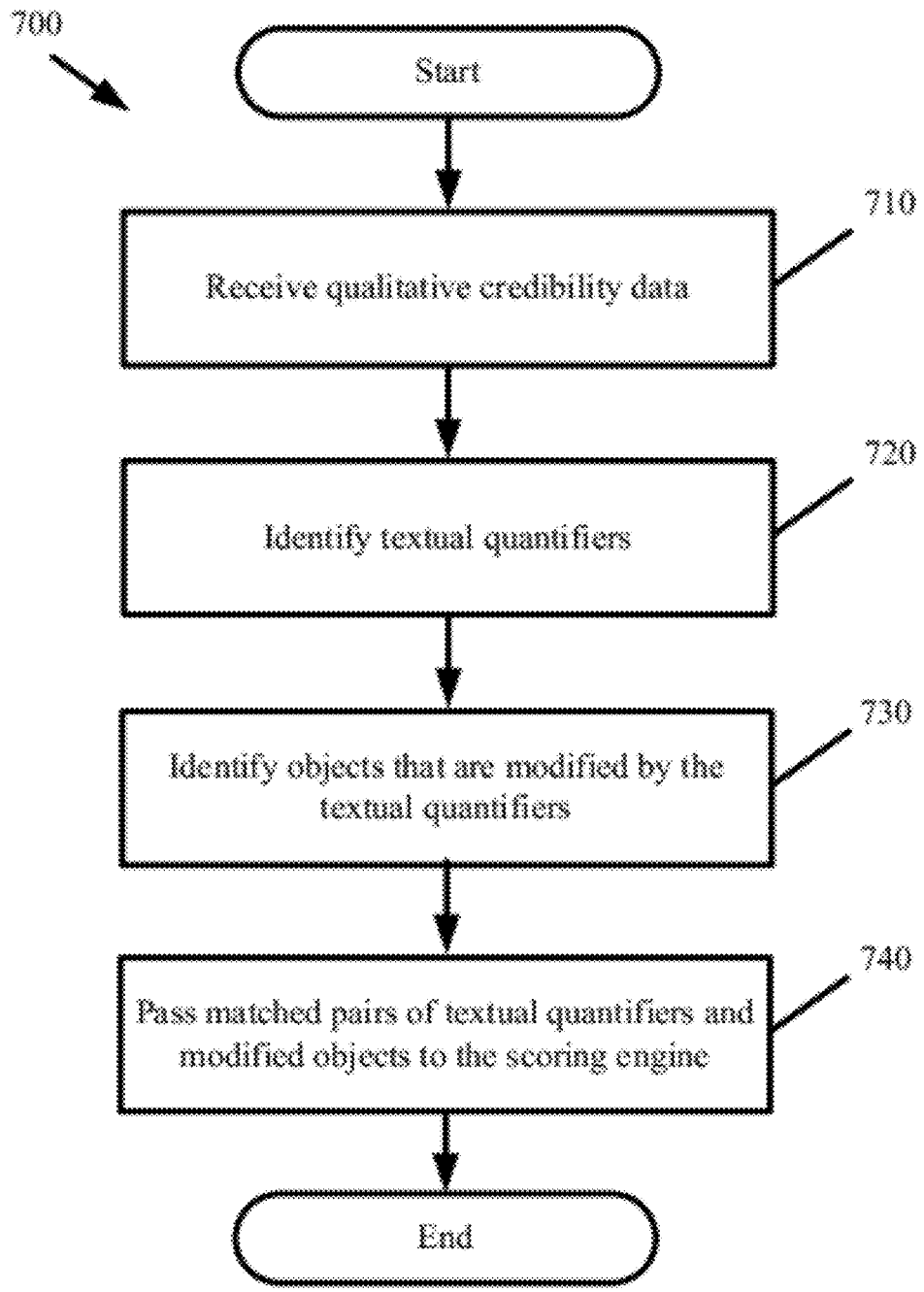
FIG. 7 presents a process performed by the NLP engine for identifying relationships between textual quantifiers and modified objects in accordance with some embodiments.

FIG. 7 presents a process 700 performed by the NLP engine 620 for identifying relationships between textual quantifiers and modified objects in accordance with some embodiments. The process 700 begins when the NLP engine 620 receives (at 710) qualitative credibility data from the data analyzer 610. The process performs an initial pass through the credibility data to identify (at 720) the textual quantifiers therein. During a second pass through, the process attempts to identify (at 730) a modified object for each of the textual quantifiers. Unmatched textual quantifiers or textual quantifiers that match to an object that does not relate to some aspect of an entity are discarded. Matched pairs are passed (at 740) to the scoring engine 625 for conversion into quantitative measures and the process 700 ends. It should be apparent that other natural language processing may be performed over the qualitative credibility data in order to facilitate the derivation of quantitative measures from such data and that other such processing may be utilized by the NLP engine 620.

Figure 8:
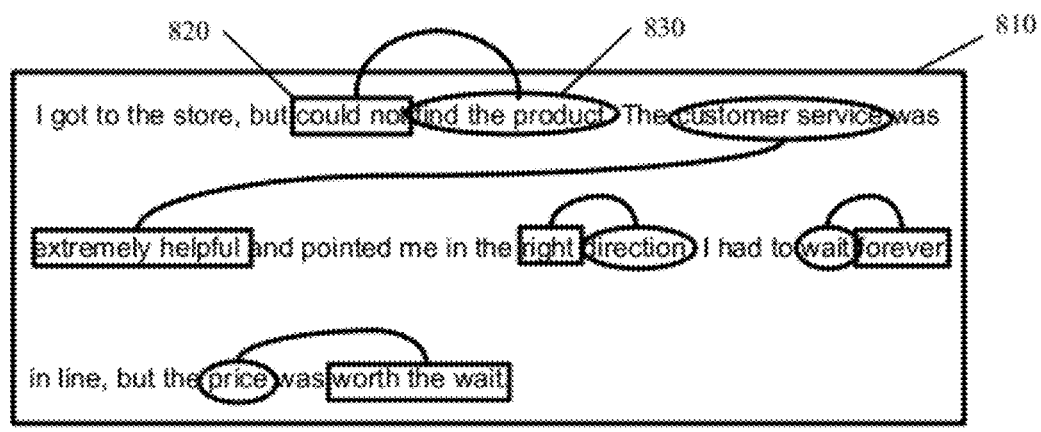
FIG. 8 illustrates identifying textual quantifier and modified object pairs in accordance with some embodiments.

FIG. 8 illustrates identifying textual quantifier and modified object pairs in accordance with some embodiments. The figure illustrates qualitative credibility data 810 in the form of a business review. The review textually describes various user experiences at a business. When passed to the NLP engine 620 for processing, the textual quantifiers and modified objects of the credibility data are identified. In this figure, the textual quantifiers are indicated using the rectangular boxes (e.g., 820) and the modified objects (e.g., 830) are identified with circles.

iii. Scoring Engine

Figure 9:
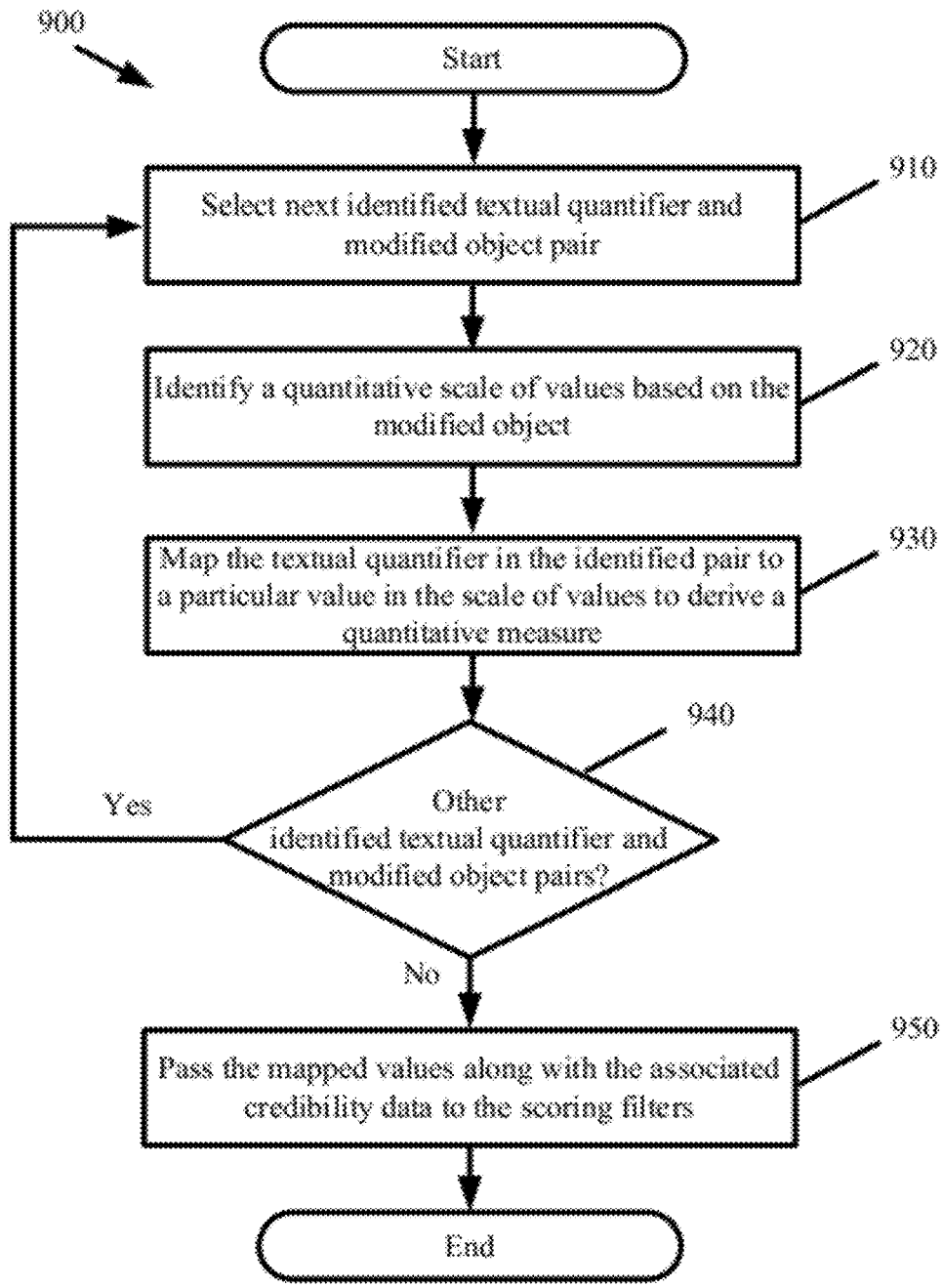
FIG. 9 presents a process for deriving quantitative measures from qualitative credibility data in accordance with some embodiments.

The NLP engine 620 passes the matched pairs of textual quantifiers and modified objects to the scoring engine 625. The scoring engine 625 converts each pair to a quantitative measure. FIG. 9 presents a process 900 for deriving quantitative measures from qualitative credibility data in accordance with some embodiments. The process 900 begins when the scoring engine 625 receives from the NLP engine 620 qualitative credibility data with identified pairs of textual quantifiers and modified objects.

The process selects (at 910) a first identified textual quantifier and modified object pair. Based on the modified object of the selected pair, the process identifies (at 920) a quantitative scale of values. In some embodiments, the scale of values determines a weight that is attributed to the particular modified object. Some modified objects are weighted more heavily than others in order to have greater impact on the credibility score. For example, from the statement "my overall experience at the Acme Store was good, but the service was bad", the modified object "overall experience" is weighted more heavily than the modified object "service", because "service" relates to one aspect of the business' credibility, whereas "overall experience" relates to the business credibility as a whole. In some embodiments, the process uses the modified object as an index or hash into a table that identifies the corresponding scale of values associated with that modified object.

Next, the process maps (at 930) the textual quantifier from the identified pair to a particular value in the identified scale of values to derive a quantitative measure. In some embodiments, the mapping is performed in conjunction with a conversion formula that outputs a particular value when the textual quantifier and a scale of values are provided as inputs. In some other embodiments, the textual quantifier maps to a first value that is then adjusted according to the scale of values identified by the modified object. For example, the textual quantifiers "good", "very good", "great", "excellent", and "best ever" map to values of 6, 7, 8, 9, and 10 respectively in an unadjusted scale of 0-10. A modified object that is paired with the textual quantifier "great" may identify a scale of value ranging from 0-100. Accordingly, the value associated with the textual quantifier (i.e., 8) is adjusted per the identified scale to a value of 80.

The process determines (at 940) whether there are other identified textual quantifier and modified object pairs associated with the credibility data. If so, the process reverts to step 910 and selects the next pair. Otherwise, the process passes (at 950) the mapped values along with the associated credibility data to the scoring filters 630 and the process 900 ends.

Figure 10:
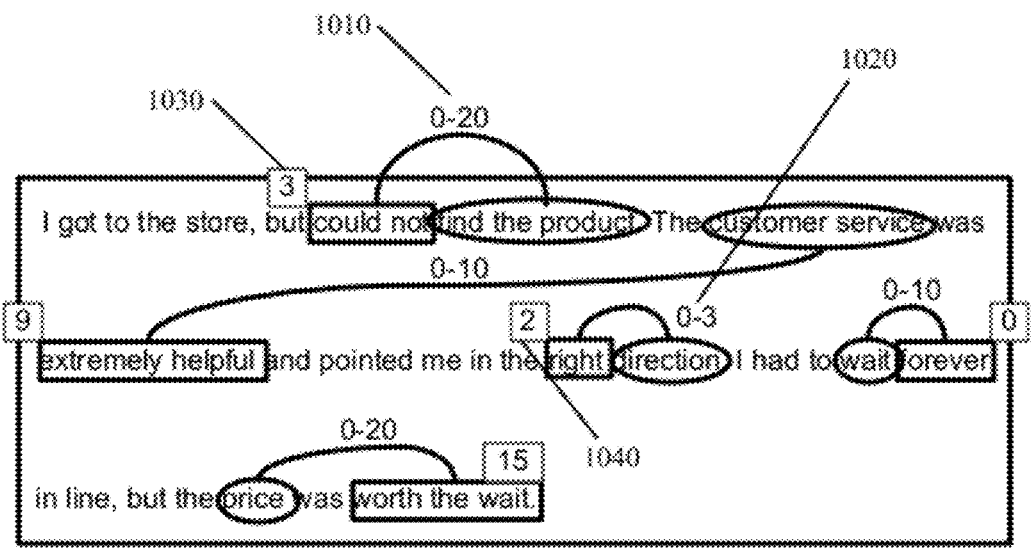
FIG. 10 illustrates mapping identified textual quantifier and modified object pairs to a particular value in a scale of values in accordance with some embodiments.

FIG. 10 illustrates mapping matched textual quantifier and modified object pairs to a particular value in a scale of values in accordance with some embodiments. As shown, for each identified textual quantifier and modified object pair, a scale of values (e.g., 1010 and 1020) is identified to represent the relative weight or importance of that modified object to the overall credibility score. For example, the scale of values 1010 ranges from 0-20 and the range of values 1020 ranges from 0-3. This indicates that the modified object that is associated with the scale of values 1010 is weighted more heavily in the credibility score than the modified object that is associated with the scale of values 1020. The textual quantifier for each identified pair is then mapped to a particular value in the scale of values (e.g., 1030 and 1040). In light of the present description, it should be apparent that the presented scales are for exemplary purposes and that the scoring engine 625 may utilize different scales for different modified objects.

In some embodiments, the reporting engine 230 monitors relationships between quantitative data and qualitative data to promote self-learning and adaptive scoring. Credibility data sources often provide a quantitative score that ranks or rates a business on some quantitative scale (e.g., 0-5 stars) and an associated set of qualitative data that comments on or explains the quantitative score. Based on the relationship between the quantitative data and the qualitative data, the reporting engine 230 of some embodiments adaptively adjusts how quantitative measures are derived from qualitative data. Specifically, the reporting engine 230 adjusts (i) the scale of values provided to certain modified objects found in qualitative data and (ii) the value that is selected in a scale of values for a particular textual quantifier that is associated with a modified object. For example, when a quantitative score of 5 out of 5 appears 75% of the time with qualitative data that includes the textual quantifier "good" and a quantitative score of 3 out of 5 appears 80% of the time with qualitative data that includes the textual quantifier "fine", then the reporting engine 230 learns from these relationships to increase the quantifiable value for the "good" textual quantifier and decrease the quantifiable value for the "fine" textual quantifier.

In some embodiments, the reporting engine 230 monitors relationships between the various textual quantifiers and modified objects in the qualitative data to promote self-learning and adaptive scoring. Specifically, the reporting engine 230 adjusts the scale of values associated with a particular modified object based on the frequency with which that modified object appears in the qualitative data. Similarly, the reporting engine 230 can adjust the selected value associated with a particular textual quantifier based on the frequency with which that textual quantifier appears in the qualitative data. These frequency measurement can be made on an individual entity basis, on an entity sub-classification (e.g., fast food restaurant, fine dining restaurant, and family restaurant), or on a field of business basis (e.g., restaurants, clothing stores, and electronic stores). For example, when the phrase "the food was" appears in 75% of user reviews that are associated with a particular business entity and the phrase "the waiter was" appears in 10% of user reviews that are associated with that particular business entity, then the reporting engine 230 can provide greater weight to the scale of values that is associated with the modified object "food" than the scale of values that is associated with the modified object "waiter". In this manner, the credibility score derived from the qualitative data can better account for those factors that users frequently comment on while reducing the impact that other rarely mentioned factors have on the credibility score.

In summary, the scale of values for certain modified objects and the selected value from the scale of values for the associated textual quantifier can be adaptively adjusted based on the correspondence between quantitative data that is associated with qualitative data and based on the relative frequency that a particular textual quantifier or modified object is used with reference to a particular entity, sub-classification of an entity, or field-of-business.

iv. Scoring Filters

In some embodiments, the scoring filters 630 filter the quantitative measures and the credibility data before producing the credibility score. In some embodiments, the scoring filters 630 include executable processes that incorporate different pattern matching criteria to identify which quantitative measures or which credibility data to filter based on what conditions. Each scoring filter may be specific to one or more types of credibility data. As such, the scoring filters are selectively applied to the credibility data based on the type of credibility data.

Figure 11:
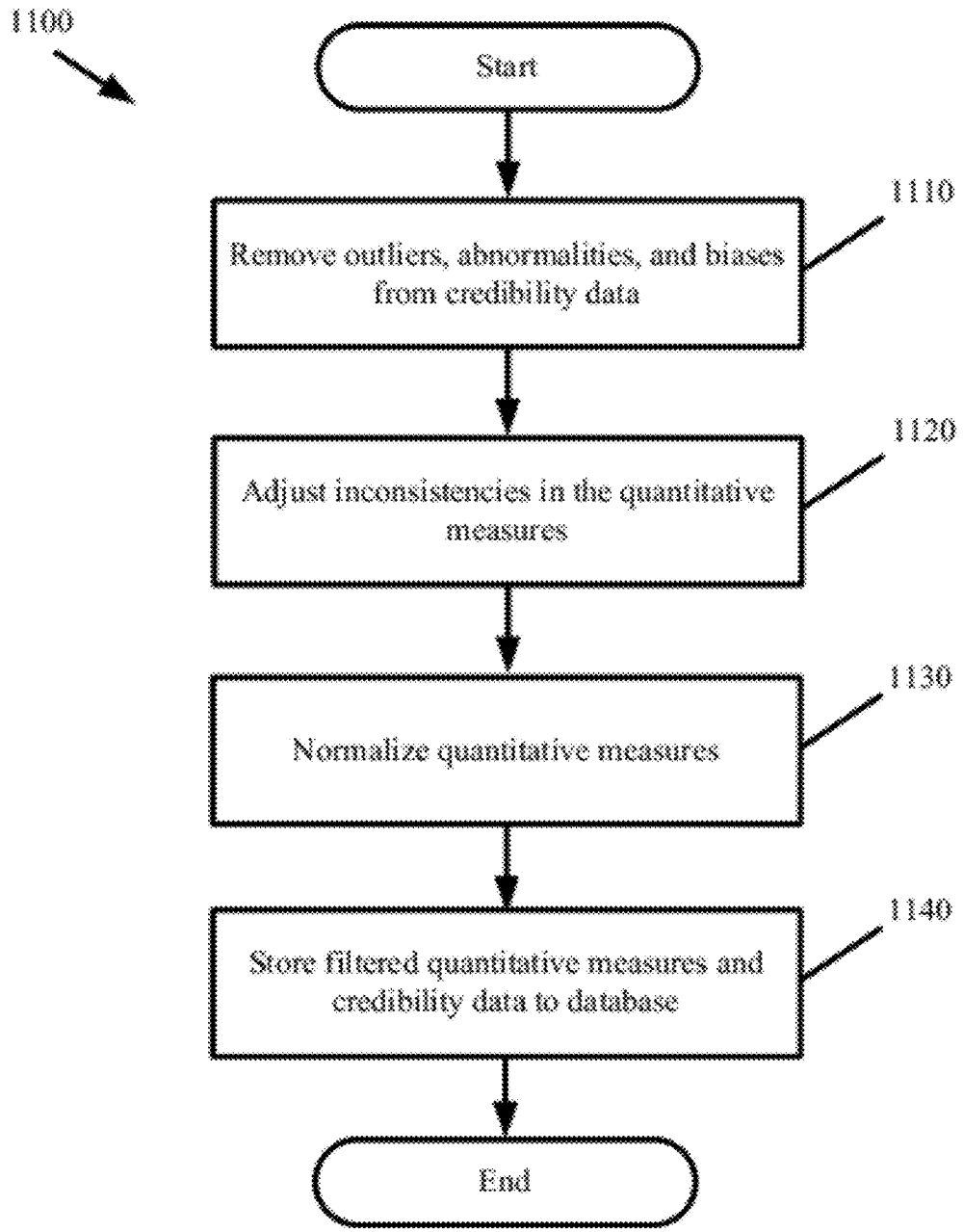
FIG. 11 presents a process performed by the scoring filters to filter the quantitative measures and credibility data in accordance with some embodiments.

FIG. 11 presents a process 1100 performed by the scoring filters 630 to filter the quantitative measures and credibility data in accordance with some embodiments. The process begins by using a set of filters to remove (at 1110) quantitative measures obtained from outlying, abnormal, and biased credibility data. This includes removing quantitative measures that originate from credibility data that is irrelevant to the entity at issue. For example, removing a quantitative measure that originates from credibility data that states various complaints with regards to difficulty in setting up equipment purchased from a particular entity when setting up the equipment is unrelated to the goods and services offered by the particular entity. Other filters may be defined to analyze credibility data in conjunction with information about the party submitting the review. For example, a filter may be defined that analyzes demographic information in association with credibility data. This is useful when an entity is geared towards specific clientele and the party submitting the review does not fall into that classification of clientele. Accordingly, a scoring filter can be defined to remove such quantitative measures. Other quantitative measures from anonymous reviewers or credibility data that relates to extreme cases or irregular events can also be removed.

Next, the process uses a set of filters to adjust (at 1120) inconsistencies in the quantitative measures for the remaining credibility data. For example, different reviewers may each give a particular entity a three out of five rating, but in the associated comments a first reviewer may provide positive feedback while a second reviewer may provide negative feedback. In such cases, filters can be defined to increase the quantitative measure provided by the first reviewer based on the positive feedback and decrease the quantitative measure provided by the second reviewer based on the negative feedback.

The process uses a set of filters to normalize (at 1130) the quantitative measures for the remaining credibility data. Normalization includes adjusting the scaling of quantitative measures. In some embodiments, the quantitative measures for qualitative credibility data that are derived by the scoring engine 625 will not require normalization. However, quantitative measures originating from quantitative credibility data may require normalization. For instance, quantitative measures of quantitative credibility data obtained from a first data source (e.g., www.yelp.com) may include a rating that is out of five stars and quantitative measures of quantitative credibility data obtained from a second data source (e.g., www.zagat.com) may include a point scale of 0-30 points. In some embodiments, the process normalizes these quantitative measures to a uniform scale of values (e.g., 0-100). In some other embodiments, the process normalizes these quantitative measures with disproportionate weighting such that quantitative measures obtained from credibility data of a more trusted data source are provided more weight than quantitative measures obtained from credibility data of a less trusted data source. Disproportionate weighting is also used to limit the impact stale credibility data has over the credibility score. Specifically, quantitative measures from older credibility data are normalized with less weighting than quantitative measure from newer credibility data. Different scoring filters may be defined to implement these and other weighting criteria.

The process stores (at 1140) the filtered quantitative measures data to the database 220 and the process ends. In some embodiments, the process directly passes the filtered quantitative measures to the credibility scoring aggregator 640 of the reporting engine 230.

v. Credibility Scoring Aggregator

The credibility scoring aggregator 640 produces a credibility score for a particular entity based on normalized quantitative measures for that particular entity. In some embodiments, the credibility score is a numerical value that is bounded in a range that represents a lack of credibility at one end and full credibility at another end, where credibility accounts for successes of various business practices, customer satisfaction, performance relative to competitors, growth potential, etc. In some embodiments, the credibility score may be encoded to specify different credibility aspects with different digits. For example, the first three digits of a six digit score specify a business credit score and the last three digits of the six digit score specify the credibility score. In some embodiments, the credibility score is a set of scores with each score representing a different component of credibility. For example, the credibility score may comprise a credit score, a review score, and a rating score where the review score is compiled from quantitative measures derived from the aggregated qualitative data and the rating score is compiled from the normalized quantitative measures within the aggregated quantitative data. It should be apparent to one of ordinary skill in the art that the credibility score can be formatted in any number of other ways, such as a set of formatted characters or as a set of formatted alphanumeric characters.

To produce the credibility score, the credibility scoring aggregator 640 aggregates any filtered and normalized quantitative measures for a particular entity from the database 220 or from the scoring filters 630. The credibility scoring aggregator 640 then uses one or more proprietary algorithms to factor together the quantitative measures to produce the credibility score. This may include averaging, summing, or using proprietary formulas to produce the credibility score from the aggregated set of quantitative measures. These algorithms allow for a credibility score to be computed with any number of available quantitative measures. The produced credibility score is then stored back to the database 220 where it is associated with the particular entity.

From the interface portal 240 of FIG. 2, entities can access and view their credibility score. In some embodiments, the credibility score is updated and presented in real-time. In some embodiments, the credibility score is a tangible asset that entities purchase before being provided access to the credibility score. Entities can purchase a onetime viewing of the credibility score or can purchase a subscription plan that allows them to view their credibility score anytime during a particular subscription cycle (e.g., monthly, yearly, etc.). Entities can also purchase access to the credibility scores of other entities that they may be interested in doing business with or to see a competitor's credibility.

vi. Report Generator

The report generator 650 operates in conjunction with the credibility scoring aggregator 640. In some embodiments, the report generator 650 is tasked with (1) producing reports that detail how the credibility of different entities is derived, (2) organizing aggregated credibility data, derived credibility data, and referenced credibility data pertaining to an entity, and (3) organizing ancillary data for informative and descriptive identification of the entity. Such data is aggregated by the master data manager 220. As will be described below, credibility data and other ancillary informative or descriptive data may include maps, news, identification information, financial data, photos, videos, social network content, and network partnerships associated with the entity. All such data serves as supplemental credibility data that creates a holistic and multi-dimensional view of the credibility.

In some embodiments, the credibility report is a data structure that is stored to the database 220 of FIG. 2. Organizing the aggregated data includes grouping related credibility data into different datasets that represent different dimensions of credibility. For example, grouping qualitative data that is used to derive a review score to a first dataset that represents a first dimension of credibility, grouping quantitative credibility data that is used to derive a rating score into a second dataset that represents a second dimension, and grouping social network content to a third dataset that represents a third dimension of credibility. In some embodiments, a single dataset may be used to represent two or more dimensions of credibility. For example, qualitative data grouped to a dataset may be associated with a credibility scoring dimension and a rating dimension.

Instead of storing all data to the data structure of the credibility report, some of the data for the credibility report may be obtained on-the-fly from a data source partner. In such cases, the report generator 650 inserts a reference into the creditability report where the reference is a URL, hyperlink, or other network identifier usable to obtain desired information from the data source partner over a network (i.e., Internet). For example, the reference may include a URL that links to a map identifying the location of an entity where the map is hosted by a third party mapping service. In some embodiments, the reference includes access parameters in addition to the reference in order to obtain particular data from a third party or remote data source. The access parameters may include registration or login information, data values, queries, or inputs to be used with the reference when obtaining information from the third party or remote data source. In the mapping example above, the access parameters may include a street address that is passed as part of the URL query string to the third party mapping service. The access parameters may further include scripts (e.g., JavaScript) that are executed when the remote data source is contacted or when the data is retrieved from the third party or remote data source.

In some embodiments, the credibility report is hierarchically structured. In this manner, access to the credibility report data can be restricted based on access rights associated with each hierarchical layer. Data grouped to a first hierarchical layer may be accessible by all parties and may include summary or high level information. Data grouped to a second hierarchical layer or lower hierarchical layer may include more restrictive access rights to allow the system operator to monetize the presentation of this data through the interface portal. Access restrictions may be specified by the credibility system operator (i.e., interface portal operator), the entity to which the data pertains, or by a set of defined access restriction rules that enumerate what credibility data is assigned to what access restriction level. For example, access restriction rules may be defined whereby the overall credibility score for each entity is assigned a first access restriction level that is accessible by all other entities and component scores (e.g., a review credibility score and a rating credibility score) are assigned a second access restriction level that is accessible by other entities that paid for greater levels of access.

In some embodiments, the report generator 650 provides various interactive tools at different hierarchical layers of the credibility report to allow different entities the ability to edit, reorganize, or otherwise manage the data that is grouped at that hierarchical layer. The tools may include (1) a graphical element for presentation by the interface portal and interaction with at least a graphical pointing tool or keyboard and (2) an Application Programming Interface (API) function call, sub-routine, script, or system call that implements the tool functionality. Some of these various tools are described below.

Entity identification information such as the name, unique identifier (e.g., DUNS® number, employer identification number, etc.), address, etc. is also stored to the credibility report. This information is included so that different query strings and search terms can be used to locate and identify the appropriate credibility report.

Once a credibility report is stored to the database 220, that credibility report can be updated by the report generator 650 as new credibility data becomes available. This may include changing credibility or other data that was previously stored to the credibility report data structure or changing previously stored references or access parameters that are used to obtain data from other data sources. In some embodiments, the report generator 650 may generate the credibility reports before they are accessed by entities or the report generator 650 may generate the credibility reports on-demand as they are requested by entities.

The credibility reports include sufficient data which when presented through the interface portal provide complete transparency into how the credibility for a particular entity is determined. By providing different presentations of the credibility report according to the hierarchical layers, different groupings of data, and different access restrictions, each credibility report can be monetized differently. More specifically, each credibility dimension and each hierarchical layer of credibility data within each credibility dimension can be converted into a tangible asset whose data can be separately monetized or freely distributed on a per entity or per access restriction basis. Entities access the credibility reports through the interface portal 240, though some embodiments present the data in the credibility reports using other mediums such as in writing or by telephone consultation.

D. Interface Portal

As noted above, the credibility scores and the data within the credibility reports can be accessed by any entity using the interface portal 240. The interface portal 240 generates various graphical and interactive interfaces such as a credibility directory or credibility review website based on the credibility reports. These interfaces can be presented using any browser or similar application that executes on a computing system or other electronic device such as a smartphone, tablet, notebook computer, or desktop computer. These interfaces serve as a single point of contact where an entity can obtain credibility information about itself or another entity.

i. Credibility Directory

Figure 12:
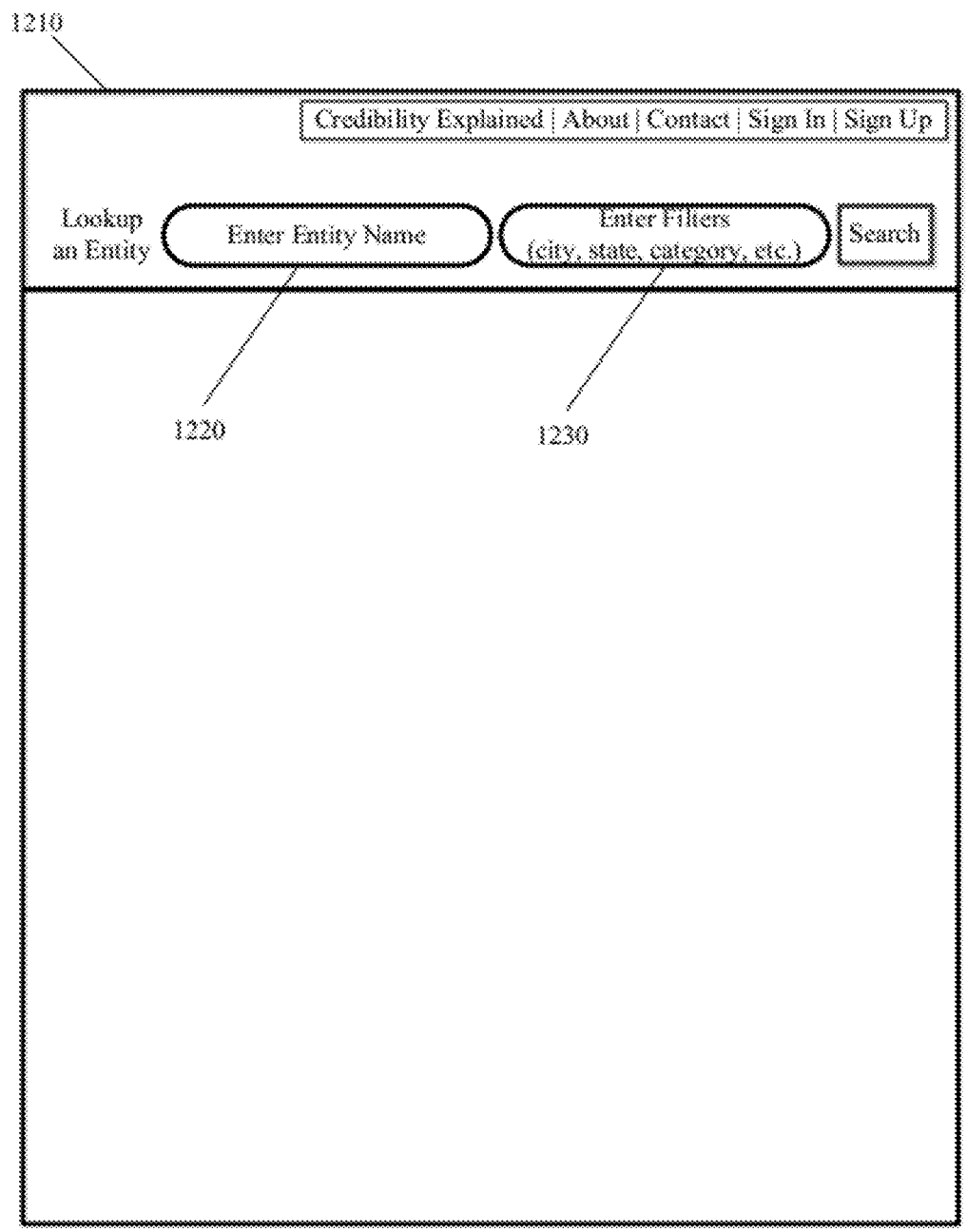
FIG. 12 presents a credibility directory interface in accordance with some embodiments.

In some embodiments, the credibility directory is a searchable interface to the database 220 that stores the generated credibility reports. In other words, the credibility directory is a searchable interface from which entities submit queries to identify credibility scores or credibility reports for one or more entities of interest. FIG. 12 presents a credibility directory interface 1210 in accordance with some embodiments.

As shown in FIG. 12, the credibility directory interface 1210 is a website that is displayed within a web browser application such as Microsoft®'s Internet Explorer® or Mozilla®'s Firefox®. In some embodiments, the credibility directory is a functional component that is part of an overall credibility website. For instance in FIG. 12, the interface 1210 to the credibility directory is presented near the top of the website as a header field. The header field may be static such that other content within the website may change based on user interactions and the interface 1210 to the credibility directory will not. In this manner, the credibility directory interface 1210 provides an always-on and available interface to search for different credibility scores or credibility reports.

The credibility directory interface 1210 includes at least a first text field 1220 and a second text field 1230 to specify search criteria for identifying an entity of interest. The first text field 1220 is for receiving primary entity identification information. The primary entity identification information may include a complete or partial entity name, phonetic entity name, or other identifier such as a DUNS number. The second text field 1230 is used to receive various filtering data to better identify the entity entered into the first text field 1220. The filtering data may include addressing, telephone numbers, URLs, and category of trade (e.g., restaurant, clothing, legal services, etc.). For example, two different business entities may exist with the same entity name, but a first such business entity is located in New York and a second such business entity is located in California. By receiving location or geographic filtering data in the second text field 1230, the credibility directory can more accurately identify which of the two business entities is desired.

The credibility directory interface 1210 passes the combined search criteria that are entered into the first text field 1220 and the second text field 1230 as a query string to the database 220. In some embodiments, the search criteria are a string of delimited text. For example, the primary entity identification information "Acme Store" and the filtering data "Los Angeles" is combined to generate the query string "<Acme Store><Location=Los Angeles>" that is passed to the database 220.

The database 220 utilizes the query string to identify zero or more entities and the credibility reports that are associated with the identified entities. When no entities are identified by the query string, a message indicating the lack of search results is presented to user submitting the search. When a single entity is identified or when a single entity is identified as matching to the search criteria by a specified threshold percentage, the interface portal 240 formats and presents the credibility report to the user as a dynamically generated website. When two or more entities are identified by the query string, the identification information for the identified entities (name, address, website URL, graphic or icon, etc.) are passed to the interface portal 240 for presentation as a selectable list to the user. The user can then select a desired entity from the selectable list in order to display the credibility report for the desired entity.

Figure 13:
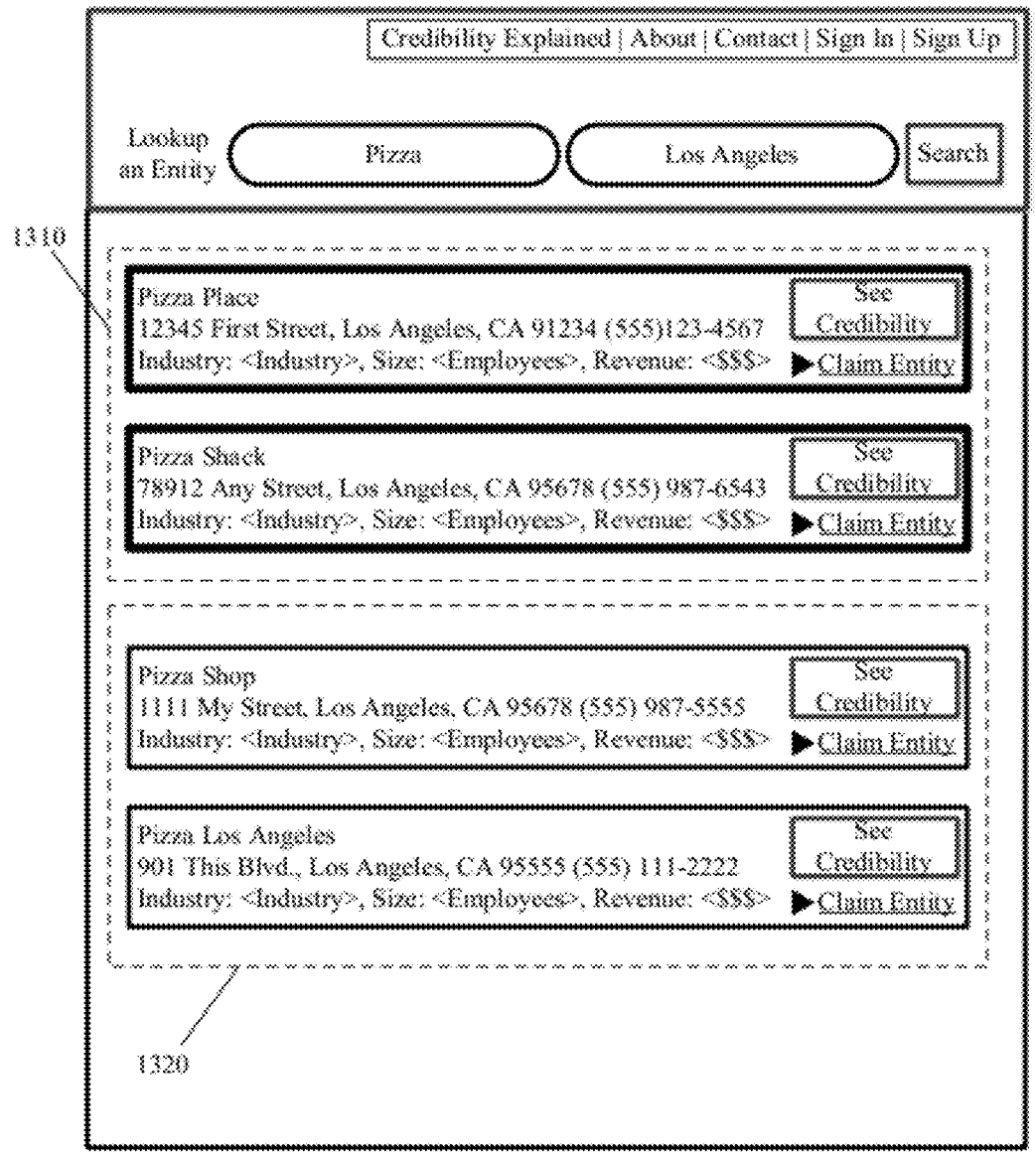
FIG. 13 illustrate using the credibility director interface to conduct a search that is narrowed based on a set of filters.

In some embodiments where multiple entities are identified based on the submitted search criteria, the interface portal orders the selectable list to present entities based on relevance to the submitted search criteria. In some other embodiments, the interface portal orders the selectable list to first present entities that have paid for a higher placement and then present entities that have not paid for a higher placement in the search results. For example in FIG. 13, a search is conducted for "Pizza" within the city of Los Angeles as the filtering data. Certain pizza restaurants can pay the credibility system operator to be listed first when the interface portal displays the search results. As shown in FIG. 13, listings 1310 are ordered before listings 1320, because the entities associated with the listings 1310 paid to have their listings be presented first. In some embodiments, the paid listings are delineated from the non-paid listings using bordering, shading, coloring, or other graphical demarcation.

Having a paid listing for a particular entity increases the exposure of that particular entity to others. In so doing, more individuals and businesses become familiar with the credibility of that particular entity, ultimately bringing more clientele to the particular entity when the credibility is sufficiently good. In some embodiments, the paid listings identify entities that were not returned as part of the user submitted query string, but that are related to the conducted search. For example, a search may be conducted for "Pizza", but one or more of the paid listings can be related to Italian restaurants.

ii. Credibility Review

As noted above, the interface portal dynamically generates a website for each entity based on the credibility report for that entity. This website is generated irrespective of whether the entity operates its own website on a different domain, at a different URL, or whether the entity has any online presence whatsoever. In this manner, the interface portal provides a central location from which any entity can view information, specifically credibility data, about any other entity without the entities having to incur the time, expense, and overhead in developing and maintaining that website. Moreover, many small businesses do not have the resources necessary to develop and maintain a website or a virtual store front. By allowing each particular business owner the ability (1) to take ownership of a dynamically generated website that corresponds to that particular business and (2) to modify some of the presented content therein, the interface portal removes various barriers that prevent small businesses from expanding their reach, thereby providing more equal opportunity for the small business to compete with larger businesses.

All such websites may be accessed from a single domain. In some embodiments, www.credibility.com serves as a URL from which to access the credibility directory and subsequently the generated credibility websites for different entities. The interface portal may address each entity website by appending different pathnames to the URL. For example, www.credibility.com/AcmeStore?1234 may be used to address the website for a particular entity named Acme Store where the delimiter "?" is followed by the unique identifier for a particular Acme Store. In some other embodiments, different addressing formats may be used to access the different dynamically generated websites.

Each particular entity website is dynamically generated based on credibility data from the credibility report that is associated with the particular entity. As earlier noted, the credibility data in each credibility report is aggregated from multiple different data sources such that the generated website provides a holistic and multi-dimensional view of the particular entity's credibility. In some embodiments, a first dimension of credibility is based on a credibility score derived from qualitative and quantitative credibility data, a second dimension of credibility is based on maps showing the entity's location, a third dimension of credibility is based on historical news about the entity, a fourth dimension of credibility is based on financial data about the entity, a fifth dimension of credibility is based on partners of the entity, a sixth dimension is based on social network feeds about the entity, a seventh dimension is based on comparative credibility analysis with other related entities. The credibility report for each entity includes at least two or more of these dimensions. Each dimension of credibility may further include one or more sub-dimensions. Each child sub-dimension for a parent dimension provides additional detail in the form of more granular credibility data or different groupings of credibility data from which the parent dimension of credibility is derived. It should be apparent to one of ordinary skill in the art that the holistic view of entity credibility presented using the credibility system of some embodiments may be based on other dimensions in addition to or instead of the above enumerated dimensions.

The interface portal therefore automatically generates websites that are unlike the websites that are generated by individual data sources such as www.yelp.com and www.citysearch.com, wherein these websites provide a limited and partial view of an entity's credibility based on limited credibility data that was created on that particular site (from user reviews or user ratings submitted to that particular site). Conversely, the websites generated by the interface portal provide a holistic view of entity credibility by factoring in credibility data from multiple independent data sources with each data source providing one or more dimensions of credibility thereby partially contributing to the overall derived credibility.

Moreover, some embodiments utilize one dimension of credibility to adjust another dimension of credibility. For example, the overall credibility score derived by the systems and methods described herein is a score that derived not only from quantitative data, but also qualitative data. This is unlike other credibility sites, such as www.yelp.com, that provide a quantitative score and qualitative data, where the quantitative score may be subjectively assigned by the submitting user with little direct derivation from the qualitative data. For example, a reviewer may provide a one out of five rating, but in the qualitative comments state that "everything was great except shipping was slow". As a result, the score and the qualitative data can be inconsistent on sites such as www.yelp.com and thereby confuse or mislead the user as to the actual credibility of the entity. The holistic presentation by the credibility interface portal inherently avoids any such inconsistencies as the qualitative data is a credibility dimension used in conjunction with the quantitative data when deriving the overall credibility score. Additionally, the holistic presentation prevents biased or abnormal credibility data from a single data source from having a disproportionate impact to the overall entity credibility. For example, a single reviewer that contributes to a particular data source can write multiple bad reviews about a particular entity thereby having a disproportionate impact on the credibility of that particular entity at that particular data source. By diversifying the derivation of entity credibility over multiple different data sources, the integrity of the credibility score and credibility data in the credibility reports is maintained. This also prevents any single data source from having complete control over the derived credibility. For example, an entity or data source is unable to populate its own site with only positive reviews while hiding negative reviews.

In some embodiments, the interface portal generates each dynamic website to conform to a shared structure. This promotes a degree of uniformity between the dynamically generated websites for different entities. The same or similar credibility data that is found on a website for a first entity can be found at or near a similar location on a different website for a second entity. Consequently, users spend less time having to search for desired content on the websites.

Figure 14:
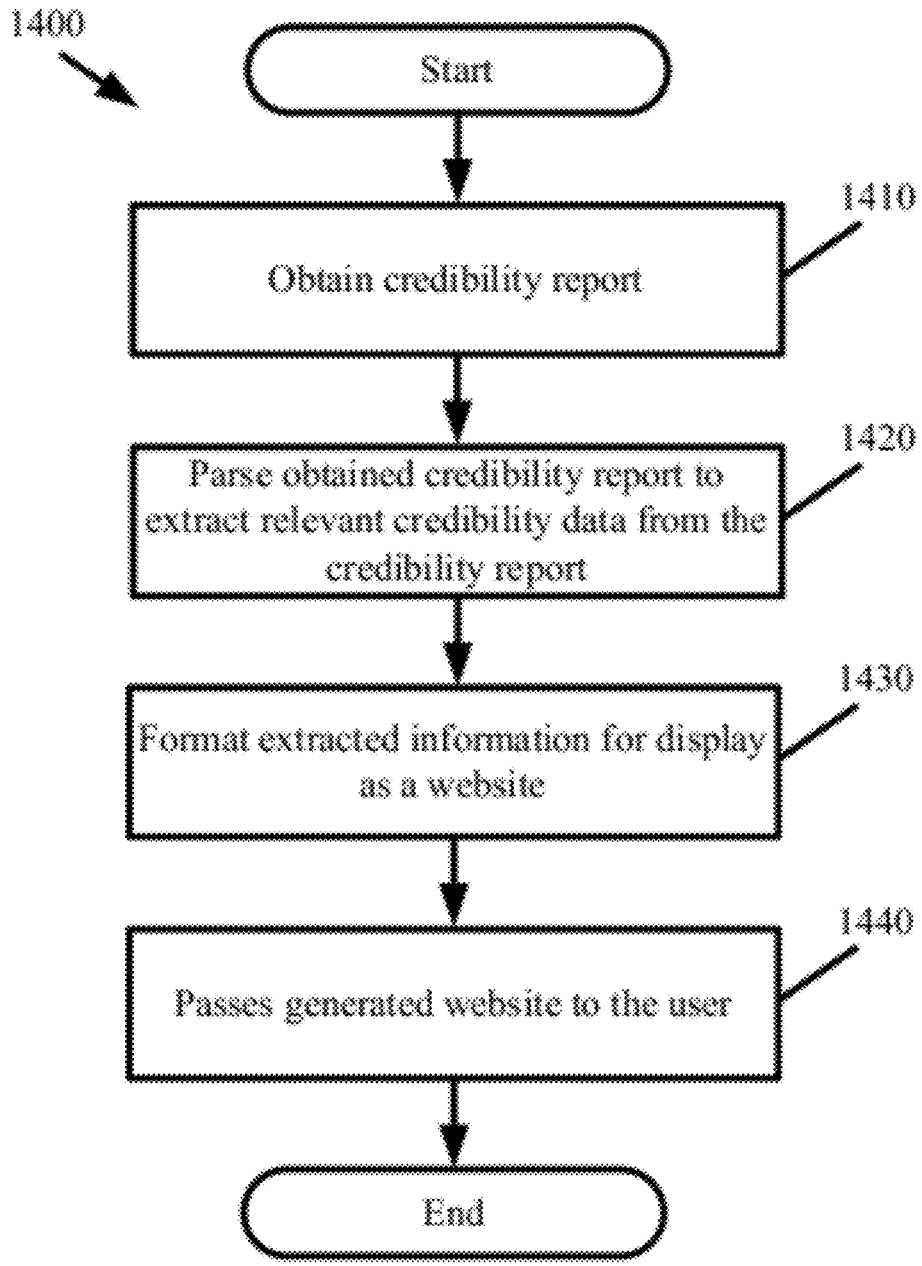
FIG. 14 presents a process performed by the CMS of the interface portal to dynamically generate the websites in accordance with some embodiments.

To dynamically generate the websites based on the credibility reports, the interface portal includes a content management system (CMS). FIG. 14 presents a process 1400 performed by the CMS of the interface portal to dynamically generate the websites in accordance with some embodiments. The process begins by obtaining (at 1410) a credibility report. In some embodiments, the CMS obtains the credibility report from the database 220 when requests are submitted using the credibility directory interface. The CMS is capable of obtaining multiple credibility reports in parallel based on different user submitted queries where each credibility report is presented to the appropriate user in a different dynamically generated website.

The process parses (at 1420) the obtained credibility report to extract relevant credibility data from the credibility report. This includes extracting summary information about the various dimensions of credibility and about the different components of credibility data that are used to derive the overall credibility score. Such information may be delimited in the credibility report with specific delimiters such as Extensible Markup Language (XML) tags. Other data within the credibility report can be ignored or presented in hierarchical layers via drill-down functionality, slider tools, etc. In some embodiments, extraction involves some degree of processing whereby the credibility data in the credibility report is processed in order to derive the summary information. For example, when the extracted data includes a set of scores, these scores may be processed to compute a single score that represents the set of scores.

The process formats (at 1430) the extracted information for display as a website. In some embodiments, formatting includes defining HyperText Markup Language (HTML) tags to present the extracted information according to a specified structure. Formatting may also include transforming extracted information to make the data presentable in the website. For example, converting a numeric value into a graphical representation such as a dial indicator or converting an image to the appropriate size and file type. Formatting may also include providing access restrictions to some data and not other data. The process passes (at 1440) the generated website to the requesting user and the process ends. In some embodiments, passing the website includes passing HyperText Transfer Protocol (HTTP) packets (e.g., POST packets) from the interface portal over a network to a client browser application.

Figure 15:
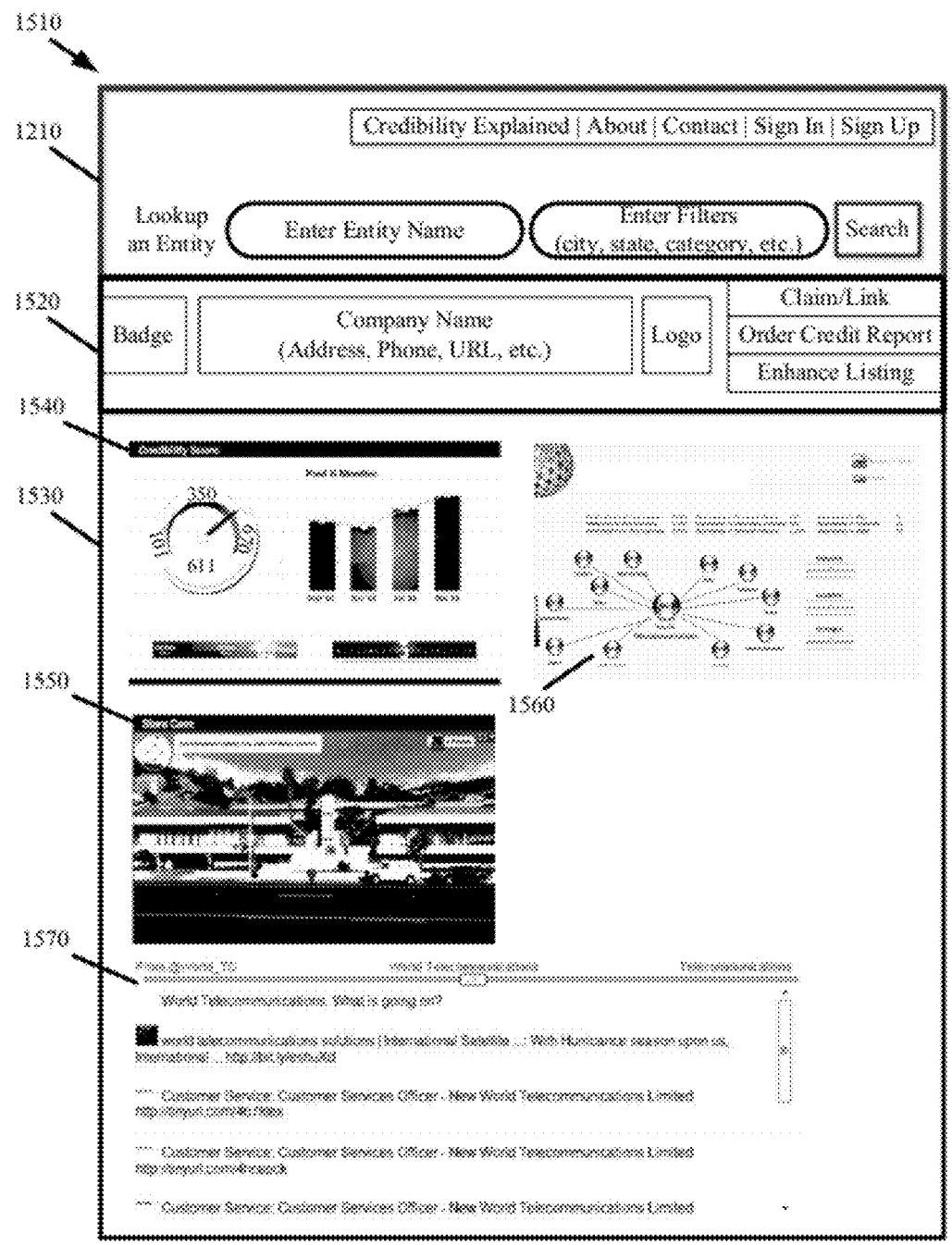
FIG. 15 illustrates a dynamically generated website based on a credibility report in accordance with some embodiments.

FIG. 15 illustrates a dynamically generated website 1510 based on a credibility report in accordance with some embodiments. The website 1510 includes the credibility directory interface 1210, a header field 1520 to present entity identification information, and a data report field 1530 to present various credibility data including, in some embodiments, credibility scoring 1540, creditworthiness data (not shown), multimedia geographic information 1550, partnership network 1560, and social network feeds 1570 that together present a holistic view of the entity's credibility.

The entity identification information in the header field 1520 is comprised of a set of fields that present the name, address, telephone number, company website, categorization information, and other information to uniquely identify the entity. In some embodiments, the categorization information specifies a field-of-business that the entity operates in, for example, electronics retail, automobile mechanic, or restaurant. The categories may include one or more sub-categories to further refine the field-of-business. For example, when the entity is categorized as a restaurant, a first sub-category can define the entity as a fast food restaurant, family restaurant, or fine dining restaurant and a second sub-category can define the type of food such as American, French, Asian, Mexican, etc. In some embodiments, the entity identification information can be pulled directly from the credibility report. In some other embodiments, the credibility report stores some or all of the entity identification information as a set of links. These links reference the actual entity identification information that is stored on one or more data sources and that is obtained through established partnership feeds with those data sources. For example, the categorization information may be obtained by accessing a Dun & Bradstreet database using a DUNs number that uniquely identifies an entity.

In some embodiments, the data report field 1530 presents credibility scoring 1540 such as an overall credibility score and/or component scores such as a rating score and a review score used in the overall derivation of the credibility score.

These scores 1540 summarize the credibility of an entity using one or more readily identifiable values that are derived based on credibility data including quantitative and qualitative data that are aggregated from the multiple data sources.

In some embodiments, the data report field 1530 further presents creditworthiness data (not shown in FIG. 15) such as credit information. This information can be directly pulled from the credibility report or can be obtained through links in the credibility report that reference established partnership feeds with other data sources such as Dun & Bradstreet, Experian®, TransUnion®, etc. that host the credit information.

In some embodiments, the data report field 1530 further presents multimedia geographic information 1550 to supplement the holistic credibility view of the entity. The multimedia geographic information 1550 presents an actual image or video of a business entity storefront. More specifically, the multimedia geographic information 1550 presents a street view image of the storefront that is static or an image that spans up to 360 degrees. Alternatively, a video may be presented to show recorded or live feeds of the business entity. The multimedia geographic information 1550 allows users to visually ascertain the condition of the business entity (e.g., rundown, clean, well-lit, etc.), the area in which the business entity is located, the street location, and whether the business entity actually exists. In many cases, these factors affect whether or not potential clientele will make the trip to one entity or another. These factors therefore contribute to the overall credibility of the entity. In some embodiments, the multimedia geographic information 1550 is stored and pulled directly from the credibility report. In some other embodiments, the credibility report contains reference links from which the multimedia geographic information 1550 is obtained using established partnership feeds with data sources such as Google Maps or Google Earth. The obtained images or videos are formatted for proper presentation in the website.

In some embodiments, the data report field 1530 further presents a partnership network 1560 that visually identifies partnerships of the entity. This includes first and second degree partners that are suppliers, purchasers, manufacturers, financiers, clients, and friends of the entity. Such information 1560 supplements the overall holistic credibility view of the entity by identifying who are the entity's primary and secondary contacts. Specifically, when partners of a first business entity include Fortune 500 companies and partners of a second business entity include financially unstable companies, then one can quickly and readily ascertain that the first business entity has better credibility than the second business entity and it is thus safer to engage in a transaction with the first business entity. Moreover, one can identify from these partnerships the source of goods and whether the components of the goods being sold are from high quality trusted partners or unreliable low-end partners. The partnership network data 1560 can be stored locally to the credibility system database or can be obtained remotely from one or more data sources such as www.linkedin.com.

In some embodiments, the data report field 1530 further presents social network feeds 1570 to provide a continuous and real-time feed as to what others are saying about an entity and what the entity is saying about itself. Others can report recent positive and negative experiences with the entity and, in so doing, provide a real-time account of the entity's credibility. Consequently, the entity is forced to stay vigilant and responsive to client experiences. Otherwise, a number of negative reviews in a relative short time span can detrimentally affect the credibility of the entity causing other potential clientele to go elsewhere. Similarly, a sufficient number of positive reviews in a relative short time span can improve the credibility of the entity and as a result sway potential clientele to the entity.

The entity can also leverage the social network feeds 1570 to have a real-time medium with which to report recent improvements, changes, upgrades, or promotions to potential clientele. In this manner, the entity is provided its own medium with which to improve upon its credibility. In some embodiments, the social network feeds 1570 are obtained from partnerships with data sources such as www.twitter.com and www.facebook.com. Accordingly, links and any necessary login information associated with accessing "tweets" or facebook status updates for a particular entity are incorporated into the appropriate credibility reports that are then used to populate the dynamically generated websites with the social network feeds 1570. Additional social network feeds may be generated locally using the interface portal. In some such embodiments, entities do not have to use third party services such as www.twitter.com to submit status updates. In some embodiments, social network feeds 1570 are aggregated from multiple different data sources including local data sources and are presented in a scrolling message box of the dynamically generated website.

When the social network feeds 1570 are combined with the other data described above 1540-1560, the dynamically generated credibility websites provide a holistic and comprehensive view of an entity's credibility. In some embodiments, these websites are referred to as credibility review sites, because of the ability to view at one time and on one screen different dimensions affecting an entity's overall credibility where each dimension is a compilation of quantitative credibility data, qualitative credibility data, and other related credibility data from multiple data sources that factor in some aspect to the credibility of the entity. In light of the foregoing description, it should be apparent to one of ordinary skill in the art that the credibility review websites can include additional dimensions of credibility data in addition to or instead of those described above.

Other credibility sites currently in the art, such as www.yelp.com, www.citysearch.com, www.twitter.com, and the like, provide an isolated one dimensional view of the business' credibility. As a result, credibility ascertained from these other sites is subject to rapid fluctuation, subject to inconsistencies, biased data, and insufficient data, thereby providing an incomplete and single dimensional view of the credibility as opposed to the holistic and comprehensive view provided by the credibility system of some embodiments.

Moreover, the dynamically generated credibility review websites provide each corresponding entity with an online presence without that entity spending the time and resources to develop that online presence. In some embodiments, management and editing functionality of the credibility review websites is provided to the corresponding entity. Specifically, an entity can contribute to its respective website by supplementing the website with additional credibility data or by identifying invalid or mismatched credibility data that should be corrected. Customizations are stored to the appropriate credibility report data structure such that subsequent presentation of the credibility review website will incorporate the entity submitted customizations. Customization functionality can be provided as a free service or as a pay service. In some embodiments, the entity is limited in the information that it can modify or add in order to preserve the integrity of the credibility data that is presented. For example, the entity can provide a personalized description of itself, its services, its goods, etc. that are incorporated and used instead of the default header field 1520. Additionally, the entity can supplement the multimedia geographic data 1550 with a live in-store video feed or more up-to-date photos of the entity. To preserve the integrity of the credibility data, the entity can report mismatched credibility data. However, the entity will be unable to remove the data without prior approval by a system administrator.

To customize its respective credibility review website, the entity first claims the website by registering with the credibility system to confirm that it is the entity that owns the website that is being claimed. During registration, the entity is authenticated to ensure that it is who it claims to be. Thereafter, the entity is provided access to controls that allow the entity to supplement or change the dynamically generated website of some embodiments. The changes are stored to the credibility report data structure such that subsequent viewing of the website for that particular entity will include the entity submitted changes.

iii. Credibility Modules

Rather than present the credibility data in the credibility review format described above with reference to FIG. 15, some embodiments of the interface portal partition and present each dimension affecting the overall credibility of an entity in different interactive stateful graphical elements referred to hereafter as "credibility modules". Each dimension of credibility that is represented by a credibility module is derived from a filtered subset of the credibility data that is aggregated from the various data sources and that is processed by the credibility system. In some embodiments, the credibility modules include an overall credibility module, a social media credibility module, a reviews credibility module, and a network credibility module.

The overall credibility module presents a summarized overview for the derivation of an entity's credibility and also provides drill-down functions to access different components composed of related groups of credibility data for detailing the derivation of the overall credibility. The social media credibility module focuses on the affect that social media has on an entity's credibility. In some embodiments, the social media credibility module provides a single location for monitoring credibility data that is obtained from social media sites. Drill-down functionality details the impact that different sets of social media related credibility data have on the social media dimension of an entity's credibility. The social media credibility module is primarily composed of qualitative credibility data that is aggregated by the credibility system. The reviews credibility module focuses on the affect that review sites have on an entity's credibility, wherein review sites differ from social media sites on the basis of the primary usage of the sites. Specifically, review sites, such as Yelp, CitySearch, and the like primarily serve to aggregate knowledge about different entities based on experiences that others have had with those entities. Social media sites, such as Facebook, Google+, and LinkedIn primarily serve as communication platforms that facilitate communication between different entities. Drill-down functionality details the impact that different sets of review related credibility data have on the review dimension of an entity's credibility. In some embodiments, the reviews credibility module provides an aggregate of user reviews and blog posts and is primarily composed of quantitative credibility data that is aggregated by the credibility system. The network credibility module focuses on the affect that online networking has on an entity's credibility. Drill-down functionality of this module enables business-to-business social networking for credibility reference, partnership formation, and lead generation. This module is primarily composed of supplemental credibility data that is aggregated by the credibility system. Collectively, these credibility modules holistically convey the overall credibility for an entity in a modular interactive fashion. It should be apparent that additional or alternative credibility modules may be presented through the interface portal.

Each credibility module is a software construct such as an application, script, etc. Each credibility module hierarchically arranges the credibility data that is used to derive a particular credibility dimension and graphically presents that credibility data with drill-down functionality to expose the different hierarchically arranged sets of the credibility data in an on-demand manner. The hierarchically arranged sets of credibility data are hereinafter referred to as different hierarchical layers. In this manner, an entity can better understand the derivation of overall credibility by visualizing each dimension affecting the overall credibility separately and by obtaining detailed credibility data for each such dimension as desired. Moreover, an entity can more easily understand its credibility by initially being provided (1) with a high-level overview of its credibility and (2) with tools that allow the entity to drill-down into a particular dimension of credibility in order to obtain more detailed credibility data used in the derivation of that particular dimension of credibility. In this manner, the credibility modules provide an intuitive means to navigate through an entity's credibility such that the entity's credibility can be understood in its simplest form or at varying degrees of complexity depending on user interactions with these interactive stateful graphical elements. Moreover, since each credibility module provides a different dimension of credibility and the collective set of credibility modules present credibility data that is aggregated from several different data sources, one can ascertain a complete and holistic understanding of the credibility for an entity from a single website, whereas before one would have to piece together this understanding by accessing each of the disparate data sources separately.

Zero or more graphical interactive elements are associated with each of credibility modules and presented at various hierarchical layers of the credibility modules. These interactive elements allow entities to interact with the credibility data in other ways besides accessing different drill-down hierarchical layers. Specifically, these interactive elements may be used to sort, organize, or manipulate the presented credibility data.

The credibility data associated with each hierarchical layer of each credibility module is stored in the credibility report. In some embodiments, the credibility report is formatted with various delimiters that identify which set of credibility data corresponds with which drill-down hierarchical layer of which credibility module. For example, the credibility report may be formatted with the following delimiter tags:

```
<CredModule:Credibility>
    <Level1:Score>
    DATA
        <Level2:SentimentScore>
        DATA
            <Level3:QuantScore>
            DATA
            </Level3:QuantScore>
        </Level2:SentimentScore>
        <Level2:PresenceScore>
        DATA
        </Level2:PresenceScore>
    </Level1:Score>
    <Level1:Visualization> ... </Level1:Visualization>
    <Level1:Updates> ... </Level1:Updates>
    <Level1:Actions> ... </Level1:Actions>
</CredModule:Credibility>
```

In the above example, each delimited set is denoted by the respective < > and </> pair. The first delimited pair <Cred- Module:Credibility> identifies which credibility module the underlying credibility data is associated with. As shown, there are multiple first hierarchical layers (e.g., Score, Visualization, Updates, and Actions) with credibility data that is presented when the associated credibility module is opened. From the "Score" first hierarchical layer, a user can access two different second hierarchical layers identified as "SentimentScore" and "PresenceScore". Each of these second hierarchical layers is associated with some presentable credibility data. Furthermore, when the "SentimentScore" hierarchical layer is accessed, the user will have the ability to drill down further into a third hierarchical layer identified as "QuantScore" that includes additional credibility data for explaining or providing more detail to the credibility data presented in the preceding hierarchical layer.

The above data structure is presented for exemplary purposes to describe a possible data structure for the credibility report and for how the credibility data in the credibility score is accessed by the interface portal for presentation through the various credibility modules of some embodiments. Therefore, it should be apparent to one of ordinary skill in the art that other data structure formats may similarly be used for storing the credibility data in the credibility reports and for associating that data with the various credibility modules.

In some embodiments, the drill-down hierarchical layers of the credibility report allow the credibility system operator a means with which to monetize the credibility data in the credibility reports. For example, the credibility data at a first drill-down hierarchical layer may be presented to any entity or user free of charge, but each drill-down layer that is accessible from that first drill-down hierarchical layer may require an access fee that the entity or user pays in order to access the credibility data at that drill-down hierarchical layer. To facilitate such pay-per-access functionality, the delimiters in the credibility report of some embodiments are modified with various parameters that specify the accessibility to the underlying data. For example, the delimiter <Level3:QuantScore> may be modified to <Level3:QuantScore:Access=X> where the "Access=X" parameter and parameter value determines who is permitted access to the underlying credibility data free of charge or whether the underlying data is accessible on a pay-per-access basis to those that purchase additional access permissions. In addition to or instead of pay-per-access, some embodiments provide subscription services that permit different entities with different subscriptions access to different hierarchical layers. For example, a first entity with a first subscription may be permitted access to a drill-down layer that provides detailed information about the derivation of a sentiment score and a presence score, but is unable to access additional drill-down layers. A second entity with a second subscription may be permitted to drill-down beyond the detailed information about the derivation of the sentiment score and the presence score in order to view the aggregated quantitative and qualitative credibility data used to derive the sentiment score and the presence score.

Figure 16:
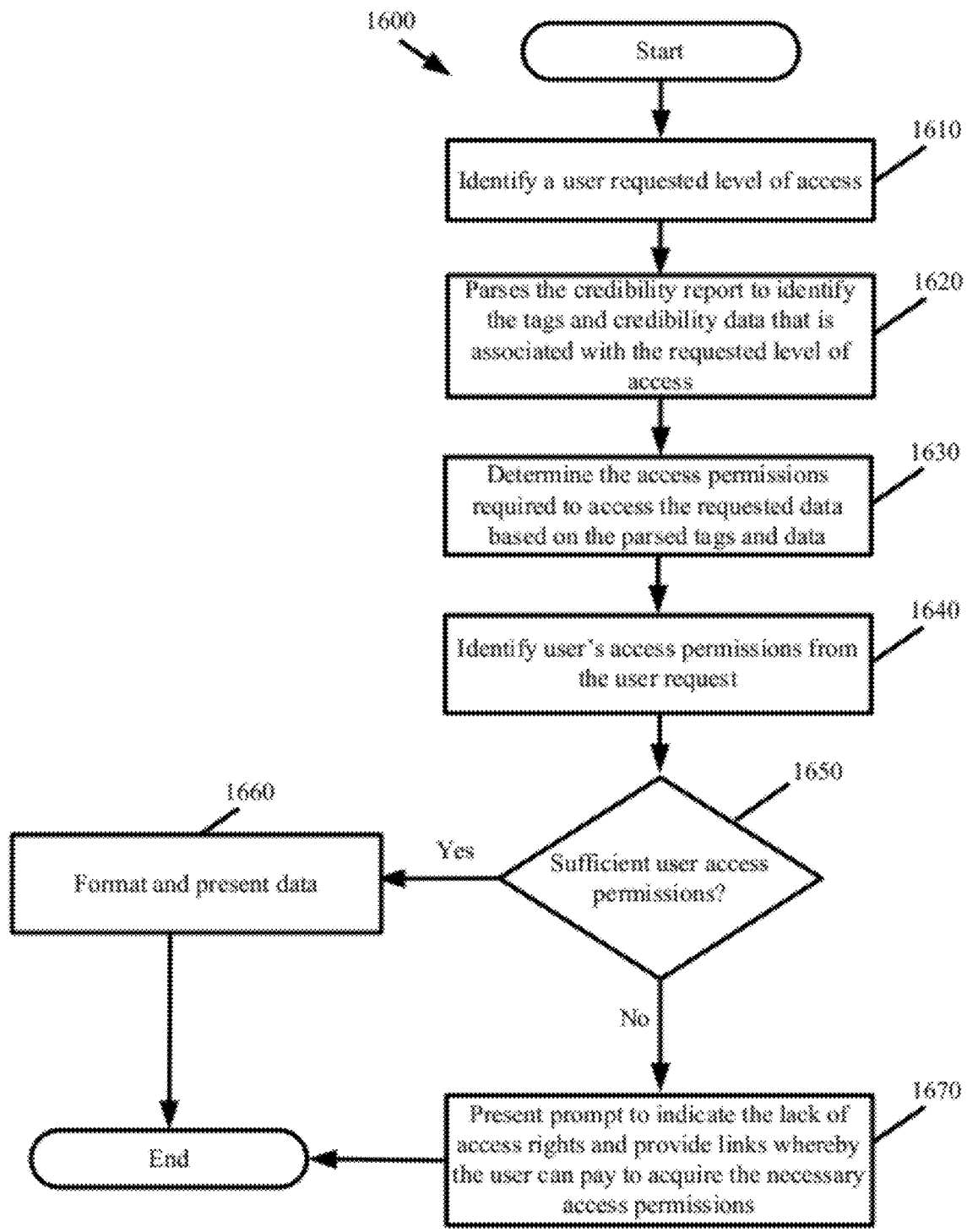
FIG. 16 presents a process performed by the interface portal of the credibility system to monetize access to the credibility data in accordance with some embodiments.

By restricting access to the various hierarchical layers of the credibility reports, the credibility system operator can, by association, monetize the access to the credibility data in the various hierarchical layers of the credibility modules. FIG. 16 presents a process 1600 performed by the interface portal of the credibility system to monetize access to the credibility data in accordance with some embodiments. The process is performed when a credibility report is first accessed and when a credibility module is interacted with. The process identifies (at 1610) an entity requested level of access. The request is based on the entity interacting with a credibility module whereby the interactions include accessing the credibility module or different hierarchical layers of credibility data within the credibility module. Based on the request, the process parses (at 1620) the credibility report to identify the tags and credibility data that is associated with the requested level of access.

The process determines (at 1630) the access permissions required to access the requested data based on the parsed tags and data. Next, the process identifies (at 1640) the entity's access permissions from the entity request. In some embodiments, each entity request is submitted along with entity identification information so that system access can be logged and monitored. When the entity's access permissions are sufficient (at 1650) to access the requested data, the data is formatted and presented (at 1660) to the entity. Otherwise, a prompt is presented (at 1670) to the entity indicating the lack of access rights and providing links whereby the entity can pay to acquire the necessary access permissions.

In addition to purchasing access to the credibility data, some embodiments of the credibility system can also be monetized by enhancing an entity's control over the credibility modules that contain credibility data for that entity. Specifically, the entity can pay to upgrade or enhance one or more such credibility modules. In some embodiments, the credibility modules or credibility review websites for different entities exist in one of three states: unclaimed, basic, or enhanced. The unclaimed state applies to credibility modules and credibility review websites that the appropriate entities have not taken ownership of. The basic state applies to credibility modules and credibility review websites that the appropriate entities have taken ownership of, but that have not paid for the capabilities to upgrade or enhance the associated credibility data. The enhanced state applies to credibility modules and credibility review websites that the appropriate entities have taken ownership of and for which fees have been paid in order to allow those entities the ability to upgrade or enhance the associated credibility data.

Specifically, the basic state and the enhanced state apply to entities that have registered with the credibility system. Once verified, login credentials are selected by the entity or are provided to the entity by the credibility system. At this time, the entity can also specify the access permissions it desires. Different access permission packages may be purchased. In one access permission package, the entity can obtain rights to enhance all application cubes associated with that entity. In other access permission packages, the entity can obtain rights to enhance individual application cubes. Certain credibility modules can be bundled together in different packages to lower the cost of purchasing access permissions to a desired set of credibility modules that the entity wishes to enhance or manage. Entities can at any time upgrade or downgrade their access permissions.

In some embodiments, enhancement of a credibility module by an entity involves altering the default presentation of the credibility data for that credibility module to create a custom presentation that is more preferable. Enhancements further include automatically identifying and providing the entity with suggestions on how to improve its credibility based on the credibility data that has been aggregated for that entity. Such enhancements may be provided in conjunction with various concierge services. These concierge services can provide suggestions on how an entity can improve its credibility, provide consulting or analysis regarding the credibility of the entity, or promote the entity by increasing the exposure of the entity. In some embodiments, different concierge services are available based on the access permissions obtained by the entity. For example, an entity can pay to obtain a first access permission that allows the entity to speak with a consultant that identifies areas where the credibility of the entity is weak. The entity can also pay to obtain a second access permission whereby the consultant takes over and manages the credibility for the entity by making necessary changes that can help to improve the credibility of that entity. Enhancements further include providing the entity with the ability to directly respond to presented credibility data including the ability to reply to a third party review and retweet a Twitter tweet. Enhancements further include the ability to modify the presented credibility data whereby some negative content, mismatched, biased, or other incorrect data may be hidden. Other enhancements include the ability to insert custom credibility data or other data. For example, the entity can supplement the credibility report content with graphics, images, videos (live in-store feeds), identification information, promotions, etc. Still other enhancements include the ability to connect (obtain contact information such as email addresses) with other related entities and form new partnerships with those entities.

Figure 17:
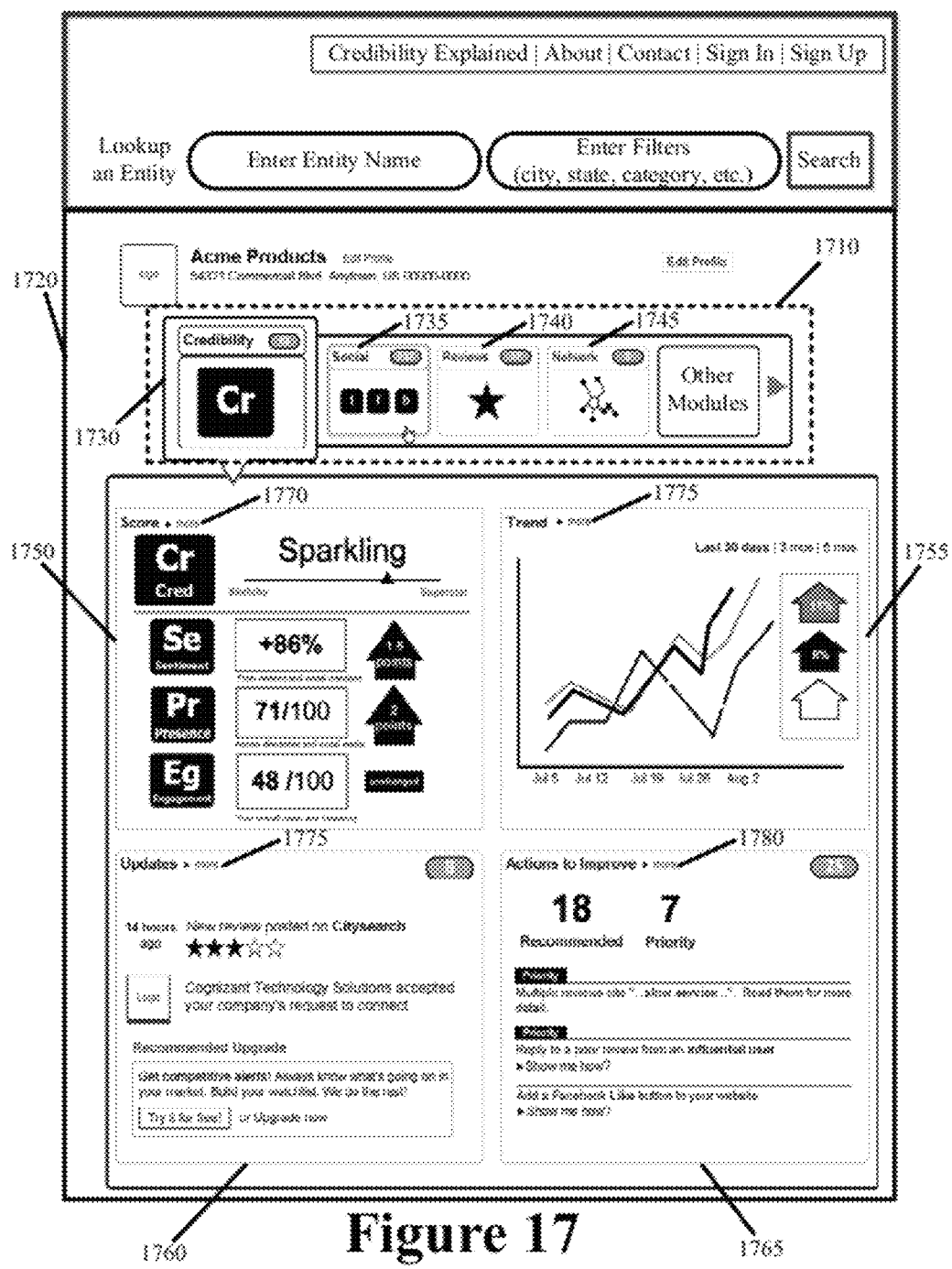
FIG. 17 presents an exemplary set of credibility modules in a dynamically generated website that is produced by the interface portal in accordance with some embodiments.

FIG. 17 presents an exemplary set of credibility modules 1710 in a dynamically generated website 1720 that is produced by the interface portal in accordance with some embodiments. The set of credibility modules 1710 shown in FIG. 17 include the overall credibility module 1730, the social media credibility module 1735, the reviews credibility module 1740, and the network credibility module 1745. Each credibility module of the set of credibility modules 1710 is selectable and depending on which credibility module is selected, credibility data that is associated with a different dimension of credibility is displayed within the body of the website 1720. User input can be provided to select a credibility module or to select a different credibility module from the set of credibility modules 1710. For instance, keyboard shortcuts, point and click, and touch inputs can be used to provide the user input for selecting different credibility modules. The currently selected credibility module is given focus as indicated by highlighting or outlining of the icon that is representative of the selected credibility module. In this figure, the selected credibility module is the overall credibility module 1730.

FIG. 17 also illustrates the common layout for presenting the credibility data that is associated with the selected credibility module of the set of credibility modules 1710. When a credibility module is selected, an overview of the dimension of credibility that is associated with the selected credibility module is presented in the body of the website 1720. The overview is presented in a four pane layout, although different embodiments may include fewer or more panes with different data than those described hereafter. Each overview pane presents a topmost layer of credibility data with drill-down functionality that accesses additional credibility data that details the derivation for the dimension of credibility associated with the selected credibility module.

In FIG. 17, the overall credibility module 1730 is selected. Accordingly, the body of the website 1720 is populated with four panes 1750, 1755, 1760, and 1775 that summarize the overall credibility for a particular entity. As with each credibility module of the set of credibility modules 1710, the first pane 1750 is a score pane, the second pane 1755 is a visualization pane, the third pane 1760 is an updates pane, and the fourth pane 1760 is an actions pane.

For the overall credibility module 1730, the score pane presents the overall credibility score and various component scores that derive the credibility score for the particular entity. As shown in FIG. 17, the component scores includes a sentiment score, a presence score, and an engagement score. The overall credibility score and the component scores are each derived based on the full complement of credibility data that is aggregated for the entity identified in the interface portal. In some embodiments, the sentiment score quantifies how the entity is viewed by others based on the positivity or negativity expressed in the credibility data that is aggregated for the entity. In some embodiments, the presence score is derived based on the particular entity's social media and credibility directory/review site listings. In some embodiments, the engagement score is derived based on the particular entity's social media reach and frequency. Each component score is derived and determined from the aggregated credibility data and other supplemental credibility data that can be aggregated from the data sources. Each component score factors into the derivation of the overall credibility score. In FIG. 17, the score pane also presents a change or delta for each component score to illustrate the change in that component score over a specified duration (e.g., past thirty days).

For the overall credibility module 1730, the visualization pane presents a chart for displaying trending of the various component scores over time. In some embodiments, the visualization pane includes interactive elements that allow the user to select the time period for the chart (e.g., last thirty days, last three months, and last six months).

For the overall credibility module 1730, the updates pane presents an up-to-date or most recent aggregate feed of credibility data affecting the selected dimension of entity credibility. Since the selected credibility module of FIG. 17 is the overall credibility module 1730, the updates pane includes any relevant aggregated credibility data affecting the overall credibility of the entity. The updates pane may therefore interchangeably display a relevant Twitter tweet, a Facebook post, and a Yelp review. This pane allows one to see the latest credibility data that is aggregated for a particular entity irrespective of which data source that credibility data is first posted to. Accordingly, the particular entity need not access different data sources in order to obtain this information.

For the overall credibility module 1730, the actions pane presents a prioritized "coaching" or list of suggested actions that an entity can perform to improve its credibility. Since the selected credibility module of FIG. 17 is the overall credibility module 1730, the actions pane includes actions that can impact different dimensions of credibility, but that nevertheless impact the overall credibility. These suggested actions are automatically determined from the processing of the aggregated credibility data.

Each of the panes 1750, 1755, 1760, and 1765 further includes one or more interactive elements that when invoked drill-down to a second lower hierarchical layer of credibility data. For example, the first pane 1750 includes interactive element 1770 for accessing a second hierarchical layer of credibility data detailing the derivation of the component scores; the second pane 1755 includes interactive element 1775 for accessing a second hierarchical layer of credibility data for providing additional information with regards to the trending data of the first hierarchical layer; the third pane 1760 includes interactive element 1780 for accessing a second hierarchical layer of credibility data providing additional credibility data from the aggregated feeds; and the fourth pane 1765 includes interactive element 1785 for accessing a second hierarchical layer of credibility data providing additional actions for improving the overall credibility of the particular entity. In some embodiments, the same or different second hierarchical layers can be accessed by directly interacting with the credibility data that is presented in the first hierarchical layers. For example, one can click on the sentiment component score in the first pane 1750 to access credibility data that details the derivation of the sentiment component score. Similarly, one can click on a particular suggested action in the fourth pane 1760 to access instructions for how to execute the suggested action.

Figure 18:
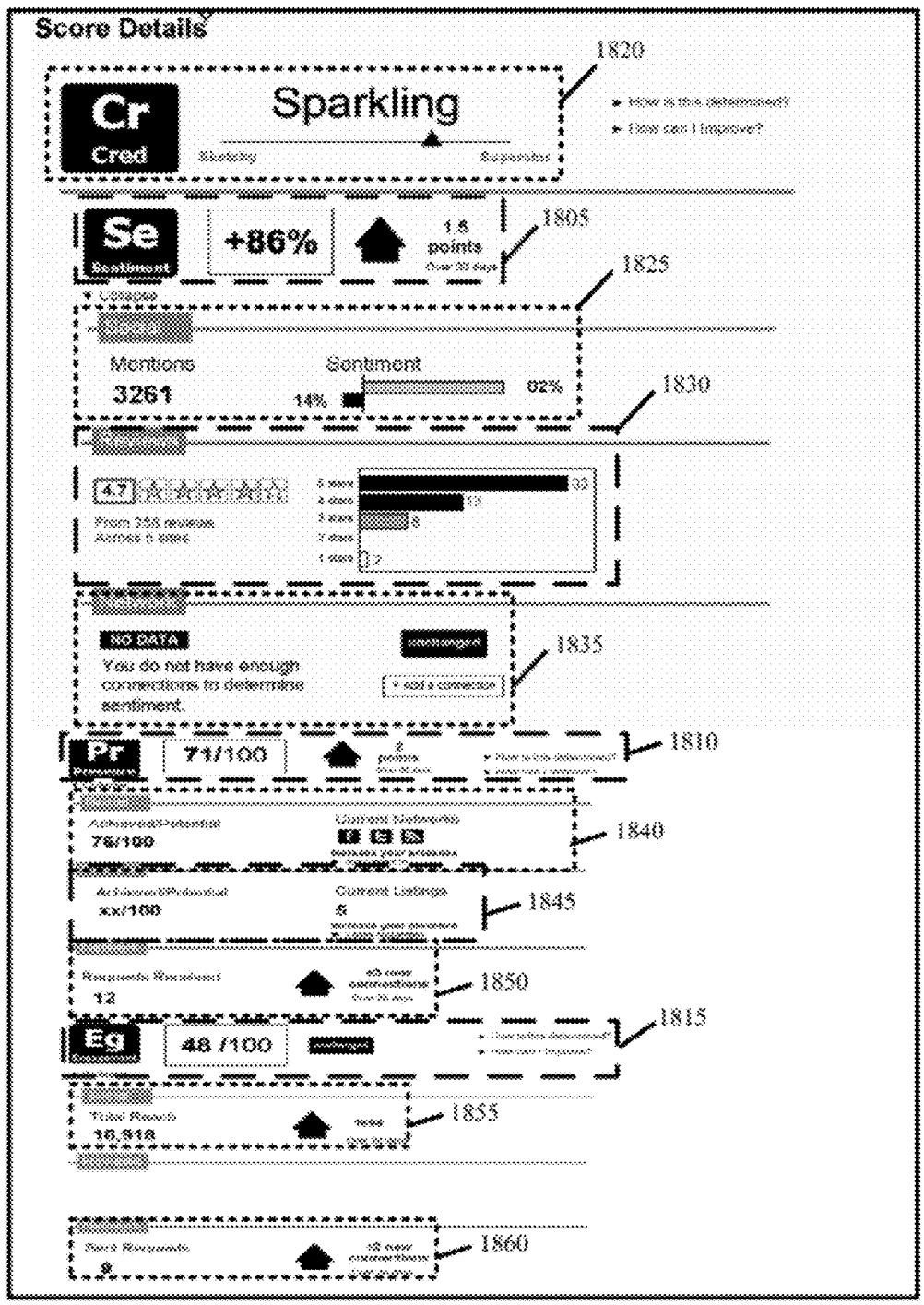
FIG. 18 presents a second hierarchical layer of credibility data that is accessed from the first pane (i.e., the score pane) of the overall credibility module in accordance with some embodiments.

FIG. 18 presents a second hierarchical layer of credibility data that is accessed from the first pane 1750 (i.e., the score pane) of the overall credibility module 1730 in accordance with some embodiments. As shown, this second hierarchical layer details the derivation of each of the sentiment component score 1805, the presence component score 1810, and the engagement component score 1815 that affect the overall credibility score 1820.

For the sentiment component score 1805, the drill-down layer presents (1) a social sentiment 1825, (2) a reviews sentiment 1830, and (3) a network sentiment 1835 that collectively derive the sentiment component score 1805. The social sentiment 1825, or reviews component score, is derived from the total number of social media mentions that the particular entity receives over a specified period of time. A count displays the number of social media mentions during the specified period of time and a visual indicator displays what percentage of those mentions are positive and what percentage of those mentions are negative. The social sentiment 1825 is derived from the natural language processing of the aggregated qualitative credibility data as was earlier described.

The reviews sentiment 1830, or rating component score, is derived from the total number of ratings for the particular entity. An overall rating displays the average rating from the aggregated ratings, a first count specifies the number of ratings used to derive the reviews sentiment, a second count specifies the number of data sources from which the ratings were aggregated, and a chart displays the distribution of the ratings. The reviews sentiment 1830 is derived from the processing of the aggregated quantitative credibility data.

In some embodiments, the network sentiment 1835 is an optional component score that is derived based on the number of requested social media connections of the particular entity. Specifically, this component score is determined based on the quality of the partnerships and partners established by the particular entity. The more trusted the partners are and the greater the number of trust partners, the higher the score for the network sentiment 1835. In some embodiments, the connection information is collected by the master data manager of the credibility system and each of identified connection is then compared to a entity database, such as the one maintained by Dun & Bradstreet, to determine the network sentiment contribution by the identified partner.

Each of the social sentiment 1825, review sentiment 1830, and network sentiment 1835 are expandable and collapsible so that a user can at any time view a certain set of credibility data while hiding other credibility data from view. In this manner, the user can pinpoint which sentiment component is most beneficial to the sentiment score and which sentiment component is most detrimental to the sentiment score.

For the presence component score 1810, the drill-down layer presents (1) a social presence 1840, (2) a reviews site presence 1845, and (3) a network presence 1850 that collectively derive the presence component score 1810. The social presence 1840 is based on the ease with which those evaluating the particular entity can find the particular entity on social networks. Accordingly, the social presence 1840 is derived based on the ratio of the particular entity's established social networking presence to the relevant potential for that particular entity. In some embodiments, the social presence 1840 is determined based on the number of social media accounts that are identified as being registered to the particular entity. The credibility system may automatically identify these accounts by using the identification information for the particular entity to query different social media sites to determine if an account is identified as matching to the identification information by a specified degree. Alternatively, the credibility system may acquire such information from the particular entity itself once the particular entity claims ownership of the website and provides the account information to the credibility system. In some embodiments, the social presence 1840 presents one or more actions that the particular entity can take to improve its social presence 1840 score. For example, the social presence 1840 may request that the particular entity identify the accounts that it has registered at various social media sites and to register accounts at social media sites that the entity has not yet registered with.

The reviews site presence 1845 is based on the ease with which those evaluating the particular entity can find the particular entity on social networks. Accordingly, the social presence 1840 is derived based on the ease with which those evaluating the particular entity can find the particular entity on credible directories (e.g., Google Places) and review sites (e.g., Yelp). Such information can be aggregated by the master data manager or can be requested from the particular entity. Additionally, suggestions may be made for the particular entity to register accounts at various directories.

The network presence 1850 is determined from the number of inbound connection request that the particular entity receives during a specified period. Such information may be aggregated directly from different social media sites by leveraging established partnerships with those sites. In some embodiments, the strength or reputations of the connections are also weighted to determine the network presence 1850.

Each of the social presence 1840, review presence 1845, and network presence 1850 are expandable and collapsible so that a user can at any time view a certain set of credibility data while hiding other from view. In this manner, the user can pinpoint which presence component is most beneficial to the presence score and which presence component is most detrimental to the presence score.

For the engagement component score 1815, the drill-down layer presents (1) a social engagement 1855 and (2) a network engagement 1860 that collectively derive the engagement component score 1815. The social engagement 1855 is determined form the followership or reach that the particular entity has built through social media. This includes, for example, the number of Twitter followers and Facebook likes that the particular entity has obtained. Such information is aggregated from the social media sites by the credibility system based on established partnerships with the social media sites.

The network engagement 1860 is determined from the number of invitations to connect that the particular entity sends from its various social media accounts. In some embodiments, the network engagement 1860 is weighted based on the influence of the entities that receive the sent invitations.

From the various component scores and from the additional credibility data that can be obtained via the drill-down functionality, the understanding of an entity's credibility is simplified and made available in an on-demand basis where the drill-down functionality reveals more detailed credibility data that than what was presented in an above layer above. Moreover, the interface portal presents the credibility of an entity comprehensively such that a viewer need not access different data sources in order to piece together the entity's credibility and the derivation of the credibility score is laid out in an easy to understand interactive manner that does not overwhelm the viewer with too much or too little credibility data, rather the viewer controls what credibility data it wants to see and the degree of detail it wants for that credibility data.

Figure 19:
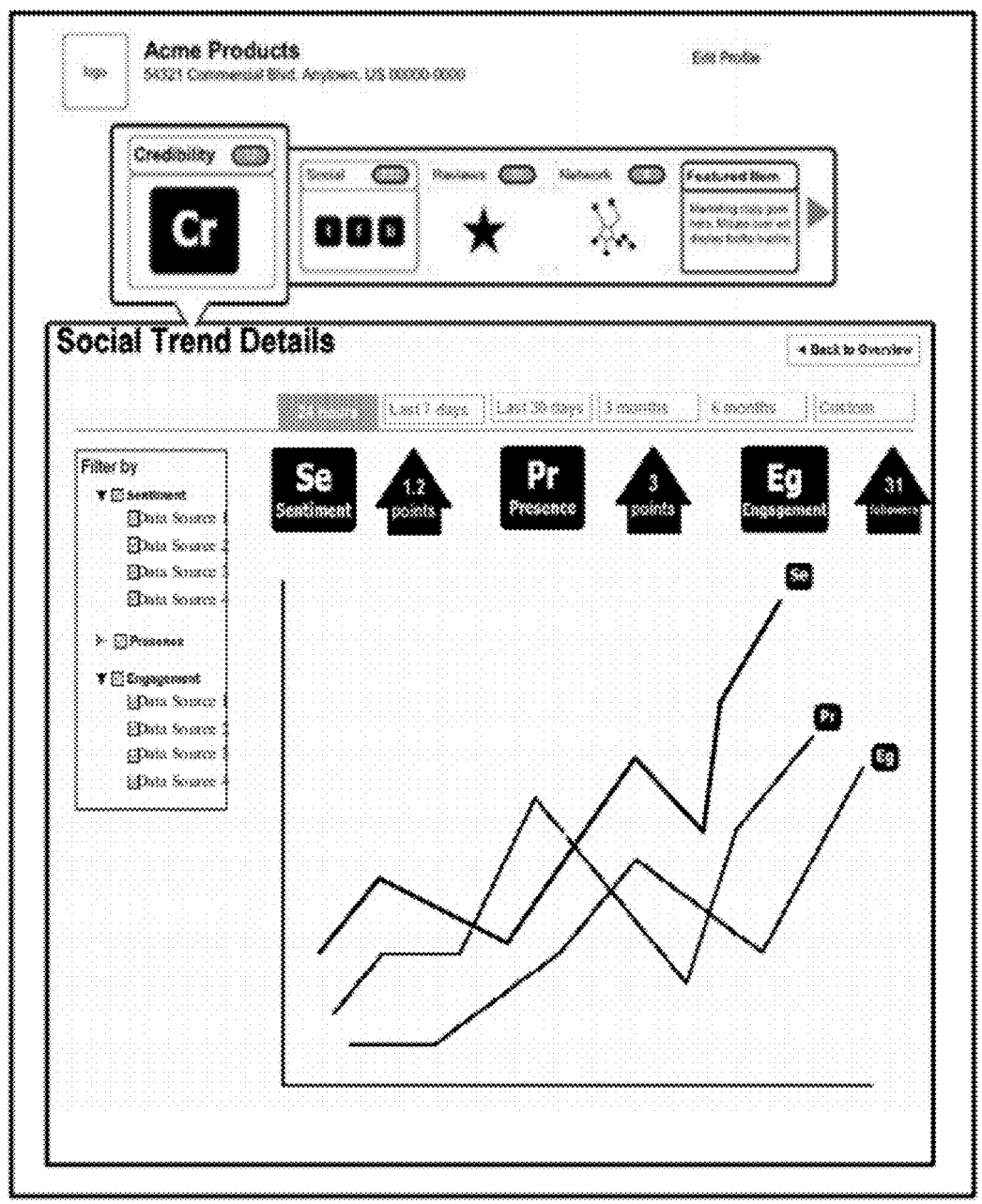
FIG. 19 presents a second hierarchical layer of credibility data that is accessed from the second pane (i.e., the visualization pane) of the scoring credibility module in accordance with some embodiments.

FIG. 19 presents a second hierarchical layer of credibility data that is accessed from the second pane 1755 (i.e., the visualization pane) of the scoring credibility module 1730 in accordance with some embodiments. As shown in FIG. 19, this second hierarchical layer provides a larger and more detailed formatting for the trending credibility data and various filters for interacting with the charted trends. The filters can be used to alter the time range for the charting of the trends and to selectively trend each of the component credibility scores based on different data sources.

Figure 20:
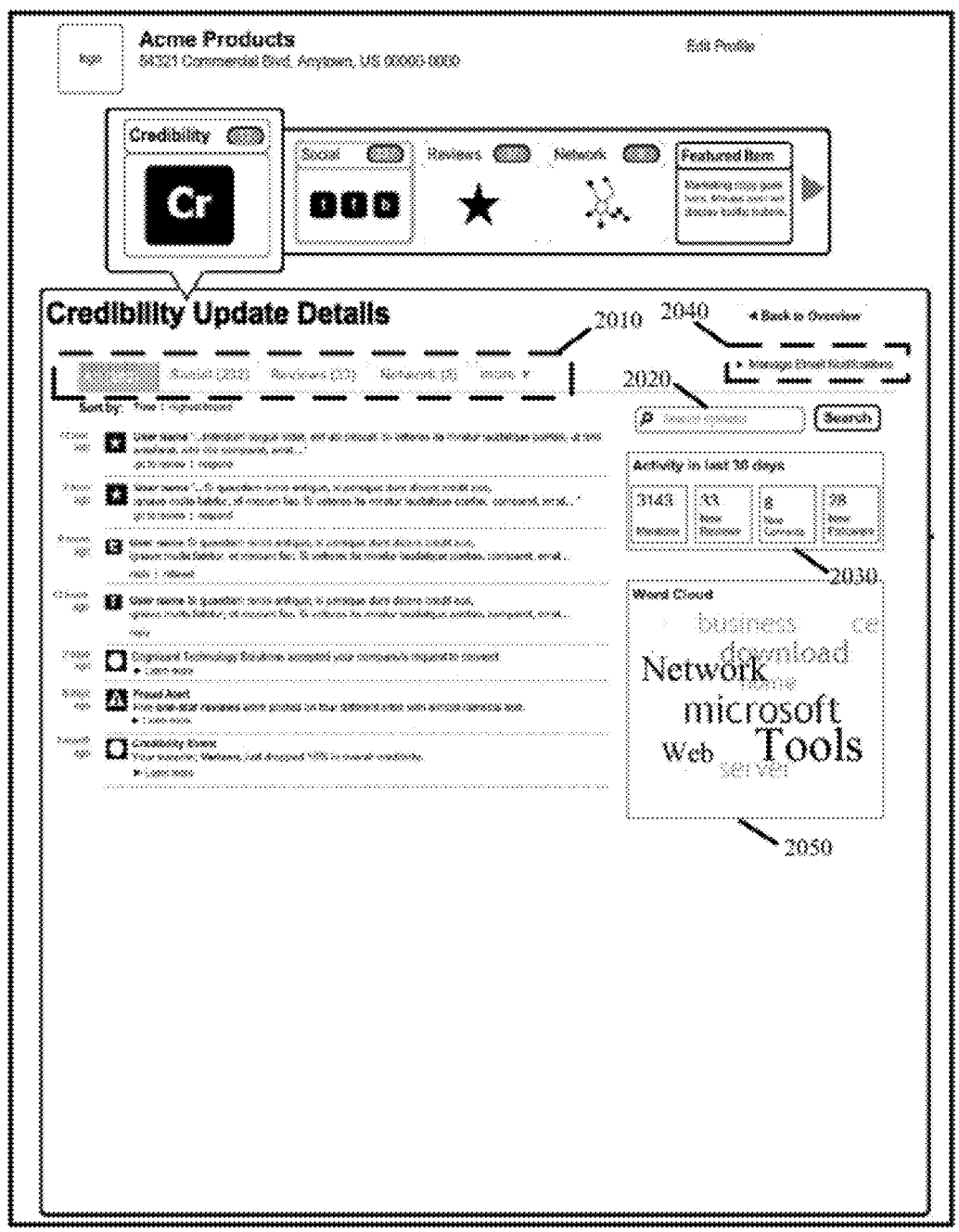
FIG. 20 presents a second hierarchical layer of credibility data that is accessed from the third pane (i.e., the updates pane) of the scoring credibility module in accordance with some embodiments.

FIG. 20 presents a second hierarchical layer of credibility data that is accessed from the third pane 1760 (i.e., the updates pane) of the scoring credibility module 1730 in accordance with some embodiments. This figure presents tabs 2010, search interface 2020, activity summary block 2030, notification setting 2040, and word cloud 2050. The tabs 2010 can be used to provide different access to the quantitative and qualitative credibility data that is aggregated from the various data sources and that is exposed in the parent hierarchical layer of the overall credibility module 1730. For example, a first tab of the tabs 2010 can be used to present all aggregated quantitative and qualitative credibility data, a second tab can be used to present aggregated qualitative credibility data (e.g., social media mentions), and a third tab can be used to present aggregated quantitative credibility data (e.g., reviews). In some embodiments, some of the presented credibility data may include one or more clickable links for the user to take further action by redirecting the user to a site of the data source that the credibility data was originally posted, providing the option to "retweet" a Twitter "tweet", or by providing the option to respond to a specific review, comment, or message. The search interface 2020 allows users to specify custom filters to filter the aggregated credibility data that is presented. More specifically, the search interface 2020 may be used to specify terms such that the presented set of aggregated data includes one or more of the specified terms. The activity summary block 2030 presents key metrics from the aggregated credibility data. The notification setting 2040 allows the owner entity to setup alert notifications based on the occurrence of one or more events. This may include specifying to receive an email notification when new credibility data is aggregated from a particular data source or to receive an email notification when a negative review is posted about the entity at a particular data source. The word cloud 2050 automatically presents significant or commonly occurring words or phrases from the aggregated credibility data. The word cloud 2050 adjusts the sizes of the presented words and phrases in relation to the number of occurrences of those words and phrases in the aggregated credibility data. This provides the user with quick insight as to what others are commenting about in the credibility data that is aggregated for a particular entity.

Figure 21:
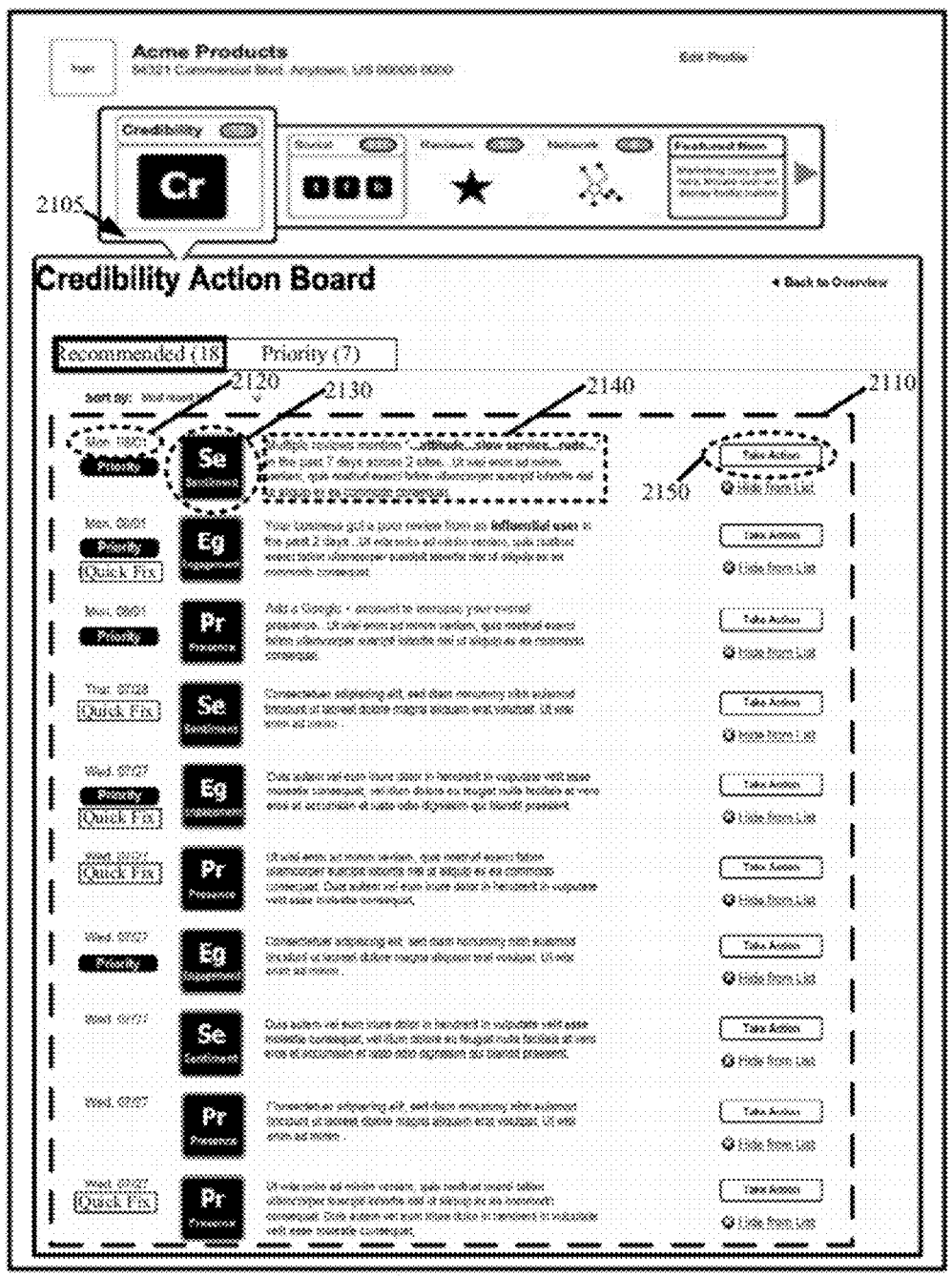
FIG. 21 presents a second hierarchical layer of credibility data that is accessed from the fourth pane (i.e., the actions pane) of the scoring credibility module in accordance with some embodiments.

FIG. 21 presents a second hierarchical layer 2105 of credibility data that is accessed from the fourth pane 1765 (i.e., the actions pane) of the scoring credibility module 1730 in accordance with some embodiments. This hierarchical layer 2105 presents simple, direct, and prioritized set of recommended actions 2110 for improving an entity's credibility score. For each action in the set of recommended actions 2110, the interface presents a timestamp 2120, credibility element icon 2130, body of action 2140, and call to action link 2150. The timestamp 2120 indicates when the credibility system suggests the action to the entity. The credibility element icon 2130 is an icon that corresponds to the dimension of credibility that the is to be improved. The body of action 2140 identifies and describes the action that can be performed by the entity to improve its credibility. This description eliminates the guesswork for what specific actions the entity can perform to improve upon its credibility. The call to action link 2150 is a graphical element that can be invoked to begin performing the action identified in the body of action 2140. An example of an action that an entity can undertake to improve its credibility score includes registering with social media sites that the entity is currently not registered at. Registering at a social media site improves the credibility of an entity by increasing the online presence and thereby the exposure of the entity. In so doing, the entity becomes more accessible and the entity is provided various mediums with which to distribute updates, informational materials, promotional materials, advertising, etc. For such an action, the call to action link 2150 is a link that forwards the entity to a registration page of one or more social media sites that the entity has not yet registered with. An example of a different action that the entity can undertake to improve its credibility score includes simplifying the manner in which the entity can respond to different social media mentions or reviews that the entity is the target or subject of. For such actions, the call to action link 2150 may include a link back to the social media site from which the mention or review is aggregated, wherein the link back to the social media site further accesses an interface with which the entity can respond, reply, or distribute the mention or review.

In some embodiments, the credibility system automatically determines the set of recommended actions 2110 that the entity can undertake to improve its credibility score by comparing and identifying differences in the credibility data that is aggregated for the entity and the credibility data that is aggregated for other entities and/or by comparing the aggregated credibility data for the entity with a set of rules specified for the credibility system. For example, the set of rules may enumerate a list of social media sites that the entity can register with and the credibility system identifies which of the list of social media sites the entity is registered with based on analysis of the credibility data that is aggregated for that entity. Specifically, when an item of credibility data identifies an account of the entity at a particular social media site, then the credibility system determines that the entity has an account registered at that particular social media site.

With reference back to FIG. 17, when the social media credibility module 1735 is selected (i.e., given focus), the display of the website 1720 changes to present the social media dimension affecting the credibility of a particular entity. Unlike the credibility data that is presented with the overall credibility module 1730, the social media module 1735 contains a filtered subset of the credibility data that is aggregated for the particular entity. The filtered subset includes the credibility data that is pertinent to the social media dimension of credibility. This allows the viewer to focus in on and better understand one specific dimension of credibility as opposed to all dimensions that factor into the overall credibility. In this case, the specific dimension of credibility relates to the credibility impact of social media. From this credibility dimension, an entity can identify what past actions across social media have positively affected its credibility, what past actions across social media have negatively affected its credibility, and what future actions can be performed or changes can be made in order to improve its credibility across social media. The social media dimension of credibility relates mainly to the qualitative credibility data that is aggregated by the credibility system and factors (1) the sentiment of aggregated social media messages that target or reference a particular entity, (2) the presence of the particular entity across social media based on the quantity of aggregated social media messages (i.e., qualitative credibility data such as Twitter tweets and Facebook posts) that mention the particular entity, and (3) the engagement or influence of the particular entity across social media based on the particular entity's involvement in networking.

Figure 22:
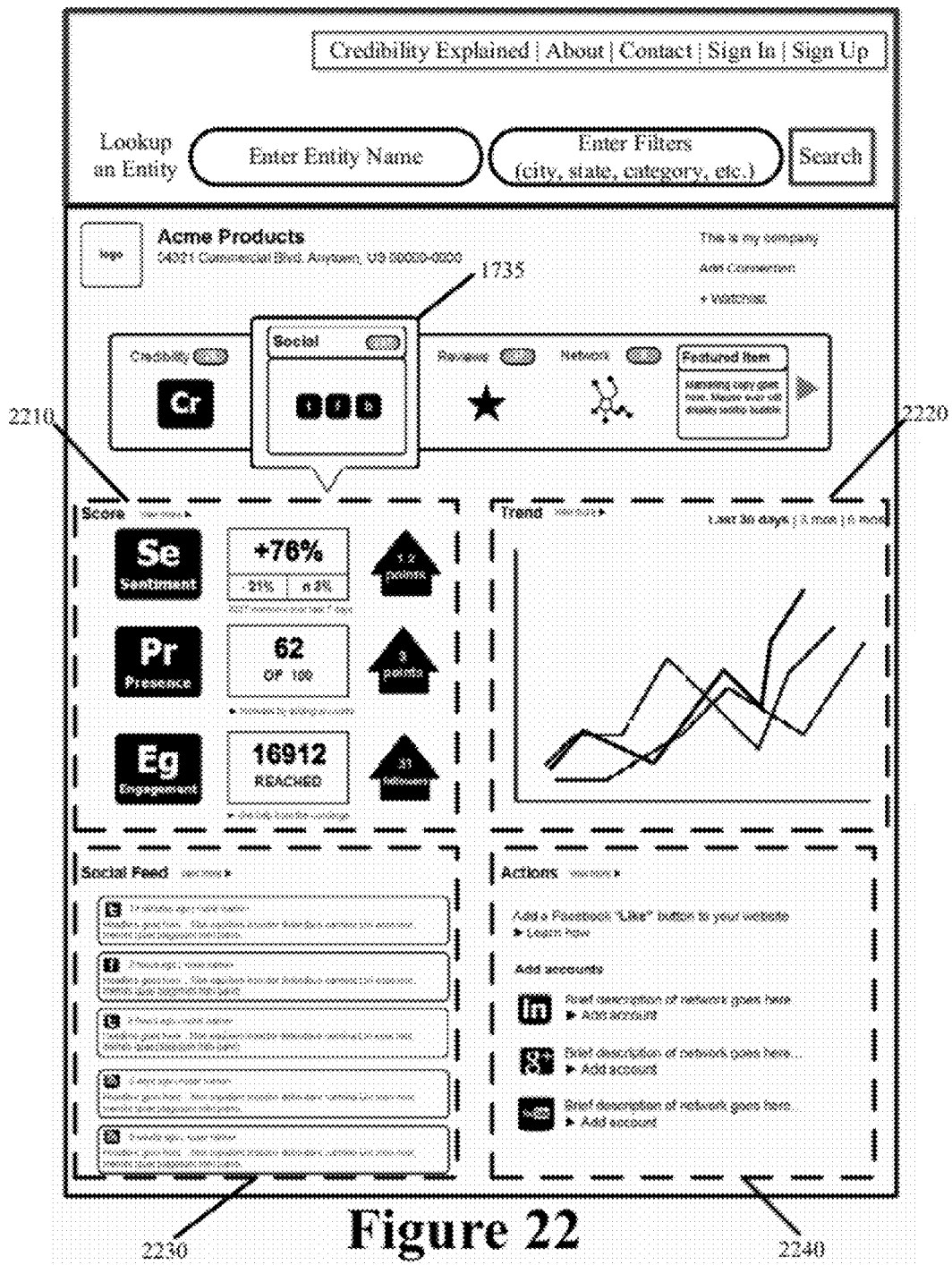
FIG. 22 presents the topmost hierarchical layer or first layer for the social media credibility module when the social media credibility module is selected in accordance with some embodiments.

As with the overall credibility and other dimensions of credibility, the interface portal presents the social media dimension through a set of hierarchical layers. FIG. 22 presents the topmost hierarchical layer or first layer for the social media credibility module 1735 when the social media credibility module 1735 is selected in accordance with some embodiments. Like the topmost layer of the overall credibility module 1730, the topmost layer of the social media credibility module 1735 includes a score pane 2210, a visualization pane 2220, an updates pane 2230, and an actions pane 2240. However, each of the panes 2210-2240 presents credibility data that affects or otherwise pertains to the social media dimension of credibility as opposed to presenting credibility data that affects other dimensions of credibility. Each of the panes 2210-2240 also includes drill-down functionality that can be used to access additional credibility data for detailing the derivation of the credibility data that is presented in the panes 2210-2240.

The score pane 2210 presents various subcomponent scores from which a component credibility score for the social media dimension of an entity's credibility is derived. The component scores presented in the score pane 2210 differ from those presented in the score pane 1750 of FIG. 17 in that the aggregated credibility data used to derive the component scores of pane 2210 are filtered to include credibility data that is aggregated from social media sites, such as Twitter, Facebook, and Google+ while excluding credibility data that is aggregated from review sites and other data sources, such as Yelp and CitySearch. The component scores include a social media sentiment score, a social media presence score, and a social media engagement score that convey the volume and sentiment of mentions about the entity across social media.

The visualization pane 2220 presents a chart for displaying trending of the various social media component scores over time. In some embodiments, the second pane 2220 includes interactive elements that allow the user to select the time period for the chart (e.g., last thirty days, last three months, and last six months).

The updates pane 2230 presents the most recent set of social media messages that the entity is a target or subject of. Accordingly, the updates pane 2230 may interchangeably display a relevant Twitter tweet, a Facebook post, and a Google+ review that mention, target, or otherwise reference the entity as the subject of such messages. The updates pane 2230 therefore provides a single location from which all social messages about the entity can be viewed without the need to individually access each social media site where one such message is posted.

The actions pane 2240 presents a prioritized list of suggested actions that the entity can perform across social media in order to improve its credibility. The list of suggested actions is automatically determined by the credibility system based on the aggregated social media credibility data. The list of suggested actions can include actions such as establishing a presence at a social media site that the entity has yet to register with, completing or updating a profile that is otherwise incomplete or out-of-date at a social media site, performing some specified action (e.g., posting messages, distributing promotional or information materials, etc.) at a social media site. The list of suggested actions provides the entity with discrete and proven effective methods that others have used to improve their credibility across social media.

This provides various advantages over traditional social media sites where the entity would have to guess or determine for itself what actions it should perform in order to improve its credibility across social media. By removing this guesswork and analysis from the entity, the interface portal allows the entity to more effectively and quickly improve the social media dimension of its credibility.

Figure 23:
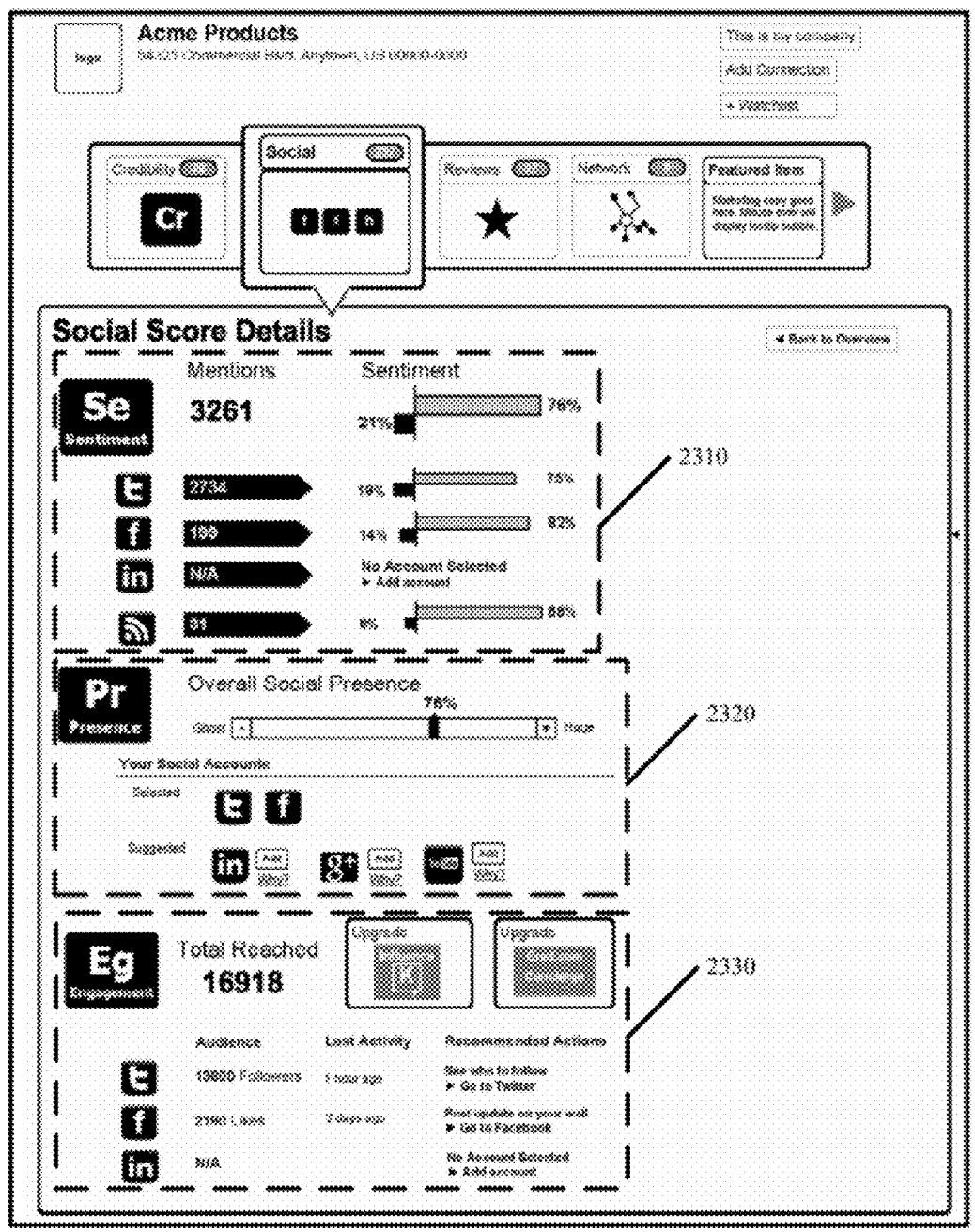
FIG. 23 provides additional detail as to the derivation of each of the social media component scores including the sentiment social media component score, presence social media component score, and engagement social media component score.
Figure 24:
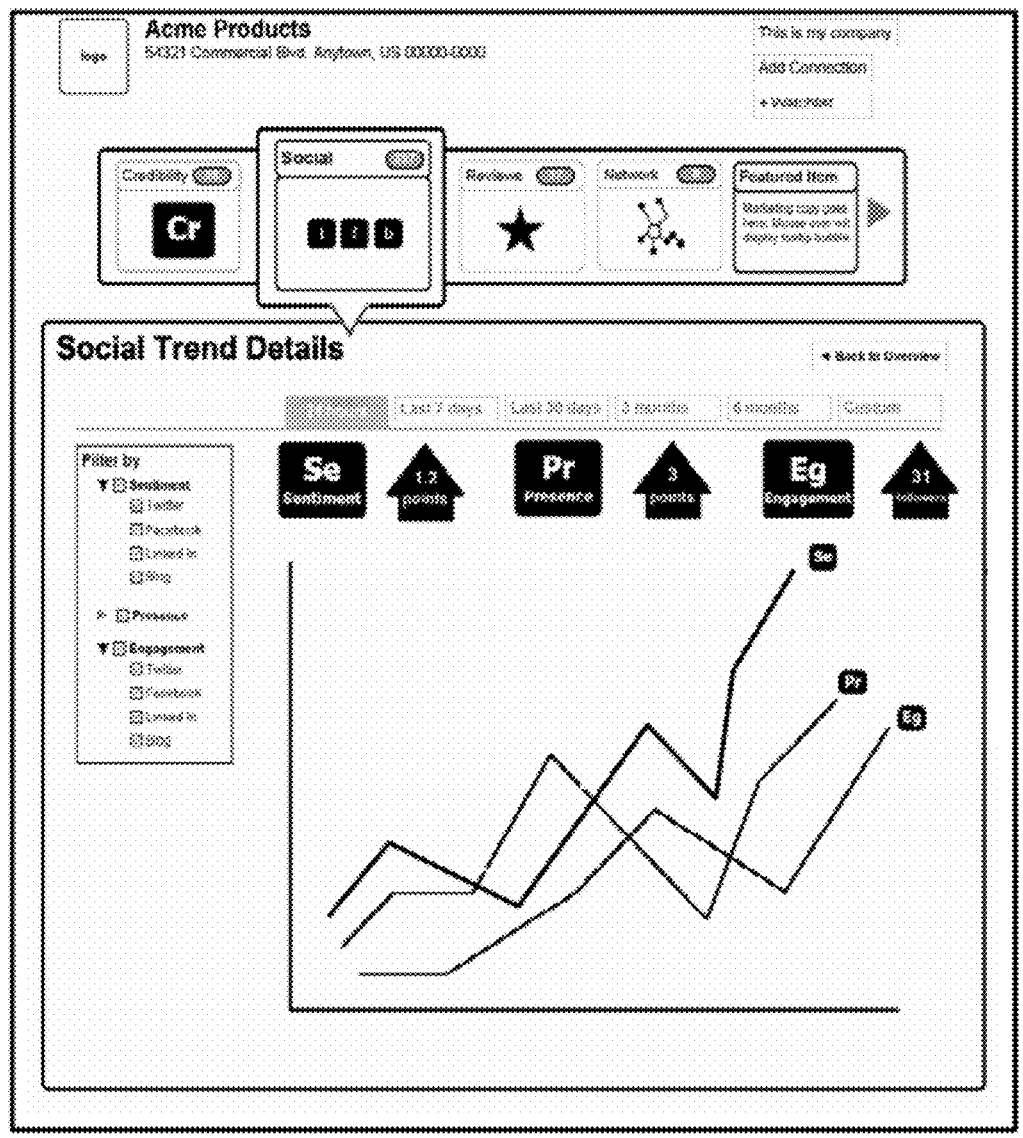
FIG. 24 provides additional detail to further enumerate trends occurring within the social media credibility data.
Figure 25:
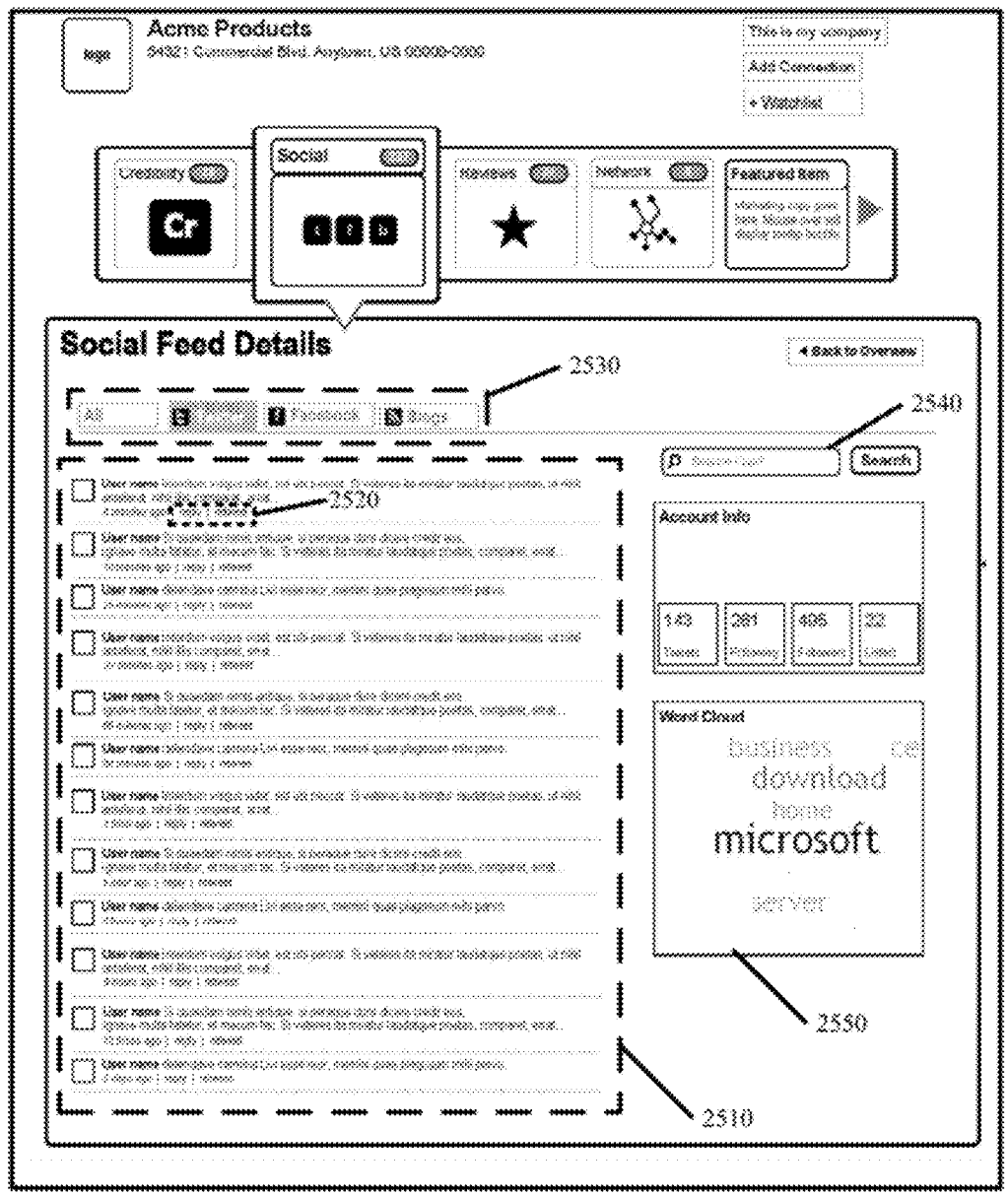
FIG. 25 expands on the most recent set of social media credibility data that is presented in the updates pane by providing access to all social media credibility data that is aggregated for the entity in accordance with some embodiments.
Figure 26:
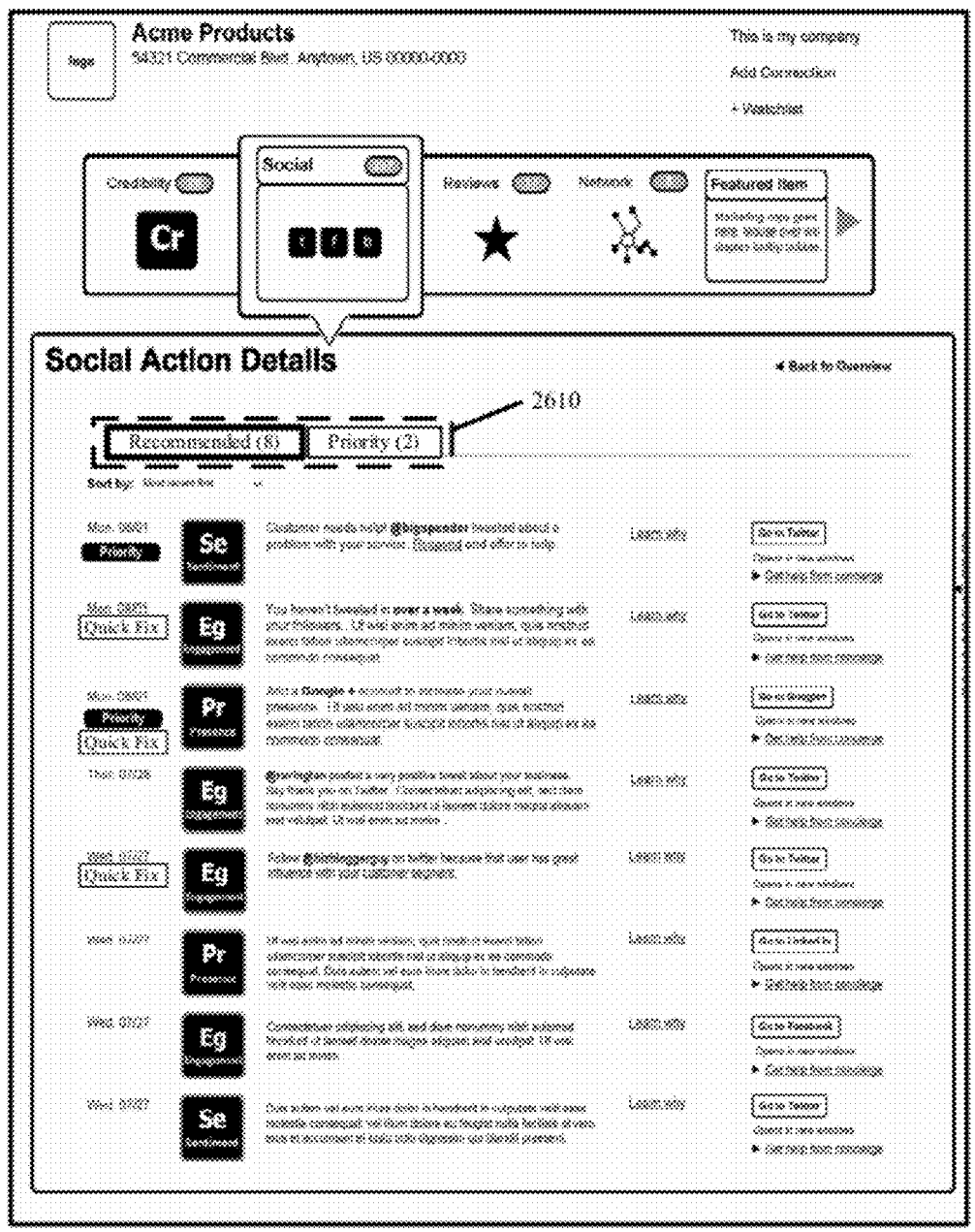
FIG. 26 provides a comprehensive set of actions that can be undertaken by an entity to improve the social media dimension of its credibility.

Each of the panes 2210-2240 further includes one or more interactive elements that when invoked drill-down to a second lower hierarchical layer of credibility data. FIG. 23 presents the hierarchical layer of credibility data that is accessed from and that presents more detailed credibility data relating to the score pane 2210. FIG. 24 presents the hierarchical layer of credibility data that is accessed from and that presents more detailed credibility data relating to the visualization pane 2220. FIG. 25 presents the hierarchical layer of credibility data that is accessed from and that presents more detailed credibility data relating to the updates pane 2230. FIG. 26 presents the hierarchical layer of credibility data that is accessed from and that presents more detailed credibility data relating to the actions pane 2240.

FIG. 23 provides additional detail as to the derivation of each of the social media component scores including the sentiment social media component score 2310, presence social media component score 2320, and engagement social media component score 2330. This hierarchical layer of data is accessed by drilling-down from the score pane 2210 by invoking one of the interactive elements in the score pane 2210.

In some embodiments, the sentiment social media component score 2310 is derived based on the number of times the entity is mentioned across different social media sites. Also affecting this component score 2310 is the sentiment expressed in the mentions. The credibility system derives this component score by filtering the aggregated credibility data to obtain a subset of credibility data that includes social media messages that target or otherwise reference the entity. The credibility system then counts the number of messages in the filtered subset of credibility data and performs the above described natural language processing in order to ascertain the sentiment expressed in the mentions. Such data is then compiled into the social media component score 2310.

In some embodiments, the presence social media component score 2320 identifies the overall presence that the entity has across social media. The overall presence is determined based on the number of social media sites the entity has an active registered account. The credibility system maintains a list of social media sites that impact the presence social media component score 2320 and the credibility system analyzes the aggregated credibility data to identify which social media sites the entity originates messages from. In some embodiments, the credibility system automatically identifies accounts at different social media sites that the entity has registered by matching account information in the aggregated credibility data to identification information that is obtained for the entity. In some embodiments, the credibility system requests that the entity identify accounts that it has registered at various social media sites.

In some embodiments, the engagement social media component score 2330 is derived based on the responsiveness of the entity with reference to social media messages that target or reference the entity. As one example, this includes the ratio with which the entity responds to Twitter tweets that tag the entity and that originate from one of the entity's followers. In some embodiments, the engagement social media component score 2330 is derived based on the activity of an entity across social media which includes quantifying the number of association requests and the success rate of the association requests across social media, wherein an association request includes, for example, social media friend, networking, or partnership requests. More specifically, associations can include Facebook friends, Twitter followers, and LinkedIn connections. In some embodiments, the engagement social media component score 2330 further factors the influence or reach the entity has across social media based on the number and influence of other entities that are in some way associated (e.g., friends, networked, partners, etc.) with the entity of interest across social media. An influential entity is one that has a well respected brand or name. Additionally or alternatively, the credibility system may derive the engagement social media component score 2330 by identifying the set social media messages that target or reference the entity from the aggregated credibility data. Next, the credibility system identifies the influence and number of the different entities that originate the messages in the identified set of social media messages. Based on the number of messages and the influence of the message originators, the credibility systems computes the engagement social media component score 2330.

FIG. 24 provides additional detail to further enumerate trends occurring within the social media credibility data. This hierarchical layer is accessed by drilling-down from the visualization pane 2220. Various interactive elements allow modifying the timelines represented by the trends. Other interactive elements modify which trends are shown.

FIG. 25 expands on the most recent set of social media credibility data that is presented in the updates pane 2230 by providing access to all social media credibility data that is aggregated for the entity in accordance with some embodiments. This hierarchical layer presents in one layout 2510, social media messages that target or otherwise reference the entity and that are aggregated from different social media sites. In so doing, the entity need not access each social media site independently in order to view everything that is being said about it. Moreover, this hierarchical layer provides interactive elements 2520 for each of some or all the messages to allow the entity to reply, retweet, or otherwise respond to the social media messages without having to access different social media sites from which the messages originated to do so. Other interactive elements for better understanding this dimension of credibility include interactive elements 2530 to filter the displayed messages by social media site, search bar 2540 to search for specific messages that include one or more keywords specified in the search bar 2540, and word cloud 2550 that presents the most commonly occurring words or phrases in the social media messages. The detailed credibility data presented in this figure differs from that presented in FIG. 20 in that the presented credibility data is focused to include credibility data for a particular dimension of credibility, namely the social media dimension of credibility. Accordingly, the detailed credibility data of FIG. 25 presents the credibility data that is aggregated from social media sites, whereas the credibility data presented in FIG. 20 is an aggregate of all credibility data that is aggregated from any data source irrespective of whether the data source is a social media site.

FIG. 26 provides a comprehensive set of actions that can be undertaken by an entity to improve the social media dimension of its credibility. This hierarchical layer is accessed by drilling-down from the actions pane 2240. These actions are specific to improving the social media dimension of the entity's credibility and are determined by the credibility system based on analysis, natural language processing, and comparison of the aggregated qualitative credibility data. The set actions can be filtered using the interactive elements 2610 to present recommended actions and priority actions.

With reference back to FIG. 17, when the reviews credibility module 1740 is selected (i.e., given focus), the display of the website 1720 changes to present the reviews dimension affecting the credibility of a particular entity. The reviews dimension, like the social media dimension, focuses on a particular dimension of credibility that contributes to the derivation of the overall credibility. Specifically, the reviews dimension presents the impact that the aggregated quantitative credibility data has to the overall credibility of the entity. From this credibility dimension, an entity can readily identify how others are rating or ranking the entity across different review sites such as Yelp and CitySearch without having to individually access and query such review sites. Moreover, the reviews credibility module 1740 presents various actions that can be performed by the entity to improve upon its credibility. The reviews dimension of credibility factors (1) the sentiment of aggregated quantitative rankings and ratings that target or reference a particular entity, (2) the presence of the particular entity across review sites based on the quantity of quantitative rankings and ratings (i.e., quantitative credibility data) aggregated for the particular entity, and (3) the engagement or influence of the particular entity across different review sites.

Figure 27:
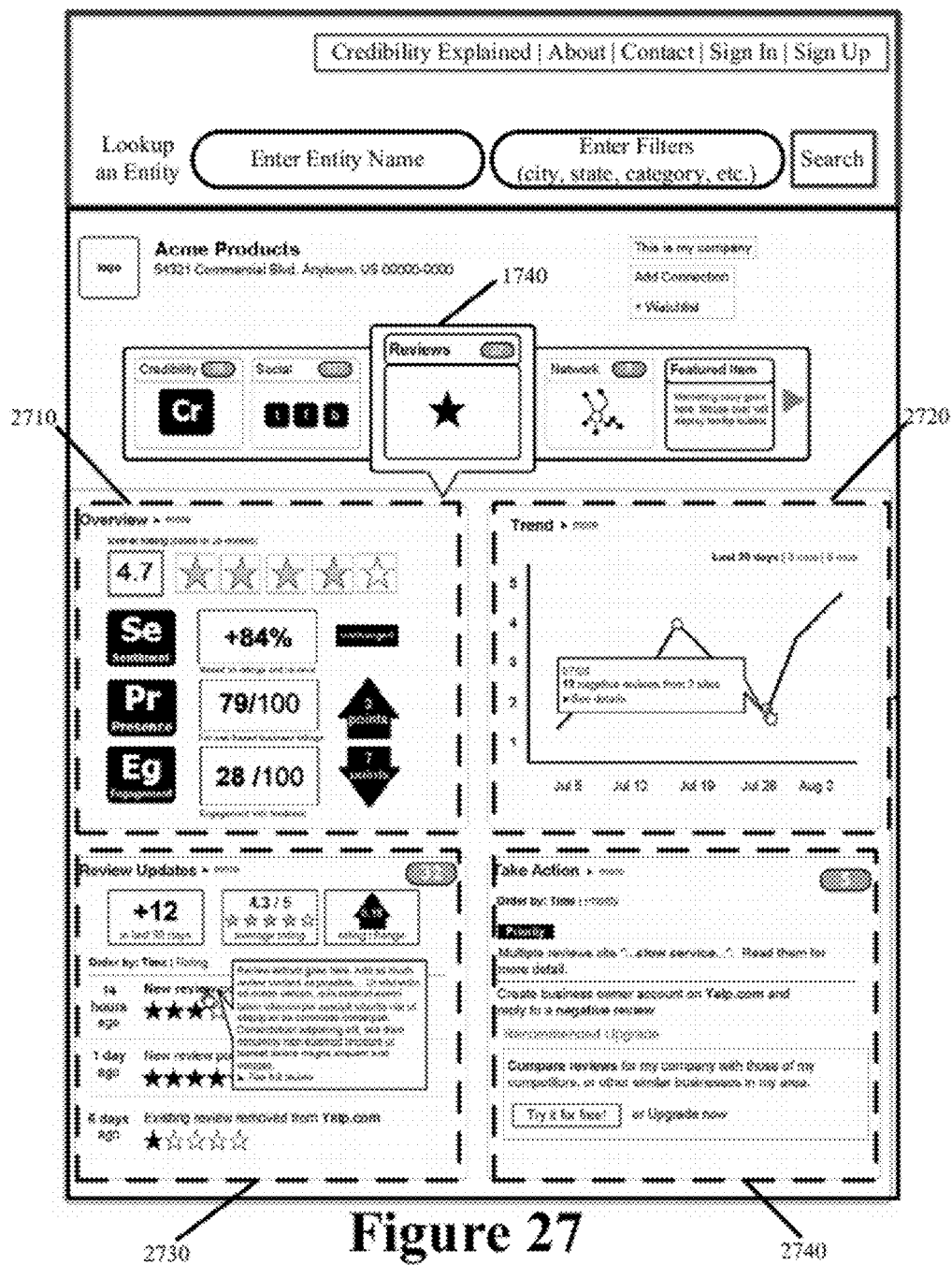
FIG. 27 presents the topmost hierarchical layer or first layer for the reviews credibility module when the reviews credibility module is selected in accordance with some embodiments.

The interface portal presents the reviews dimension through a set of hierarchical layers. FIG. 27 presents the topmost hierarchical layer or first layer for the reviews credibility module 1740 when the reviews credibility module 1740 is selected in accordance with some embodiments. As shown, the topmost layer includes a score pane 2710, a visualization pane 2720, an updates pane 2730, and an actions pane 2740 that each present credibility data that is specific to the dimension of credibility for how quantitative reviews (e.g., rankings and ratings) affect the overall credibility of an entity. Each of the panes 2710-2740 also includes drill-down functionality that can be used to access additional credibility data for detailing the derivation of the credibility data that is presented in the panes 2710-2740.

Figure 28:
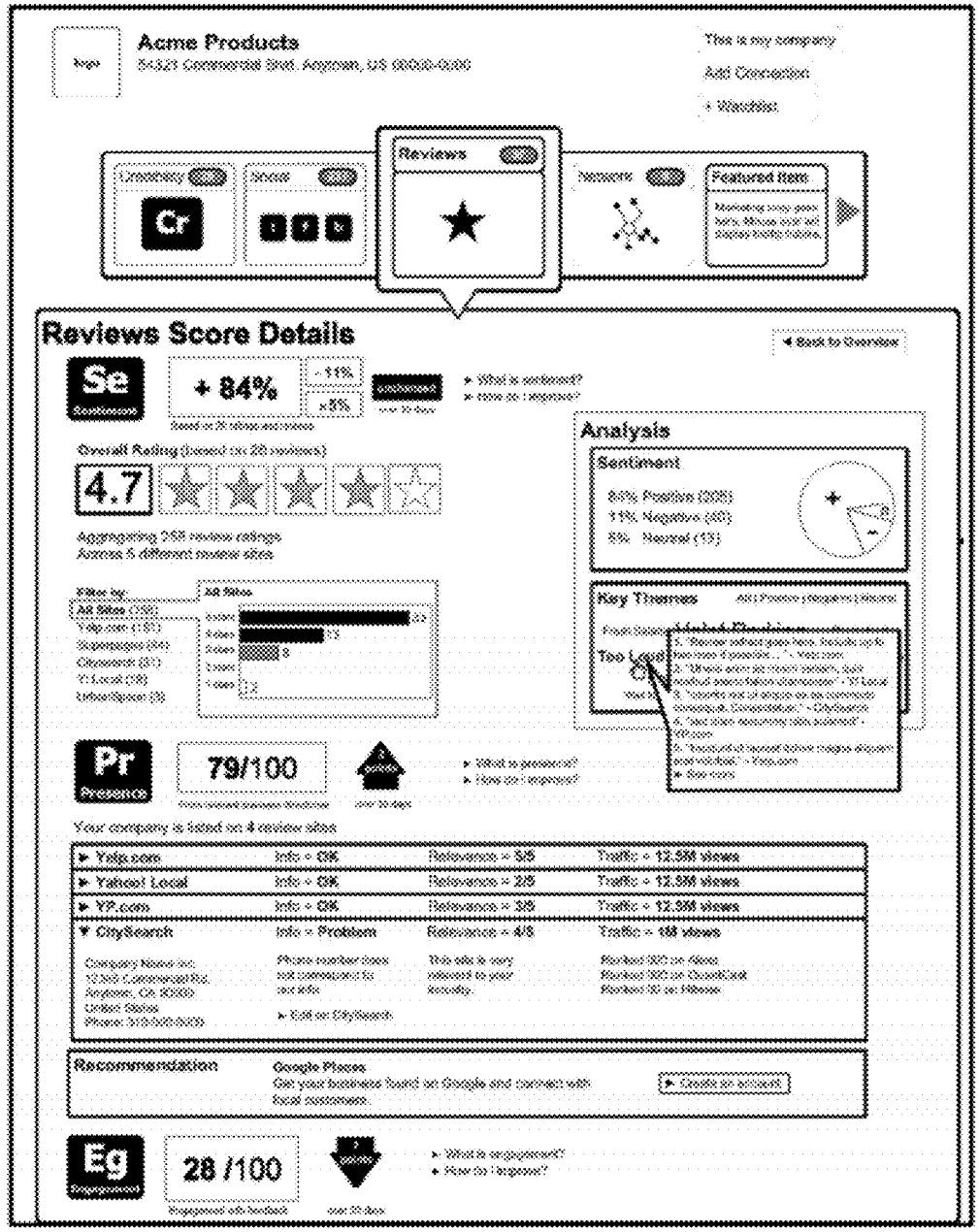
FIG. 28 presents credibility data that is accessed when drilling-down from the score pane and that details the derivation of the credibility data in topmost layer of the score pane.

The score pane 2710 presents various subcomponent scores from which a component credibility score for the reviews dimension of an entity's credibility is derived. The component scores include a reviews sentiment score, a reviews presence score, and a reviews engagement score. As further detailed by the credibility data presented in the hierarchical layer of FIG. 28 which is accessed by drilling-down from the score pane 2710, the reviews sentiment score is derived by normalizing and averaging the ranking or rating expressed in the quantitative credibility data that is aggregated from reviews sites such as Yelp, CitySearch, etc. In some embodiments, the reviews presence score is derived based on one or more of the number of different review sites and directories in which the entity is listed, the number of quantitative reviews that are aggregated for the entity from the review sites, the number of other entities that have viewed or accessed the quantitative reviews about the entity, and the accuracy of information for identifying the entity across the different review sites. In some embodiments, the reviews engagement score is derived based on the responsiveness of an entity to rankings or ratings that are posted for the entity. For example, the engagement score is derived based on the number of times an entity has responded to Yelp ratings that are posted for that entity.

Figure 29:
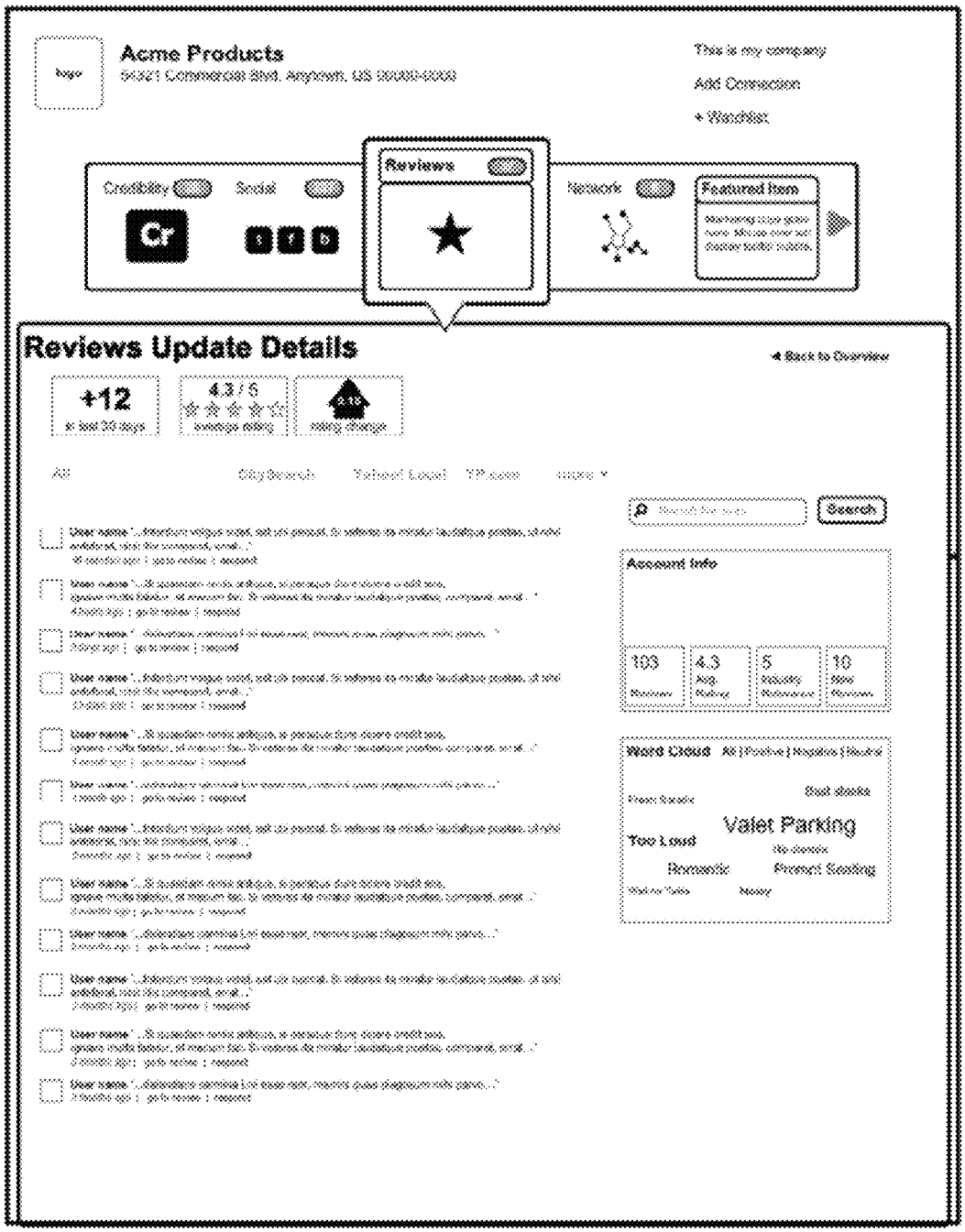
FIG. 29 presents credibility data that is accessed when drilling-down from the updates pane and that presents a complete set of aggregated quantitative credibility data in accordance with some embodiments.
Figure 30:
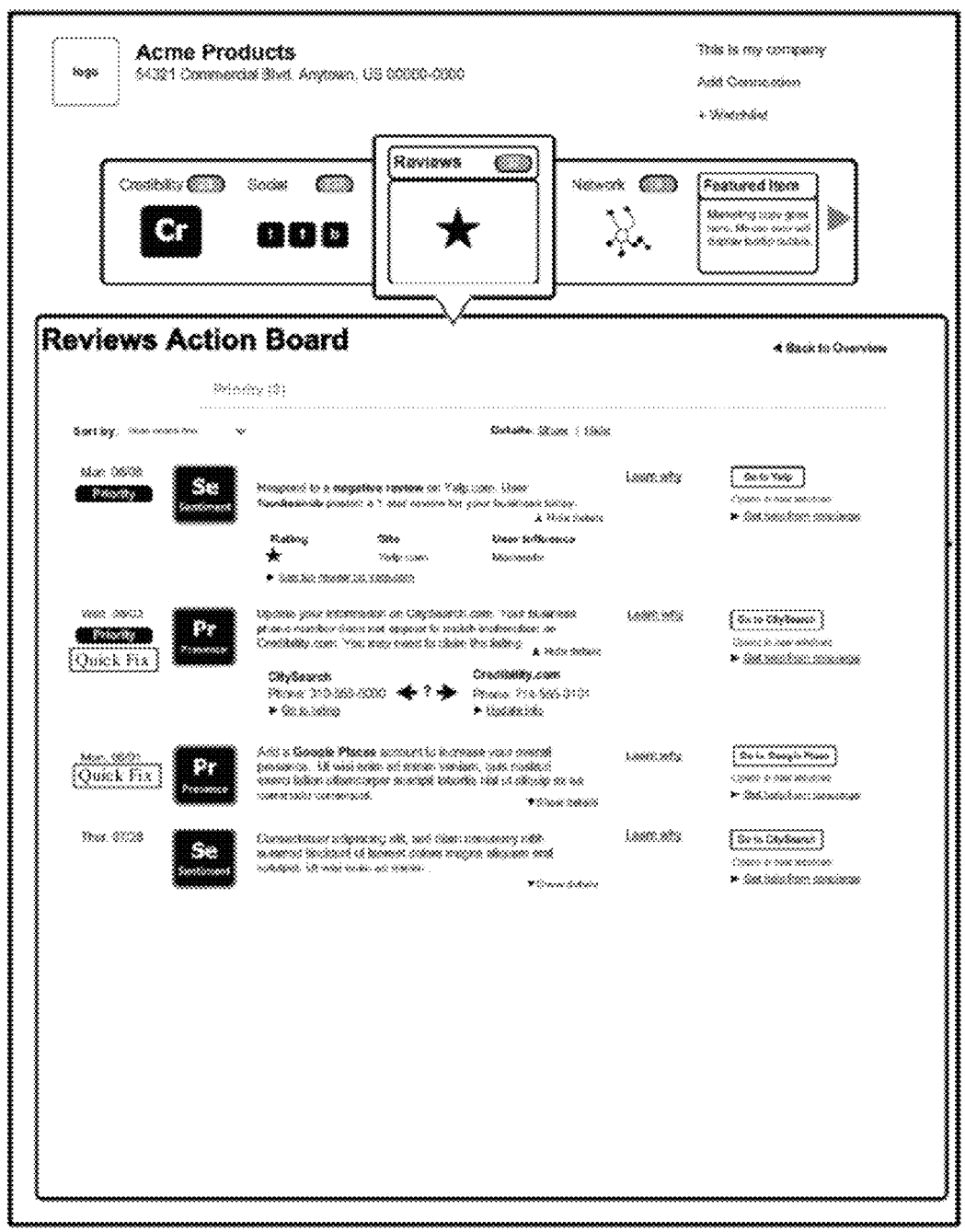
FIG. 30 presents credibility data that is accessed when drilling-down from the actions pane and that presents a comprehensive list of actions that can be performed by the entity to improve the reviews dimensions of its credibility in accordance with some embodiments.

The visualization pane 2720 presents how the aggregated quantitative credibility data for the entity trends over time. The updates pane 2730 presents the most recent set of quantitative credibility data that is aggregated for the entity from different review sites. The complete set of aggregated quantitative credibility data can be accessed by drilling-down from the updates pane 2730 to access the hierarchical layer of credibility data that is presented, for example, in FIG. 29. The actions pane 2240 presents a prioritized list of suggested actions that the entity can perform to improve the reviews dimensions of its credibility. The prioritized list of suggested actions is automatically determined by the credibility system based on the aggregated quantitative credibility data. The list of suggested actions can include addressing poor quantitative reviews, updating information, or suggesting changes to certain aspects of the entity that are poorly ranked or rated. A comprehensive list of actions that can be performed by the entity to improve the reviews dimensions of its credibility is accessible by drilling-down from the actions pane 2240 into the detailed actions hierarchical layer that is presented in FIG. 30.

Yet another dimension of credibility that can be isolated and viewed using the interface portal of some embodiments is the network dimension. The network dimension and the credibility data associated with this credibility dimension are accessed by selection of the network module 1745 of FIG. 17. The credibility data for the network dimension identifies the partnerships that are established for an entity. This credibility data can be aggregated from entity networking information that is maintained by the credibility system. Additionally or alternatively, this credibility data can be aggregated by the credibility system aggregating association requests from various data sources. In some embodiments, the association request includes a "friend" request, a "follow" request, a tag, a contact request, etc.

Networking is a component of credibility, because networking can be indicative of the quality of goods and services that will be offered by an entity and the trustworthiness and reputation of the entity. Specifically, an entity that sources good or raw materials from partners that are known to have high quality goods and raw materials than from partners that are known to have low quality goods and raw materials is likely to be more credible, because those goods and raw materials will often have a direct impact on the quality of goods and services offered by the entity. Similarly, an entity that partners with reputable or trusted partners is likely to be more credible than an entity that partners with unreputable or untrustworthy partners, because the entity is held to a higher standard by its partners.

Figure 31:
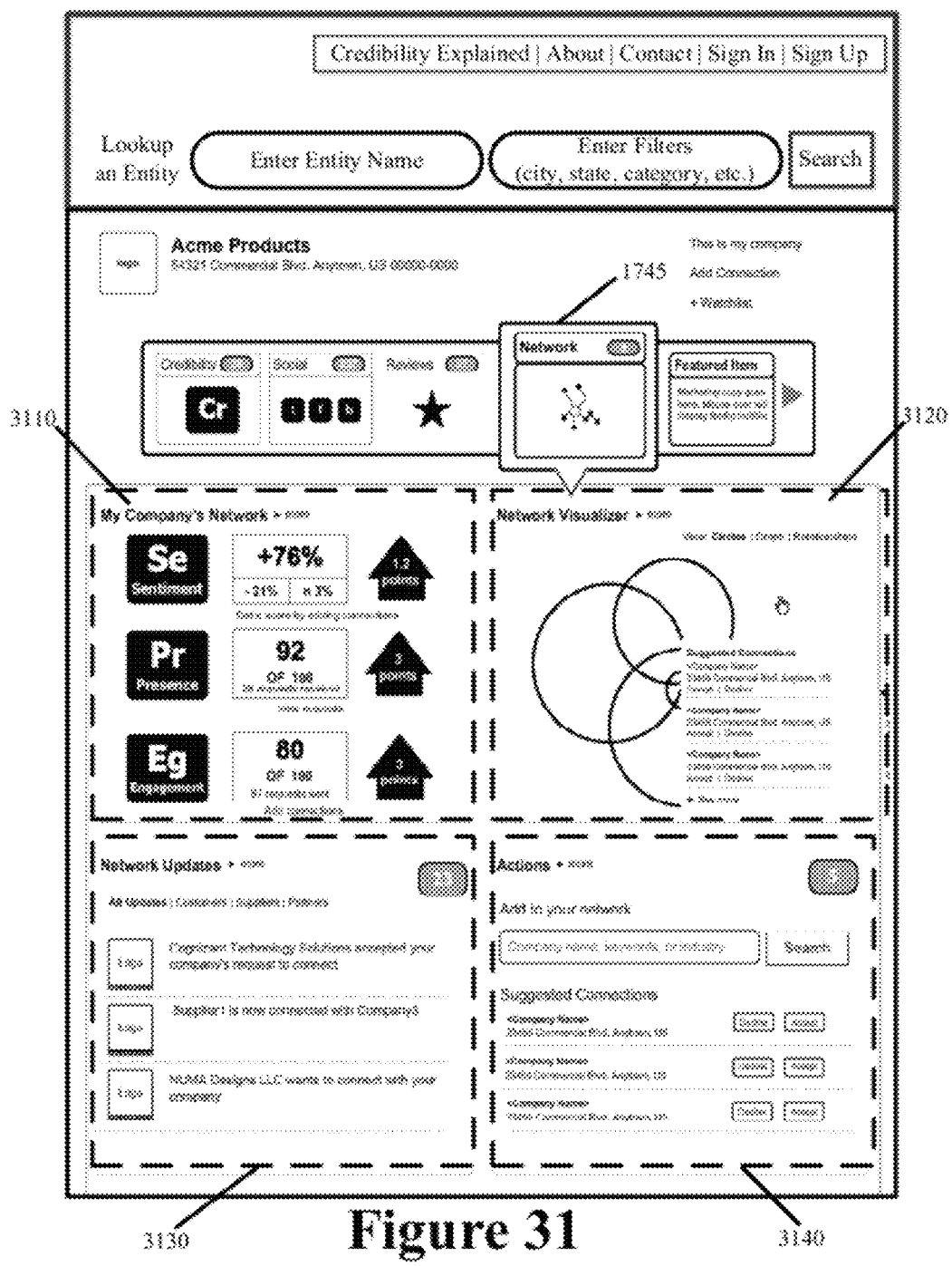
FIG. 31 presents the topmost hierarchical layer or first layer for the network module when the network module is selected in accordance with some embodiments.

FIG. 31 presents the topmost hierarchical layer or first layer for the network module 1740 when the network module 1740 is selected in accordance with some embodiments. The topmost hierarchical layer of the network module 1740 includes the common score pane 3110, visualization pane 3120, updates pane 3130, and actions pane 3140. The score pane 3110 computes one or more scores to convey the networking dimension of credibility at a quick glance. As shown, the score pane 3110 includes a sentiment score that is derived based on the quality or reputation of one's network partners (i.e., associations), a presence score that is derived based on the number of network partnerships that others initiate and establish with an entity of interest, and an engagement score that is derived based on the number of network partnerships that an entity of interest establishes with others. The visualization pane 3120 graphically depicts the partnerships of the entity based on the aggregated networking credibility data. The updates panes 3130 presents the most recent activity related to networking of the entity. This includes present sent and received association requests and accepted and rejected association requests. Drilling-down from the updates panes 3130 causes the interface portal to present all the association requests for the entity. The actions pane 3140 presents a prioritized list of actions that the entity can perform to improve the networking dimension of its credibility. Drilling-down from the actions pane 3140 reveals all actions that can be performed in order to improve the networking dimension for the credibility of the entity. These actions include automatically recommending new partnerships for the entity based on existing partnerships (e.g., new suppliers, distributors, etc), generating leads to new contacts based on existing partnerships (e.g., leads to customers of established partners), and identifying social networking contacts that can improve the networking dimension of credibility.

In summary, the interface portal provides an interactive display for comprehensively and holistically determining entity credibility with the ability to independently analyze each dimension of credibility by hierarchically providing access to the credibility data that is used to derive each dimension, wherein the credibility data is sourced from multiple disparate data sources. Several advantages are afforded from this manner of credibility reporting. Firstly, by aggregating credibility data from multiple disparate data sources, the derived credibility more accurately reflects the true credibility of an entity while reducing the impact that biased or outdated credibility data from a single data source may have on the derived credibility. Secondly, an entity can from a single interface view credibility data from the disparate data sources without having to separately access each such data source. Thirdly, the automatically identified actions determined by the credibility system and that are presented in the actions pane and drill-down layers accessible from the actions pane provide the entity with discrete readily identifiable actions that the entity can perform in order to improve its credibility without the entity having to understand the nuances of the disparate data sources and without having to manually analyze the aggregated credibility data.

iv. Dynamic Application Cubes

Entity credibility can be presented differently in different embodiments and different dimensions may be used to present such credibility. In the following examples, the interface portal provides interactive application cubes instead of the above described credibility modules to present various dimensions of credibility. Moreover, the dimensions of credibility provided below include a scoring dimension, a multimedia dimension, a company information dimension, a social networking dimension, a mapping dimension, a network dimension, a financial dimension, a reviews dimension, and a news dimension that collectively convey a comprehensive and holistic account of entity credibility. Accordingly, a different application cube may be provided to contain the credibility data for each such dimension of credibility.

Figure 32:
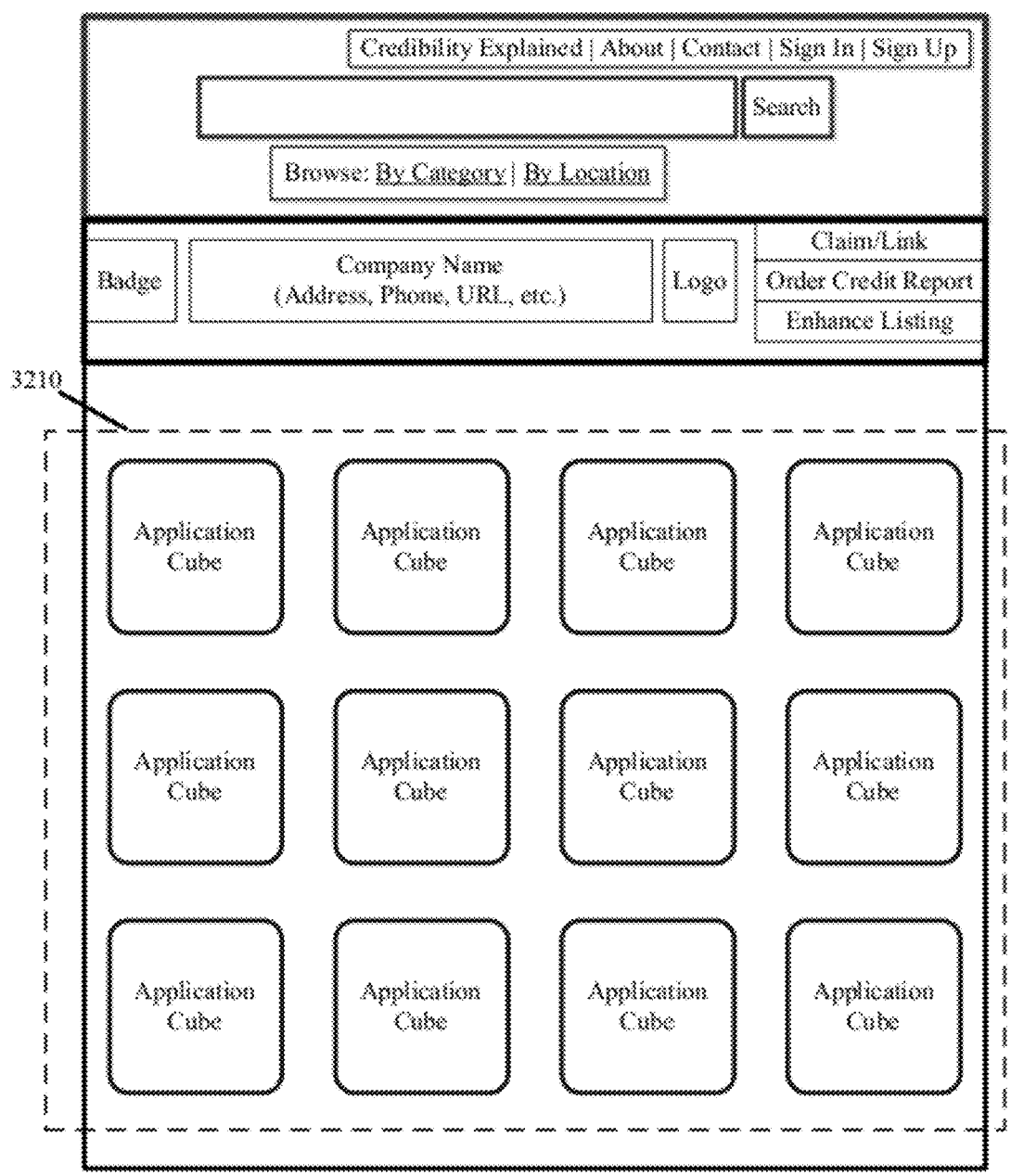
FIG. 32 presents an exemplary set of application cubes in a dynamically generated website that is produced by the interface portal in accordance with some embodiments.
Figure 33:
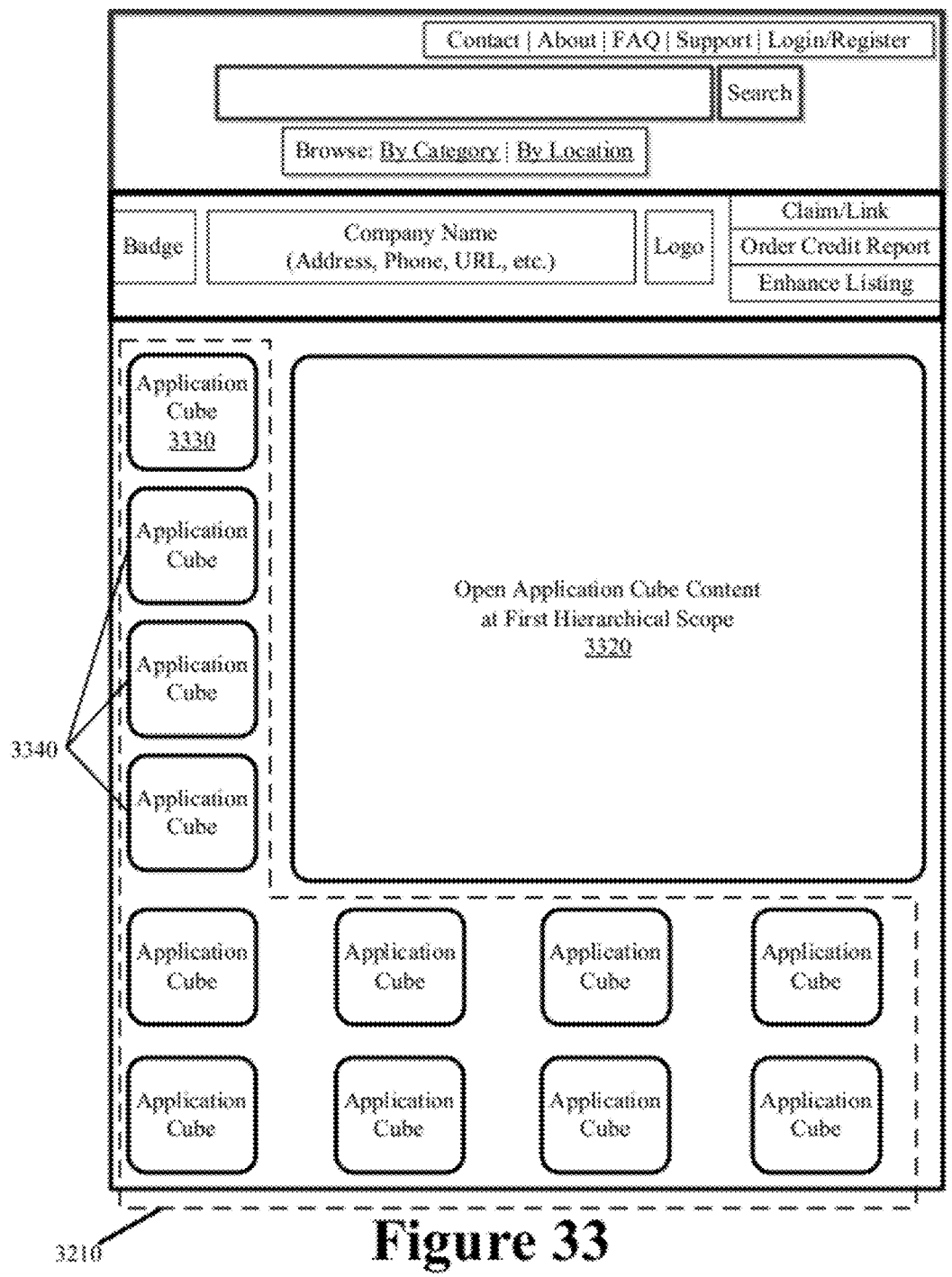
FIG. 33 illustrates an "open" application cube layout in accordance with some embodiments.

FIG. 32 presents an exemplary set of application cubes 3210 in a dynamically generated website that is produced by the interface portal in accordance with some embodiments. As shown, the set of application cubes 3210 is arranged according to a grid layout with each application cube displayed as a square or rectangular shaped graphical element. As will be described in detail below, each application cube provides access to credibility data of a different credibility dimension that affects the overall credibility of an entity. In some embodiments, the website layout of FIG. 32 is provided when the credibility report of a particular entity is first retrieved from the database based on an entity submitted query that was entered using the credibility directory or other means of access. When an entity interacts with a particular application cube, the layout of FIG. 32 changes and the layout of FIG. 33 is presented. In some embodiments, the layout of FIG. 33 is first presented instead of the layout of FIG. 32 when the credibility report of a particular entity is first retrieved from the database based on a user submitted query or other means of access.

FIG. 33 illustrates an "open" application cube layout in accordance with some embodiments. This layout includes the set of application cubes 3210 arranged adjacent to an application cube content display 3320. The application cube content display 3320 displays credibility data associated with an application cube that is in an "open" state. Each application cube of the set of application cubes 3210 has at least three states referred to hereafter as the "closed" state, the "active" state, and the "open" state.

An application cube is in the closed state when it is not being interacted with. In other words, a graphical pointing tool is not placed over the application cube, a graphical pointing tool was not recently used to click on the application cube, key focus is not on the application cube, or a touch on a touch sensitive device has not been detected in conjunction with the application cube. In some embodiments, the "tab" or other keyboard key can be used to change key focus to different application cubes and other keyboard keys can be used to interact with the application cube that has key focus. For example, pressing the "enter" keyboard key when an application cube has key focus is similar to clicking on that application cube when a graphical pointing tool is positioned over that application cube. All application cubes are in the closed state except an application cube that is in the active state and/or an application cube that is in the open state. Application cubes in the closed state are presented with a fixed size and may contain either static or dynamic content that identifies the credibility data that is associated with the application cube. In some embodiments, the graphical element of an application cube in the closed state is used to convey summary credibility data or a particular piece of credibility data. For example, an application cube that is associated with credibility scoring may display in its graphical element the overall credibility score for a particular entity as a static value or graphic when that application cube is in the closed state. Other examples are presented in the description below.

An application cube is in the active state when a graphical pointing tool hovers over the application cube, when a touch is currently making contact (i.e., pressing down on) with an application cube on a touch based interface (e.g., capacitive or resistive touchscreen), or when key focus is on an application cube. An application cube is expanded in size to indicate that it is in the active state and to differentiate it from the closed state application cubes.

Figure 34:
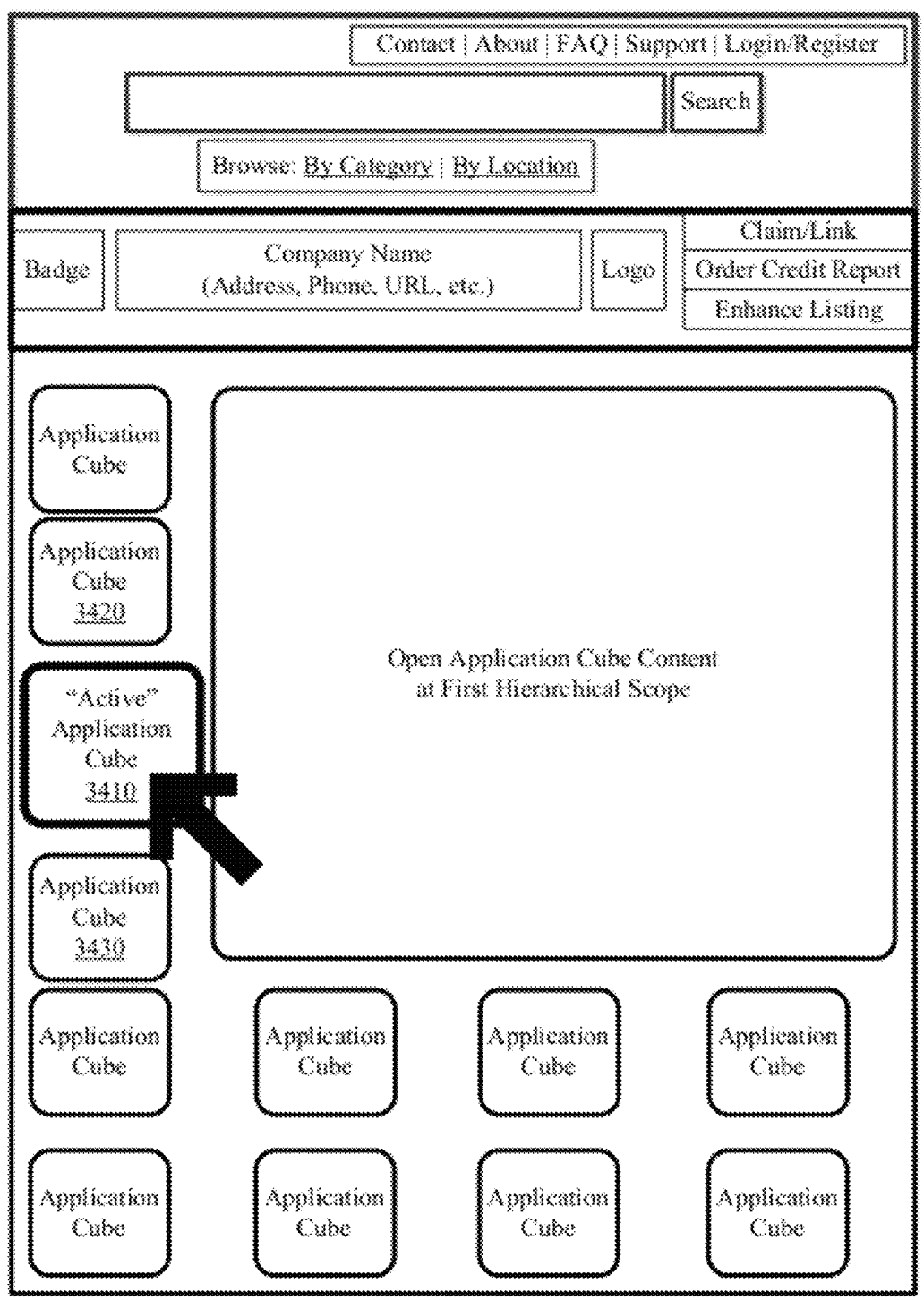
FIG. 34 illustrates an application cube in the active state in accordance with some embodiments.

FIG. 34 illustrates an application cube in the active state in accordance with some embodiments. In this figure, an entity places a graphical pointing tool over the graphical element of the application cube 3410. As a result, the application cube 3410 is enlarged and the neighboring application cubes 3420 and 3430 are slighted shifted from their previous positions to accommodate the change in size of the application cube 3410. In some embodiments, the graphical representation of the application cube 3410 also changes as the application cube 3410 transitions from the closed state to the active state. For example, the graphical element of the application cube 3410 may statically display a credibility score for a particular entity when in the closed state and display component credibility scores (e.g., social media score, reviews score, etc.) for that particular entity when in the active state.

An application cube is in the open state when that application cube is clicked on or otherwise selected. When using a touch based interface, the application cube may be transitioned to the open state by tapping (i.e., touching and releasing the touch) the graphical element for that application cube. When using a keyboard, the application cube may be transitioned to the open state by giving that application cube key focus and then pressing the enter key or by pressing some keyboard shortcut that directly opens that application cube (e.g., pressing "ctrl-S" to open a credibility scoring application cube).

When an application cube is transitioned to the open state, that application cube is moved to the top-left of the layout as shown by application cube 3330 of FIG. 33 and a first hierarchical layer of credibility data associated with that application cube 3330 is displayed in the application cube content display 3320. Other application cubes in the closed state are moved to accommodate the position of the opened application cube. In some embodiments, the website layout of FIG. 33 includes various "home spots" 3340. The home spots 3340 are located along the left side column, underneath the currently open application cube 3330. The home spot application cubes 3340 remain at their designated positions unless transitioned to the open state or removed from the home spots. In some embodiments, the application cubes can be dragged and dropped to customize the application cubes at the home spots 3340 and the position of other application cubes in the layout. This allows an entity to customize the display by placing the most relevant application cubes in the most easily accessible positions on the website.

Any entity can navigate to different hierarchical layers of credibility data that are associated with the open application cube by interacting with the credibility data and various graphical tools at the current hierarchical layer that is presented in the content display 3320. In some embodiments, each lower hierarchical layer presents more detailed credibility data for the data that was presented in the preceding hierarchical layer. The credibility data is presented in this drill-down fashion so as to avoid the viewer from being overwhelmed with too much data at any particular hierarchical layer.

When a new hierarchical layer is accessed, credibility data associated with the new hierarchical layer "slides" into the content display 3320 and the previous content is removed. Invoking a back button causes the content display 3320 to return to the previous hierarchical layer or previous credibility data.

Figure 35:
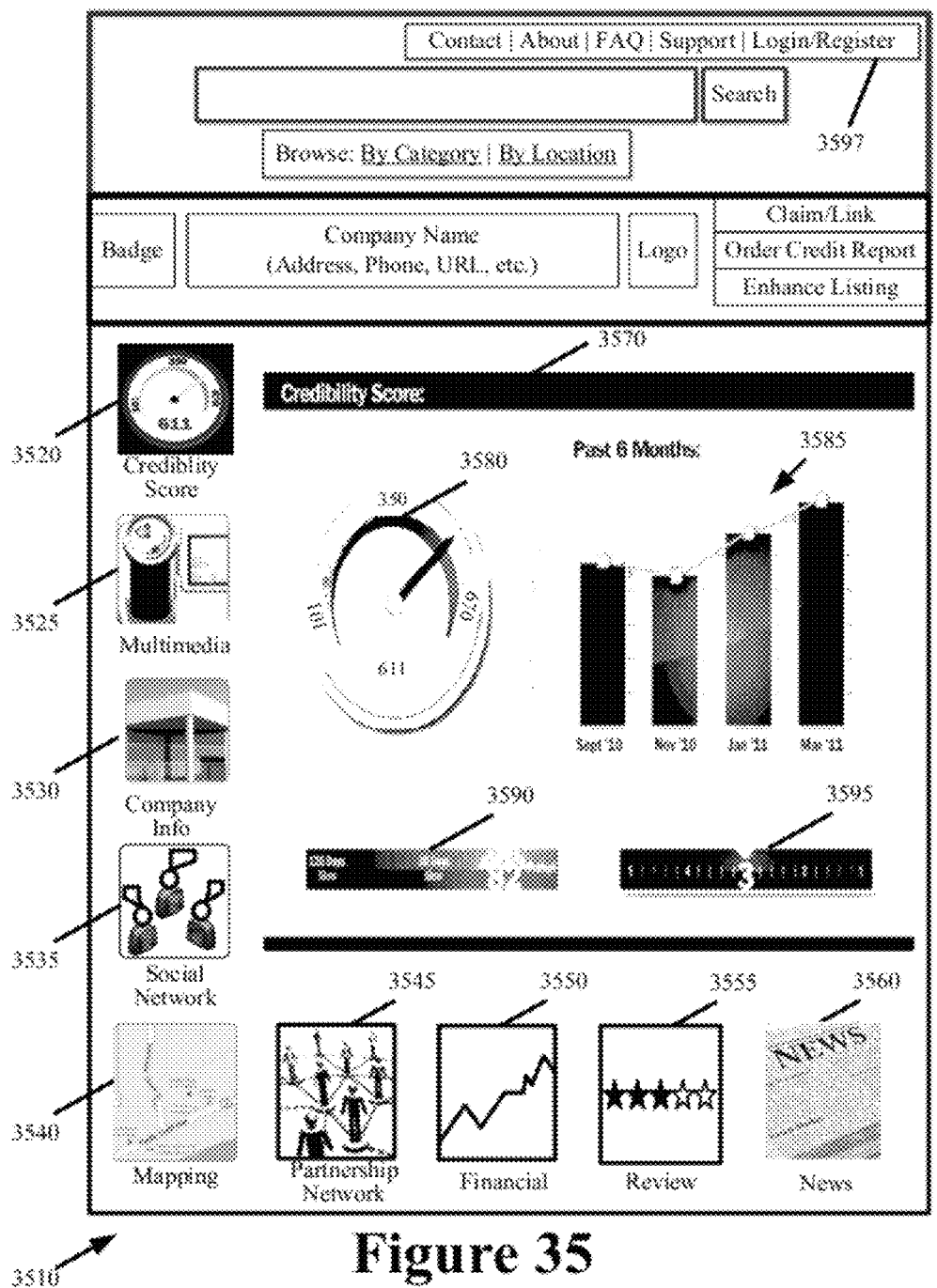
FIG. 35 illustrates a dynamically generated website that includes a set of application cubes for presenting credibility data for a particular entity in accordance with some embodiments.

FIG. 35 illustrates a dynamically generated website 3510 that includes a set of application cubes for presenting credibility data for a particular entity in accordance with some embodiments. As shown, the website 3510 includes (1) a credibility scoring application cube 3520 that is in the open state, (2) a multimedia application cube 3525, a company information application cube 3530, and a social network application cube 3535 that are at the home spots and that are in the closed state, and (3) a mapping application cube 3540, a partnership application cube 3545, a financial application cube 3550, a reviews application cube 3555, and a news application cube 3560 in the closed state. A first hierarchical layer of credibility data that is associated with the credibility scoring application cube 3520 is presented in the content display 3570.

As noted above, application cubes in the closed state may provide a graphical representation to identify the contained credibility data. In some embodiments, the credibility scoring application cube 3520 displays an overall credibility score for an entity when in the closed state and displays two or more component scores when in the active state. Application cubes in the closed state need not provide such informative credibility data and can include simple text or graphics to identify the underlying credibility data.

In FIG. 35, the content display 3570 displays a first hierarchical layer of credibility data that is associated with the credibility scoring application cube 3520 that is in the open state. Specifically, this first hierarchical layer provides an easily referenced and summarized presentation of the entity's credibility score. As shown, the content display 3570 presents a dial indicator 3580 to graphically represent the overall credibility score for the entity, a scale 3585 of the credibility score over the past 6 months, and slider tools 3590 and 3595 to allow for interactive adjustments to be made to the display.

In some embodiments, the dial indicator 3580 and the scale 3585 are interactive and can be used to access additional hierarchical layers that provide more detailed information as to the derivation of the overall credibility score. For instance, by clicking on the dial indicator 3580, a new set of credibility data relating to the derivation of the credibility score is slid into the content display 3570. At this second hierarchical layer, the overall credibility score is exploded into two or more component scores from which the overall credibility score is derived. In some embodiments, each such component score and the credibility data used to derive the component score is stored at lower hierarchical layers within the credibility scoring section of the credibility report. In some embodiments, the component scores include a sentiment score, a presence score, and an engagement score.

To access additional or more detailed credibility data beyond the second hierarchical layer, the component scores are interactive such that an entity can click on each component score to drill-down another layer into the credibility score derivation hierarchy. For example, clicking on the sentiment score changes the display of the content display 3570 to show a plurality of the aggregated quantitative and qualitative credibility data used to derive the sentiment score. Entities can then identify, how many positive scores were aggregated, which data sources the scores were aggregated from, who the users that provided the scores are, trends in the scores (e.g., overall positive in the last two months), etc.

Accordingly, the topmost or first hierarchical layer encapsulates the aggregated credibility data associated with a particular application cube in a summary format. From this summary format, one can quickly ascertain at least one dimension of an entity's credibility. Each descending hierarchical layer then expands on this dimension of credibility by providing additional or more detailed credibility data from which users can gain additional insight or more in depth knowledge as to the factors affecting that dimension of credibility.

In some embodiments, the scale 3585 is interactive and can be used to access a second hierarchical layer that provides a more detailed history of the entity's credibility score. Moreover, slider tools allow for manipulation of the credibility data presented at the first hierarchical layer. For example, changing the slider tool 3595 changes the range of scale 3585 to present a greater or narrower historical view of the entity's credibility scores.

As noted above, the credibility system can monetize the presentation of the information by restricting access of unpaid entities to a first set of hierarchical layers while providing paying entities accesses to additional hierarchical layers that descend beyond the first set of hierarchical layers. In some embodiments, a registered entity with enhanced access permissions can modify the presentation of the credibility scoring application cube 3520. To do so, the entity first registers with the credibility system by clicking on the link 3597 and entering the login information. Once registered, one or more enhancement links are presented in the content display 3570 whereby the entity can rearrange or change the size of graphical elements in the content display 3570 or add or remove content from the hierarchical layer that is currently open as some examples. For example, the entity may be allowed to insert awards or certifications at the first hierarchical layer of the credibility scoring application cube 3520 to supplement its credibility score.

In some embodiments, the multimedia application cube 3525 is a cube that provides images (e.g., photographs) or videos of the brick and mortar store for the respective entity. Additionally, the multimedia application cube 3525 may include alternative logos, images of company events, or other company imagery. Such imagery is a dimension of credibility, because the imagery can positively or negatively affect whether a user or other business decides to engage in commercial transactions with the entity. For example, an image of a run-down storefront may dissuade potential clientele from visiting that entity whereas an image of a recently remodeled storefront may attract potential clientele to the entity.

Figure 36:
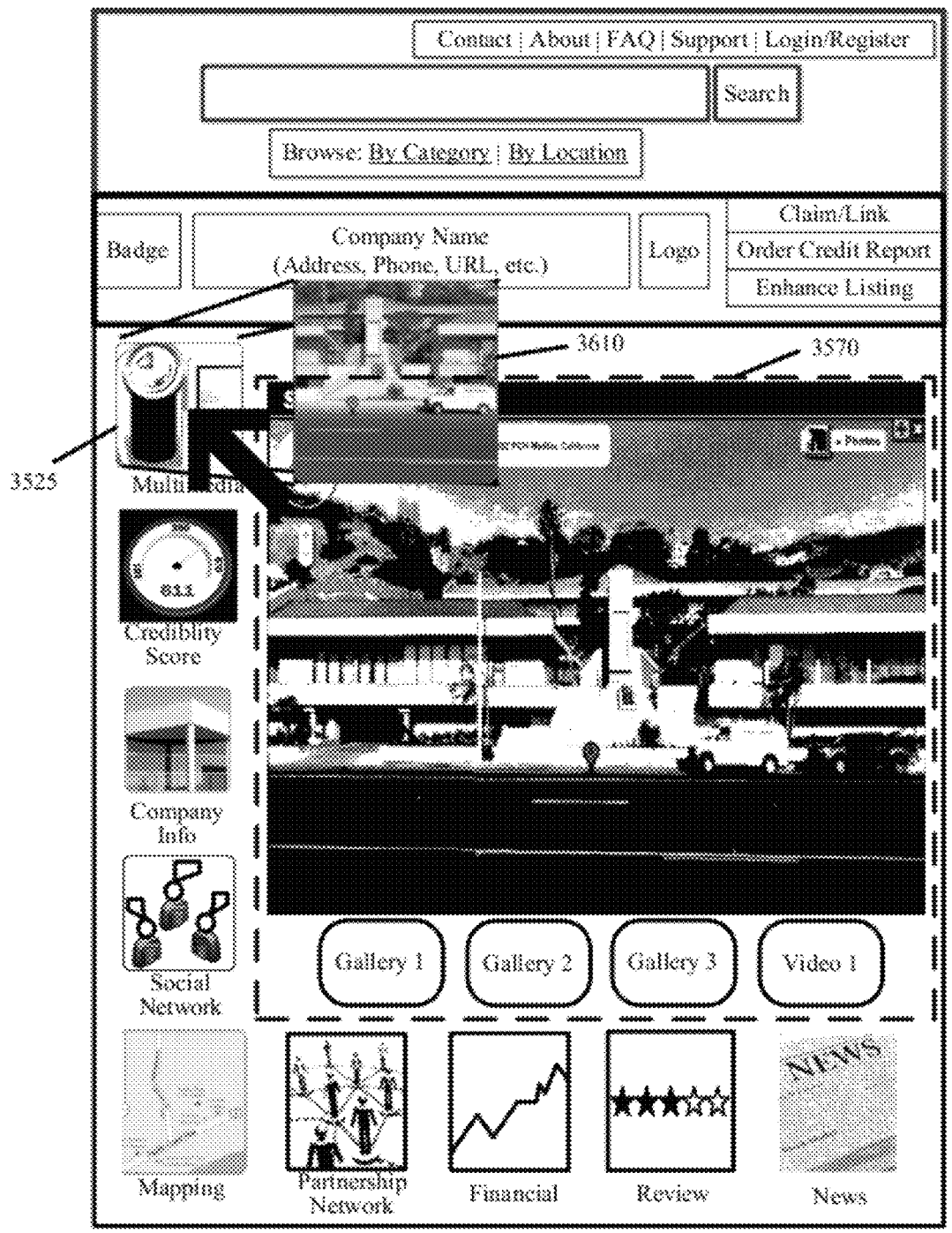
FIG. 36 illustrates the multimedia application cube when in the active state and a first hierarchical layer of credibility data that is associated with a credibility dimension represented by the multimedia application cube when the multimedia application cube is in the open state.

In some embodiments, the multimedia application cube 3525 provides a static image of the business store front when in the closed state. As shown in FIG. 36, the multimedia application cube 3525 provides an enlarged or higher resolution image of the business store front 3610 when in the active state. In some other embodiments, the multimedia application cube 3525 provides a spanning image or short video clip of the storefront when in the active state. Also as shown in FIG. 36, the content display 3570 provides access to a gallery of images or videos of the entity when in the open state of the multimedia application cube 3525. Drilling-down into the multiple application cube 3525 can provide access to other galleries that provide images of key personnel (e.g., management) or other satellite branches, offices, or locations of the entity. Access to the images in these galleries may be restricted to paying customers as a means of monetizing the credibility data associated with the multimedia application cube 3525. A registered entity with enhanced access permissions can supplement the credibility data of the multimedia application cube 3525 by adding a recorded or live video feed that shows the interior of its business location. Additionally, the enhanced access permissions can allow the entity to update the images in real-time, whereas those with basic access permissions may be unable to perform such real-time updates. Such real-time updates can be used as a means to market, advertise, or promote new goods or services.

In some embodiments, the company information application cube 3530 provides descriptive company information about an entity. Such information is pertinent to the credibility of an entity in that the information identifies whether or not the correct or desired entity has been selected as many entities may share one or more dimensions of descriptive identification information such as a entity name and URL even though the entity may operate as separate entities. Additionally, this application cube 3530 may serve as the interface to accessing credit data for the entity or as an interface through which the entity can post news, employment opportunities, general information about the company, coupons, promotions, and other offers at various hierarchical layers.

In the closed state, the company information application cube 3530 may display an entity logo. In some embodiments, the company information application cube 3530 provides a larger company logo when in the active state. The content display 3570 displays a first hierarchical layer of credibility data that is associated with the company information application cube 3530 when that cube is in the open state. This includes presenting a name, address, telephone, URL, etc. of the entity. This information may be sourced from the entity itself or other data sources such as Dun & Bradstreet. In some embodiments, the first hierarchical layer associated with the company information application cube 3530 includes links that when interacted with enable access to a credit report for the entity or other news, employment opportunities, general information, coupons, promotions, etc. Access to such content may be restricted to paying entities. Moreover, the ability to add such content may be restricted to registered entities that have paid for enhanced access permissions. Accordingly, a registered entity with basic access permissions will be unable to update its company information application cube 3530 with promotions or offers, whereas a registered entity with enhanced access permissions will be able to do so.

In some embodiments, the social network application cube 3535 provides an interface through which social network feeds from one or more social network data sources relating to a particular entity are presented. This dimension of credibility provides a real-time view of what others are saying about a particular entity and may also serve as a real-time view of what the entity is saying about itself, including news, promotions, etc. As noted above, this credibility data can be acquired through partnerships with data sources such as www.twitter.com, www.facebook.com, and other social network sites. Specifically, this credibility data may include twitter tweets and facebook status updates that pertain to the particular entity.

Figure 37:
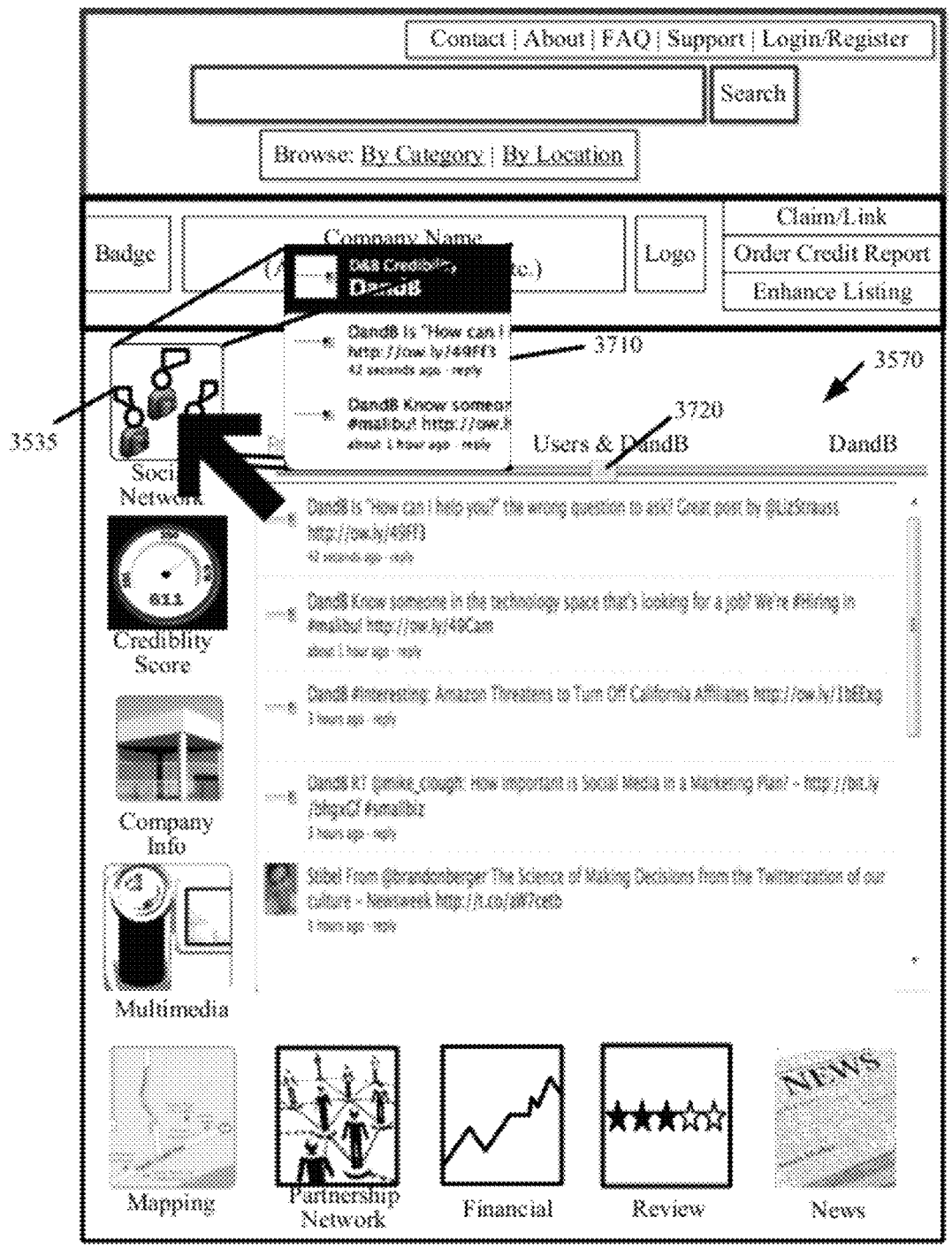
FIG. 37 illustrates the social network application cube when in the active state and a first hierarchical layer of credibility data that is associated with a credibility dimension represented by the social network application cube when the social network application cube is in the open state.

In the closed state, the social network application cube 3535 may display an icon for identifying the contents of the application cube 3535. As shown in FIG. 37, the social network application cube 3535 provides a limited set of social network messages (e.g., three twitter tweets) 3710 when in the active state. Also as shown in FIG. 37, the content display 3570 displays a first hierarchical layer of credibility data that is associated with the social network application cube 3535 when that cube is in the open state. In some embodiments, this includes displaying social network messages originated by the entity and messages originated by third party submitters. Additional hierarchical layers allow an entity to add or remove various social network feeds and also filter individual messages that inaccurately reflect on the entity. Interactive tools (i.e., slider tool 3720) associated with the social network application cube 3535 allow entities the ability to sort, organize, or otherwise change the social network messages presented in the content display 3570. In some embodiments, free users (i.e., nonpaying entities) are allowed to access feeds that include messages from other users and not feeds from the entity, whereas paying users are allowed to access feeds from both users and the entity. Paying users may also be provided tools to search or organize the data of the feeds. In some embodiments, registered entities with enhanced access permissions are allowed to enter real-time messages or status updates, whereas registered entities with basic access permissions are unable to do so.

In some embodiments, the mapping application cube 3540 is a geo-services cube that provides mapping, directions, street views, and/or panoramic imagery for a business entity. This dimension of credibility compliments that presented by the multimedia application cube 3525 by providing additional reference as to the distance one would have to travel to visit the business, whether the business is located in a desirable area, visual identification of the business, etc. Such credibility data may be stored in the credibility report or may be referenced in the credibility report using links that access mapping services provided by third parties such as Google Maps or MapQuest.

Figure 38:
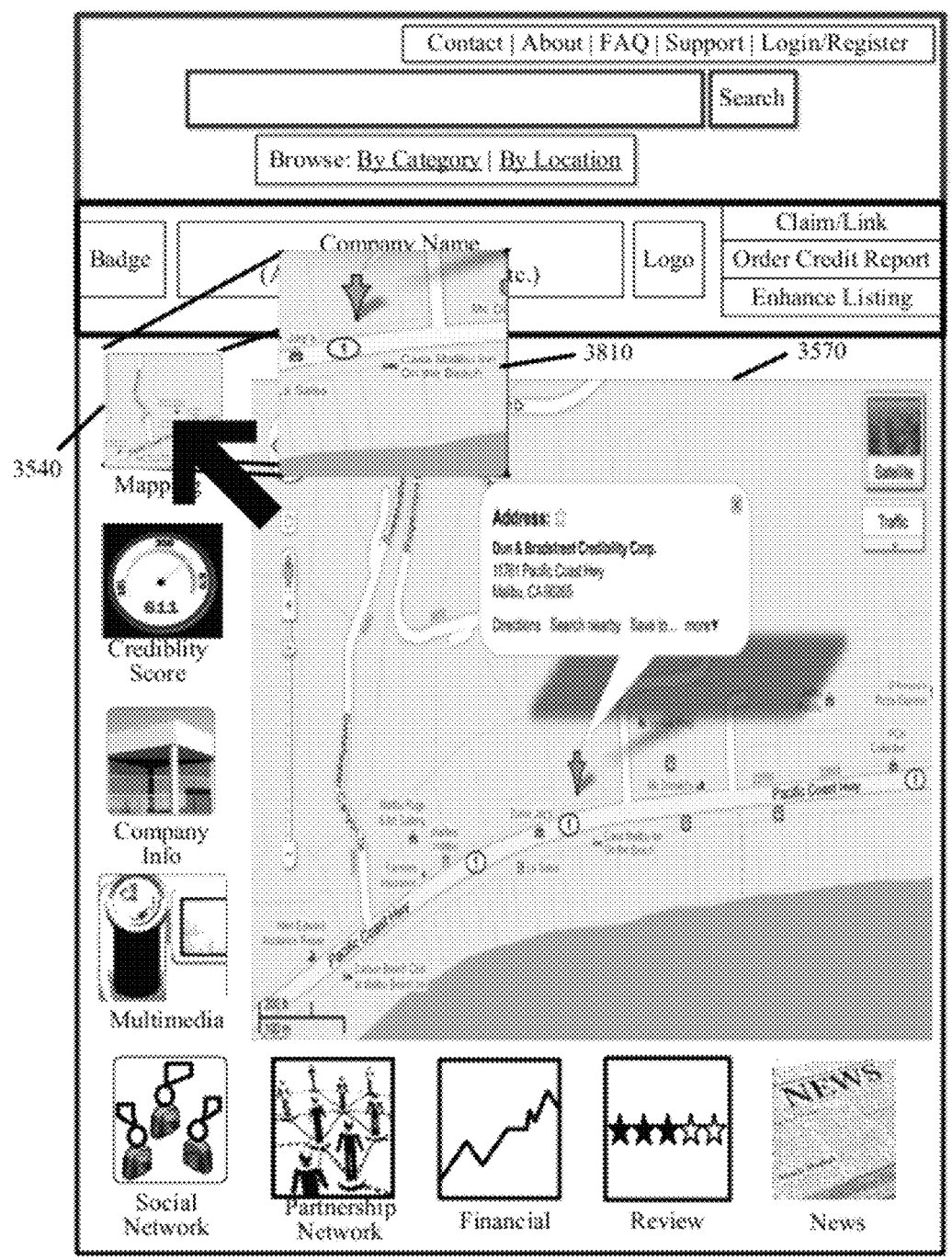
FIG. 38 illustrates the mapping application cube when in the active state and a first hierarchical layer of credibility data that is associated with a credibility dimension represented by the mapping application cube when the mapping application cube is in the open state.

In the closed state, the mapping application cube 3540 of some embodiments displays a cropped map with the position of the business pinned on the map. As shown in FIG. 38, the mapping application cube 3540 provides a larger map 3810 of the local area surrounding the business to better orient the user as to the location of that business when the application cube 3540 is in the active state. Also as shown in FIG. 38, the content display 3570 displays a first hierarchical layer of mapping data that is associated with the mapping application cube 3540 when that cube is in the open state. Specifically, this mapping data includes a full sized map with all associated functionality. The functionality associated with this application cube 3540 allows users the ability to interact with the map by zooming, panning, dragging, obtaining directions, and changing views (street, satellite, traffic, etc.) as some examples of available functionality. Certain mapping functionality may be restricted to paying users.

In some embodiments, the partnership application cube 3545 provides business-to-business networking whereby business entities can stay connected to and maintain relationships with their suppliers, distributers, clients, etc. Such information provides yet another dimension of credibility by displaying the business' contacts so that a user can determine whether that business is associated with other reputable businesses which can serve as an indication as to the quality of the business' goods, services, and growth potential. For example, whether the components of the goods sold by the business are sourced from a reputable supplier or a supplier who is known to have quality issues. In some embodiments, this information is stored to the credibility report in different hierarchical layers whereby a first hierarchical layer displays first degree connections (i.e., direct business contacts) and a second hierarchical layer displays second degree connections (i.e., indirect business contacts or business contacts that are separated by at least one intermediary). The credibility report may contain reference links in order to obtain the partnership or networking information from third party data sources such as www.linkedin.com or www.spoke.com.

Figure 39:
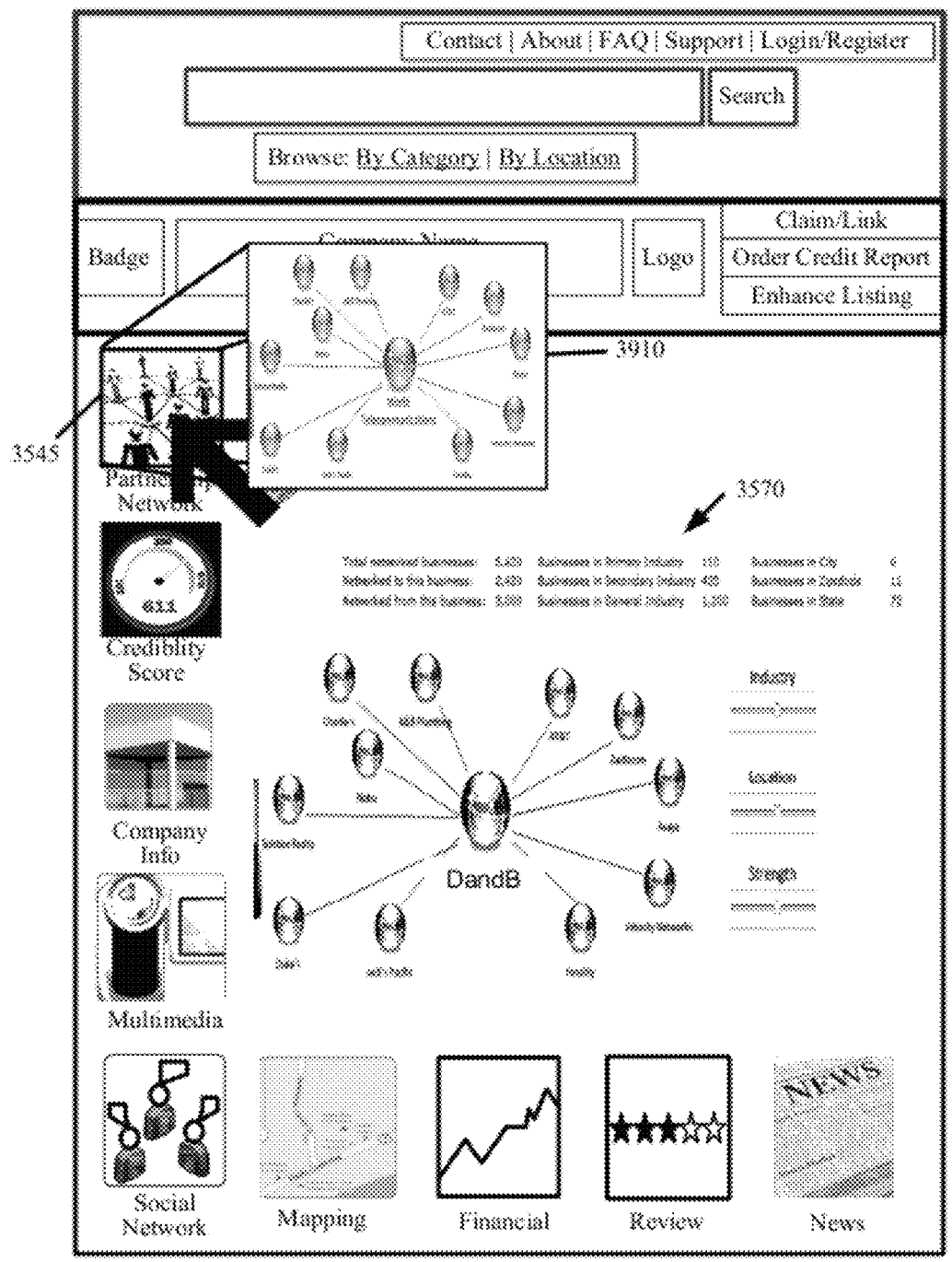
FIG. 39 illustrates the partnership application cube when in the active state and a first hierarchical layer of credibility data that is associated with a credibility dimension represented by the partnership application cube when the partnership application cube is in the open state.

In the closed state, the partnership application cube 3545 displays an icon or graphical representation for identifying the number of established entity connections. As shown in FIG. 39, the partnership application cube 3545 provides a visual representation 3910 of the established entity connections when in the active state. In some embodiments, this representation 3910 graphically displays multiple degrees of connections (e.g., first degree and second degree connections). Also as shown in FIG. 39, the content display 3570 displays a first hierarchical layer of partnership data when the partnership application cube 3545 is in the open state. This includes displaying established first degree entity connections whereby clicking on or interacting with a first degree entity connection accesses a second hierarchical layer that displays second degree entity connections that are associated with the clicked on or interacted with first degree entity connection. In some embodiments, the content display 3570 provides a large visualization of the entity's partnership network whereby all entities in the entity's partnership network are linked to identify the at least first and second degree connections. Such visualization can be supplemented using maps that display a physical location of each established connection.

In some embodiments, nonpaying entities are allowed to view the connections and paying entities are permitted to both view the connections and contact partners displayed via the connections. For example, by clicking on a partner icon, a paying entity can send an email or connection request to that partner. In this manner, entities can expand their own network with other entities that are known to be credible by virtue of their association with other credible entities. Entities with enhanced access permissions are allowed to add new connections to or remove existing connections from the partnership network in order to maintain an up-to-date and real-time view of the partnership network.

In some embodiments, the financial application cube 3550 is for presenting financial data for publicly traded companies or for companies that otherwise disclose their financial records. This dimension of credibility supplements other credibility data of the other application cubes by disclosing the financial state of a given business in the same interactive window as other aggregated credibility data. As such, a user or business does not have to access or create accounts with multiple data sources to view all such data. In some embodiments, the financial data is aggregated to the credibility reports or is acquired in real-time using links in the credibility report that reference other financial data sources such as Yahoo! Finance or Etrade.

In the closed state, the financial application cube 3550 may display a stock symbol for the corresponding business entity. When in the active state, the financial application cube 3550 provides a chart displaying the stock price or other measure of financial health of the business entity over a specified time period. In some embodiments, the content display 3570 displays a first hierarchical layer of financial data when the financial application cube 3545 is in the open state. This data includes stock charts, stock price ticker, news relating to the business, news relating to the corresponding industry of the business, and analyst ratings and reports as some examples. Entities can interact with the data to access different second hierarchical layers of financial data while the financial application cube 3550 is in the open state. For example, clicking or interacting with a stock chart will change the content display 3570 to allow a user to change the chart range (e.g., 5 minute, 1 day, 1 month, etc.) and clicking or interacting with a news link will change the content display 3570 to show the news report. In some embodiments, paying entities will have access to exclusive financial information such as analyst reports.

In some embodiments, the reviews application cube 3555 is for presenting aggregated reviews and ratings related to an entity. This credibility data includes the above described aggregated qualitative data and quantitative from data sources such as www.yelp.com and www.citysearch.com. In the closed state, the reviews application cube 3555 may display an aggregate or summary quantitative score that is based on available reviews for that entity across different data sources. When in the active state, the reviews application cube 3555 displays the three most current or recently submitted reviews. When in the open state, the reviews application cube 3555 populates the content display 3570 with a listing of reviews and ratings. Interactions when the reviews application cube 3555 is in the open state allow entities the ability to filter the reviews and rating by the data sources, the reviews that are associated with a particular rating, or location (e.g., a particular branch). It should be apparent that other interactions may be available to provide additional means with which to sort or organize the presented credibility data that is associated with the reviews application cube 3555. In some embodiments, enhanced interactions associated with this application cube 3555 allow entities the ability to report mismatched reviews or remove certain types of reviews (e.g., biased, incorrect, negative, etc.). In some embodiments, some degree of overlap exists between the reviews application cube 3555 and the credibility scoring application cube 3520. However such overlap is mitigated based on the structure of how the overlapping credibility data is presented and in what hierarchical layers different credibility data is presented.

In some embodiments, the news application cube 3560 provides news that is specific to an entity. The news may be sourced from aggregators such as Topix or one or more RSS feeds from news data sources. In the closed state, the news application cube 3560 provides a newspaper icon or a recent news headline. When in the active state, the news application cube 3560 provides a recent news headline or a snippet from the related story. When in the open state, the content display 3570 is populated with clickable or interactive news headline listings whereby clicking or interactive with a particular listing accesses a second hierarchical layer that presents the complete news story.

The foregoing is presented as an exemplary set of application cubes for grouping and presenting credibility data. Additional application cubes may be included in addition to or instead of some of the application cubes of the above described set of application cubes. For example, application cubes that present "comps" (i.e., information about related entities) may be included or that present milestones for an entity in a timeline format may be included. Accordingly, the exemplary set of application cubes is not meant to be an exhaustive listing and other application cubes may be developed to supplement or alter the functionality of the interface portal of some embodiments.

In some embodiments, the interface portal dynamically generates a website for a particular entity that includes those application cubes for which corresponding credibility data exists in the credibility report for that particular entity. For example, a first entity may be a publicly traded company for which financial information is publicly available and a second entity may be a privately held company for which financial information is not publicly available. In this example, the interface portal will dynamically generate a website for the first entity that includes the financial application cube 3550 and will dynamically generate a website for the second entity that will not include the financial application cube 3550. As another example, social network data, such as "tweets", may exist for the second entity and not for the first entity. Accordingly, the interface portal will dynamically generate a website for the first entity that does not include the social network application cube 3535 and will dynamically generate a website for the second entity that does include the social network application cube 3535.

III. Computer System

Many of the above-described processes and modules are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Computer and computer system are meant in their broadest sense, and can include any electronic device with a processor including cellular telephones, smartphones, portable digital assistants, tablet devices, laptops, desktops, and servers. Examples of computer-readable media include, but are not limited to, CD-ROMs, flash drives, RAM chips, hard drives, EPROMs, etc.

Figure 40:
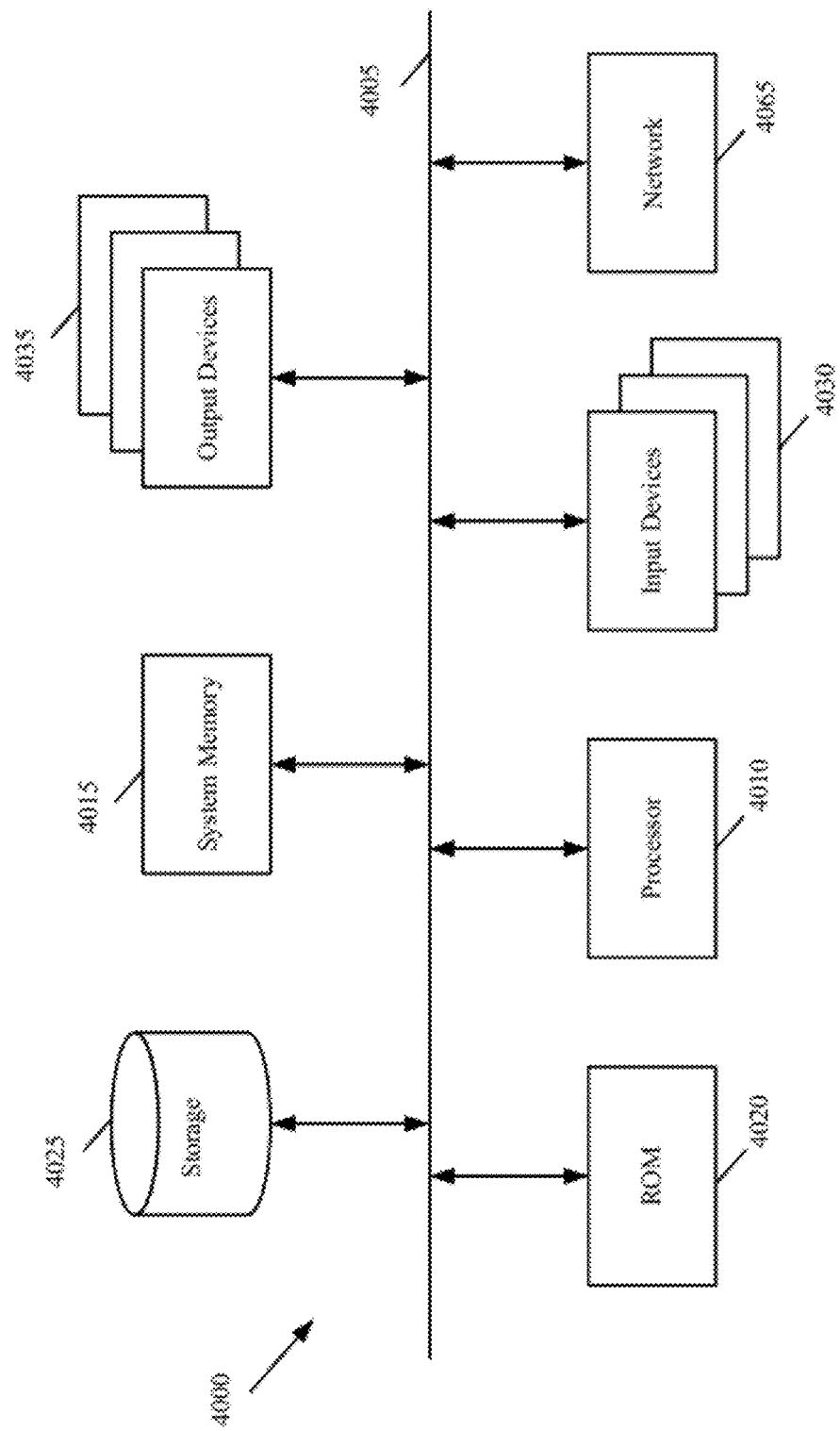
FIG. 40 illustrates a computer system with which some embodiments are implemented.

FIG. 40 illustrates a computer system with which some embodiments are implemented. Such a computer system includes various types of computer-readable mediums and interfaces for various other types of computer-readable mediums that implement the various processes, modules, and engines described above (e.g., master data management acquisition engine, reporting engine, interface portal, etc.). Computer system 4000 includes a bus 4005, a processor 4010, a system memory 4015, a read-only memory 4020, a permanent storage device 4025, input devices 4030, and output devices 4035.

The bus 4005 collectively represents all system, peripheral, and chipset buses that communicatively connect the numerous internal devices of the computer system 4000. For instance, the bus 4005 communicatively connects the processor 4010 with the read-only memory 4020, the system memory 4015, and the permanent storage device 4025. From these various memory units, the processor 4010 retrieves instructions to execute and data to process in order to execute the processes of the invention. The processor 4010 is a processing device such as a central processing unit, integrated circuit, graphical processing unit, etc.

The read-only-memory (ROM) 4020 stores static data and instructions that are needed by the processor 4010 and other modules of the computer system. The permanent storage device 4025, on the other hand, is a read-and-write memory device. This device is a non-volatile memory unit that stores instructions and data even when the computer system 4000 is off. Some embodiments of the invention use a mass-storage device (such as a magnetic or optical disk and its corresponding disk drive) as the permanent storage device 4025.

Other embodiments use a removable storage device (such as a flash drive) as the permanent storage device. Like the permanent storage device 4025, the system memory 4015 is a read-and-write memory device. However, unlike storage device 4025, the system memory is a volatile read-and-write memory, such a random access memory (RAM). The system memory stores some of the instructions and data that the processor needs at runtime. In some embodiments, the processes are stored in the system memory 4015, the permanent storage device 4025, and/or the read-only memory 4020.

The bus 4005 also connects to the input and output devices 4030 and 4035. The input devices enable the user to communicate information and select commands to the computer system. The input devices 4030 include any of a capacitive touchscreen, resistive touchscreen, any other touchscreen technology, a trackpad that is part of the computing system 4000 or attached as a peripheral, a set of touch sensitive buttons or touch sensitive keys that are used to provide inputs to the computing system 4000, or any other touch sensing hardware that detects multiple touches and that is coupled to the computing system 4000 or is attached as a peripheral. The input device 4030 also include alphanumeric keypads (including physical keyboards and touchscreen keyboards), pointing devices (also called "cursor control devices"). The input devices 4030 also include audio input devices (e.g., microphones, MIDI musical instruments, etc.). The output devices 4035 display images generated by the computer system. The output devices include printers and display devices, such as cathode ray tubes (CRT) or liquid crystal displays (LCD).

Finally, as shown in FIG. 40, bus 4005 also couples computer 4000 to a network 4065 through a network adapter (not shown). In this manner, the computer can be a part of a network of computers (such as a local area network ("LAN"), a wide area network ("WAN"), or an Intranet, or a network of networks, such as the Internet. For example, the computer 4000 may be coupled to a web server (network 4065) so that a web browser executing on the computer 4000 can interact with the web server as a user interacts with a GUI that operates in the web browser.

As mentioned above, the computer system 4000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A graphical user interface (GUI) for interactively presenting entity credibility, the GUI instantiated by computer software stored on a non-transitory computer-readable storage medium and configured to perform a computer-implemented method, the computer-implemented method comprising:

receiving input specifying a specific entity;

presenting, in a display area of the GUI, a set of selectable graphical elements comprising at least first, second, third, and fourth selectable graphical elements;

populating said display area with overall credibility data presenting a credibility score numerically quantifying overall reputation of the specific entity responsive to said first selectable graphical element being selected, wherein the credibility score is derived from credibility data of at least a first dimension of credibility, a second dimension of credibility, and a third dimension of credibility; and populating said display area with qualitative credibility data presenting the first dimension of credibility for said specific entity responsive to said second selectable graphical element being selected, wherein populating said display area with the qualitative credibility data presenting the first dimension of credibility comprises (i) aggregating a plurality of textual reviews targeting the specific entity from a plurality of social media sites originating said reviews, (ii) computing a review score quantifying sentiment expressed in the plurality of textual reviews, and (iii) populating the display area with the review score and the plurality of textual reviews;

populating the display area with quantitative credibility data presenting the second dimension of credibility for said specific entity responsive to said third selectable graphical element being selected, wherein populating said display area with the quantitative credibility data presenting the second dimension of credibility comprises (i) aggregating a plurality of quantitative ratings from a plurality of rating sites originating said ratings, (ii) computing an overall ratings score for the plurality of quantitative ratings, and (iii) populating the display area with the overall ratings score and the plurality of ratings, wherein each rating of the plurality of ratings is defined according to a scale of values that quantifiably represents reputation of the specific entity; and populating the display area with network data presenting the third dimension of credibility for said specific entity responsive to said fourth selectable element being selected, wherein populating the display area with the network data presenting the third dimension of credibility comprises presenting (i) a score quantifying credibility of the entity based on network partners of the entity, (ii) a set of updates provided by the network partners, and (iii) a set of suggested partners that are not yet partners of the entity.

2. The computer-implemented method of claim 1 further comprising ordering said qualitative credibility data presenting the first dimension of credibility in a set of hierarchical accessible layers comprising at least a first hierarchical layer and a second hierarchical layer.

3. The computer-implemented method of claim 2, wherein said first hierarchical layer comprises the review score and said second hierarchical layer comprises the plurality of textual reviews that detail derivation of the review score in said first hierarchical layer.

4. The computer-implemented method of claim 3, wherein the review score of said first hierarchical layer is presented in said display area when the second selectable graphical element is selected and said plurality of textual reviews of said second hierarchical layer is presented in said display area based on a user interaction with the review score of said first hierarchical layer.

5. The computer-implemented method of claim 3, wherein the set of hierarchical accessible layers is a first set of hierarchical layers, and the computer-implemented method further comprising ordering said quantitative credibility data presenting the second dimension of credibility in a second set of hierarchical accessible layers comprising at least a first hierarchical layer and a second hierarchical layer.

6. The computer-implemented method of claim 5, wherein said overall rating score of said first hierarchical layer of the second set of hierarchical layers is presented in said display area when the third selectable graphical element is selected and said plurality of ratings of said second hierarchical layer of the second set of hierarchical layers is presented in said display area when drilling down from said overall ratings score of said first hierarchical layer of the second set of hierarchical layers.

7. The computer-implemented method of claim 1 further comprising determining a set of actions that positively impact the review score based on complaints identified in the plurality of textual reviews, and wherein populating said display area with the qualitative credibility data presenting the first dimension of credibility further comprises (iv) populating the display area with the set of actions.

8. The computer-implemented method of claim 1, wherein populating said display area with the overall credibility data further comprises presenting a trend depicting changes to the credibility score over a period of time.

9. A computer-implemented method for presenting credibility of an entity, the computer implemented method comprising:
aggregating, from a plurality of different online sites, (i) a plurality of textual reviews targeting the entity, (ii) a plurality of quantitative ratings with each rating of the plurality of ratings quantifying reputation of the entity according to a scale of values, and (iii) a plurality of network partners of the entity;
computing (i) a first score quantifying credibility of the entity based on sentiment expressed in the plurality of textual reviews, (ii) a second score quantifying credibility of the entity based on the plurality of ratings, (iii) a third score quantifying credibility of the entity based on the network partners of the entity, and (iv) an overall credibility score numerically quantifying overall reputation of the entity as derived from at least the first, second, and third scores;
providing a graphical user interface (GUI) comprising a plurality of selectable elements and a display area, the plurality of selectable elements comprising a first selectable element providing access to a first dimension of credibility, a second selectable element providing access to a second dimension of credibility, a third selectable element providing access to a third dimension of credibility, and a fourth selectable element providing access to overall credibility of the entity;
populating the display area with the first dimension of credibility in response to selection of the first selectable element, wherein populating the display area with the first dimension of credibility comprises presenting (i) the first score, (ii) a subset of the plurality of textual reviews, and (iii) a first set of suggested actions addressing shortcomings automatically identified in the first dimension of credibility that detrimentally impact the first score, each action of the first set of suggested actions for increasing the first score;
populating the display area with the second dimension of credibility in response to selection of the second selectable element, wherein populating the display area with the second dimension of credibility comprises presenting (i) the second score, (ii) a subset of the plurality of ratings, and (iii) a second set of suggested actions addressing shortcomings automatically identified in the second dimension of credibility that detrimentally impact the second score, each action of the second set of suggested actions for increasing the second score;
populating the display area with the third dimension of credibility in response to selection of the third selectable element, wherein populating the display area with the third dimension of credibility comprises presenting (i) the third score, (ii) a set of updates provided by the network partners, and (iii) a set of suggested partners that are not yet partners of the entity; and
populating the display area with the overall credibility of the entity in response to selection of the fourth selectable element, wherein populating the display area with the overall credibility of the entity comprises presenting the overall credibility score.

10. The computer-implemented method of claim 9 wherein the plurality of selectable elements further comprises a fifth selectable element providing access to a fourth dimension of credibility.

11. The computer-implemented method of claim 10 further comprising populating the display area with the fourth dimension of credibility in response to selection of the fifth selectable element, wherein populating the display area with the fourth dimension of credibility comprises presenting imagery visually identifying at least one of a storefront of the entity and a website of the entity.

12. The computer-implemented method of claim 10 further comprising populating the display area with the fourth dimension of credibility in response to selection of the fifth selectable element, wherein populating the display area with the fourth dimension of credibility comprises presenting financial data of the entity.

13. The computer-implemented method of claim 10 further comprising populating the display area with the fourth dimension of credibility in response to selection of the fifth selectable element, wherein populating the display area with the fourth dimension of credibility comprises presenting news mentioning the entity.

14. The computer-implemented method of claim 9 further comprising computing the first score based on a sentiment expressed in each review of the plurality of reviews, a presence of the entity across the plurality of different online sites, and a number of entities engaged over the different online sites.

15. The computer-implemented method of claim 9 further comprising computing the second score based each rating of the plurality of ratings, a presence of the entity across the plurality of different online sites, and a number of entities engaged over the different online sites.

16. The computer-implemented method of claim 9, wherein populating the display area with the first dimension of credibility further comprises presenting a drill-down layer of credibility data that is accessed by interacting with the first score, the drill-down layer of credibility data detailing derivation based on a sentiment expressed in each review of the plurality of reviews, a presence of the entity across the plurality of different online sites, and a number of entities engaged over the different online sites.

17. The computer-implemented method of claim 9, wherein populating the display area with the first dimension of credibility further comprises presenting (iv) a trend illustrating changes to the first score over a period of time.

18. The computer-implemented method of claim 9, wherein populating the display area with the first dimension of credibility further comprises presenting at least a first, second, and third component scores for the first score, the first component score quantifying sentiment expressed in the plurality of textual reviews towards the entity, the second component score determined based on a number of reviews in the plurality of textual reviews, and the third component score determined based on responses to the plurality of textual reviews.

19. The computer-implemented method of claim 9, wherein populating the display area with the first dimension of credibility further comprises presenting an identifier with each textual review of the subset of the plurality of textual reviews, the identifier identifying a social media site from which a textual review is aggregated from.

20. A server comprising a processor and non-transitory computer-readable storage medium with an executable program stored thereon, said program for interactively accessing credibility of an entity, wherein said program instructs the processor in performing:

receiving input specifying a specific entity;
presenting, in a display area of the GUI, a set of selectable graphical elements comprising at least first, second, third, and fourth selectable graphical elements;
populating said display area with overall credibility data presenting a credibility score numerically quantifying overall reputation of the specific entity responsive to said first selectable graphical element being selected, wherein the credibility score is derived from credibility data of at least a first dimension of credibility, a second dimension of credibility, and a third dimension of credibility; and
populating said display area with qualitative credibility data presenting the first dimension of credibility for said specific entity responsive to said second selectable graphical element being selected, wherein populating said display area with the qualitative credibility data presenting the first dimension of credibility comprises (i) aggregating a plurality of textual reviews targeting the specific entity from a plurality of social media sites originating said reviews, (ii) computing a review score quantifying sentiment expressed in the plurality of textual reviews, and (iii) populating the display area with the review score and the plurality of textual reviews;
populating the display area with quantitative credibility data presenting the second dimension of credibility for said specific entity responsive to said third selectable graphical element being selected, wherein populating said display area with the quantitative credibility data presenting the second dimension of credibility comprises (i) aggregating a plurality of quantitative ratings from a plurality of rating sites originating said ratings, (ii) computing an overall ratings score for the plurality of quantitative ratings, and (iii) populating the display area with the overall ratings score and the plurality of ratings, wherein each rating of the plurality of ratings is defined according to a scale of values that quantifiably represents reputation of the specific entity; and
populating the display area with network data presenting the third dimension of credibility for said specific entity responsive to said fourth selectable element being selected, wherein populating the display area with the third dimension of credibility comprises presenting (i) a score quantifying credibility of the entity based on network partners of the entity, (ii) a set of updates provided by the network partners, and (iii) a set of suggested partners that are not yet partners of the entity.

* * * * *